US012730282B2

(12) United States Patent
Jung

(10) Patent No.: US 12,730,282 B2
(45) Date of Patent: Sep. 8, 2026

(54) OPTICAL MODULE

(71) Applicant: LG INNOTEK CO., LTD., Seoul (KR)

(72) Inventor: Jae Wook Jung, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 287 days.

(21) Appl. No.: 18/687,210

(22) PCT Filed: Aug. 26, 2022

(86) PCT No.: PCT/KR2022/012819
§ 371 (c)(1),
(2) Date: Feb. 27, 2024

(87) PCT Pub. No.: WO2023/027549
PCT Pub. Date: Mar. 2, 2023

(65) Prior Publication Data

US 2024/0361577 A1 Oct. 31, 2024

(30) Foreign Application Priority Data

Aug. 27, 2021 (KR) ........................ 10-2021-0114295

(51) Int. Cl.

| | |
|---|---|
| ***G02B 3/00*** | (2006.01) |
| ***G02B 9/60*** | (2006.01) |
| ***G02B 13/00*** | (2006.01) |
| ***G02B 13/02*** | (2006.01) |
| ***G02B 13/04*** | (2006.01) |

(52) U.S. Cl.
CPC ........... *G02B 13/0045* (2013.01); *G02B 9/60* (2013.01)

(58) Field of Classification Search
CPC ........ G02B 3/0087; G02B 3/00; G02B 13/02; G02B 13/04; G02B 9/60; G02B 13/0045; G02B 30/00; G02B 13/00; G02B 13/06; G02B 2003/0093
USPC ............... 359/714, 659, 719, 733, 746, 753, 359/763–769
See application file for complete search history.

(56) References Cited

U.S. PATENT DOCUMENTS

| | | | |
|---|---|---|---|
| 10,809,491 | B2 | 10/2020 | Jeong et al. |
| 2017/0219802 | A1 | 8/2017 | Chen et al. |
| 2021/0132338 | A1 | 5/2021 | Lin et al. |

(Continued)

FOREIGN PATENT DOCUMENTS

| | | | |
|---|---|---|---|
| CN | 111025595 | A | 4/2020 |
| CN | 111736320 | A | 10/2020 |
| JP | 2021-32908 | A | 3/2021 |

(Continued)

OTHER PUBLICATIONS

International Search Report dated Dec. 21, 2022 in International Application No. PCT/KR2022/012819.

*Primary Examiner* — Dawayne Pinkney
(74) *Attorney, Agent, or Firm* — SALIWANCHIK, LLOYD & EISENSCHENK

(57) ABSTRACT

A optical module according to an embodiment includes a sensor and an optical system including a first lens, a second lens, a third lens, a fourth lens, a fifth lens, and a sixth lens arranged sequentially along the optical axis in the direction from the object side to the sensor side, at least one of the object side surface or the sensor side surface of the fourth lens includes a freeform surface.

20 Claims, 35 Drawing Sheets

(56) References Cited

U.S. PATENT DOCUMENTS

| | | | | |
|---|---|---|---|---|
| 2022/0066135 | A1 | 3/2022 | Sun et al. | |
| 2026/0086319 | A1 * | 3/2026 | Shim | G02B 9/60 |

FOREIGN PATENT DOCUMENTS

| | | | | |
|---|---|---|---|---|
| KR | 10-2021-0071923 A | 6/2021 | | |
| WO | 2021/134321 A1 | 7/2021 | | |
| WO | 2021/134324 A1 | 7/2021 | | |
| WO | WO-2022226827 A1 * | 11/2022 | | G02B 13/18 |

* cited by examiner

FIG. 2
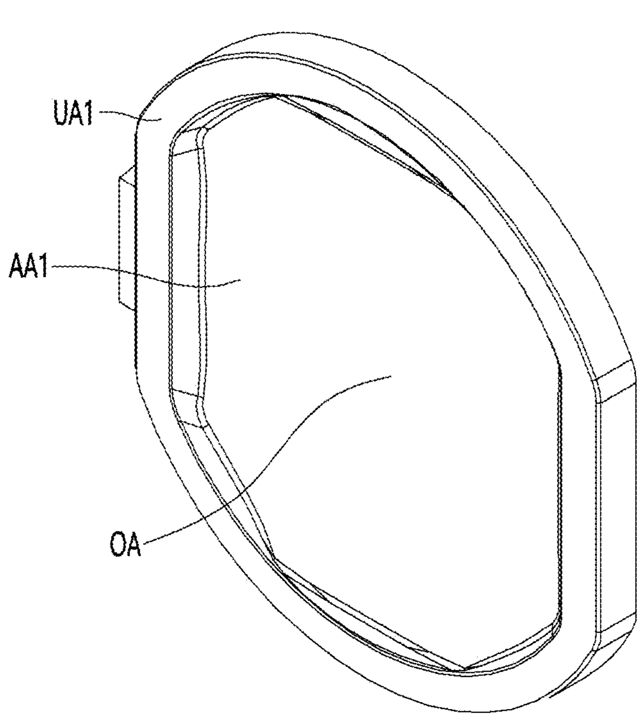

| distance from optical axis (mm) | seventh surface | | | | | | eighth surface | | | | | |
|---|---|---|---|---|---|---|---|---|---|---|---|---|
| | 0° | 30° | 45° | 53° | 60° | 90° | 0° | 30° | 45° | 53° | 60° | 90° |
| -1.8 | | | | | | | -0.649512 | -0.61059 | -0.61329 | -0.625048 | -0.636912 | -0.660758 |
| -1.6 | -0.275529 | -0.240615 | -0.242791 | -0.253072 | -0.263417 | -0.283851 | -0.515605 | -0.503612 | -0.504916 | -0.509234 | -0.51378 | -0.52447 |
| -1.4 | -0.161022 | -0.151737 | -0.152812 | -0.156105 | -0.159492 | -0.16702 | -0.426335 | -0.421922 | -0.422303 | -0.424273 | -0.426678 | -0.434244 |
| -1.2 | -0.077881 | -0.075217 | -0.075507 | -0.076695 | -0.078105 | -0.082367 | -0.349624 | -0.347852 | -0.347942 | -0.348894 | -0.350185 | -0.354871 |
| -1.0 | -0.029233 | -0.028421 | -0.028458 | -0.02889 | -0.029477 | -0.031616 | -0.269137 | -0.268649 | -0.268763 | -0.269181 | -0.269747 | -0.271873 |
| -0.8 | -0.007244 | -0.007102 | -0.007149 | -0.007297 | -0.007497 | -0.008257 | -0.18698 | -0.187023 | -0.187156 | -0.187308 | -0.187488 | -0.188126 |
| -0.6 | -0.000283 | -0.000321 | -0.000371 | -0.000414 | -0.000463 | -0.000626 | -0.112214 | -0.112323 | -0.112404 | -0.112444 | -0.112478 | -0.112572 |
| -0.4 | 0.000655 | 0.000632 | 0.000615 | 0.000607 | 0.000601 | 0.000589 | -0.052672 | -0.05271 | -0.052731 | -0.052737 | -0.052738 | -0.052732 |
| -0.2 | 0.00023 | 0.000228 | 0.000228 | 0.000228 | 0.000229 | 0.00023 | -0.013741 | -0.013743 | -0.013744 | -0.013743 | -0.013743 | -0.01374 |
| 0(optical axis) | 0 | 0 | 0 | 0 | 0 | 0 | 0 | 0 | 0 | 0 | 0 | 0 |
| 0.2 | 0.00023 | 0.000228 | 0.000228 | 0.000228 | 0.000229 | 0.00023 | -0.013741 | -0.013743 | -0.013744 | -0.013743 | -0.013743 | -0.01374 |
| 0.4 | 0.000655 | 0.000632 | 0.000615 | 0.000607 | 0.000601 | 0.000589 | -0.052672 | -0.05271 | -0.052731 | -0.052737 | -0.052738 | -0.052732 |
| 0.6 | -0.000283 | -0.000321 | -0.000371 | -0.000414 | -0.000463 | -0.000626 | -0.112214 | -0.112323 | -0.112404 | -0.112444 | -0.112478 | -0.112572 |
| 0.8 | -0.007244 | -0.007102 | -0.007149 | -0.007297 | -0.007497 | -0.008257 | -0.18698 | -0.187023 | -0.187156 | -0.187308 | -0.187488 | -0.188126 |
| 1.0 | -0.029233 | -0.028421 | -0.028458 | -0.02889 | -0.029477 | -0.031616 | -0.269137 | -0.268649 | -0.268763 | -0.269181 | -0.269747 | -0.271873 |
| 1.2 | -0.077881 | -0.075217 | -0.075507 | -0.076695 | -0.078105 | -0.082367 | -0.349624 | -0.347852 | -0.347942 | -0.348894 | -0.350185 | -0.354871 |
| 1.4 | -0.161022 | -0.151737 | -0.152812 | -0.156105 | -0.159492 | -0.16702 | -0.426335 | -0.421922 | -0.422303 | -0.424273 | -0.426678 | -0.434244 |
| 1.6 | -0.275529 | -0.240615 | -0.242791 | -0.253072 | -0.263417 | -0.283851 | -0.515605 | -0.503612 | -0.504916 | -0.509234 | -0.51378 | -0.52447 |
| 1.8 | | | | | | | -0.649512 | -0.61059 | -0.61329 | -0.625048 | -0.636912 | -0.660758 |

| lens | surface | radius of curvature (mm) | thickness and Distance (mm) | refractive index | Abbe's Number |
|---|---|---|---|---|---|
| first lens | first surface | 1.349 | 0.820 | 1.511 | 56.999 |
| | second surface | 4.310 | 0.050 | | |
| second lens | third surface | 1.016 | 0.230 | 1.689 | 18.400 |
| | fourth surface | 2.939 | 0.404 | | |
| third lens | fifth surface | -7.602 | 0.240 | 1.689 | 18.400 |
| | sixth surface | -10.623 | 0.506 | | |
| fourth lens | seventh surface | -15.254 | 0.561 | 1.532 | 48.085 |
| | eighth surface | -1.176 | 0.278 | | |
| fifth lens | ninth surface | -2.029 | 0.350 | 1.511 | 56.999 |
| | tenth surface | 2.107 | 0.661 | | |
| filter | thirteenth surface | Infinity | 0.110 | | |
| | fourteenth surface | Infinity | 0.019 | | |
| image sensor | fifteenth surface | Infinity | | | |

FIG. 10

| order | fourth lens | |
|---|---|---|
| | seventh surface (S7) | eighth surface (S8) |
| C1 | -0.209249 | -0.060351 |
| C2 | 0 | 0 |
| C3 | 0 | 0 |
| C4 | 0.098058 | 0.011618 |
| C5 | -0.094583 | 0.0218965 |
| C6 | 0 | 0 |
| C7 | 0 | 0 |
| C8 | 0 | 0 |
| C9 | 0 | 0 |
| C10 | 0 | 0 |
| C11 | -0.017563 | -0.034186 |
| C12 | 0.0039173 | 0.0051823 |
| C13 | -0.044513 | -0.023674 |
| C14 | 0 | 0 |
| C15 | 0 | 0 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | -0.006847 | -0.009044 |
| C23 | -0.006415 | -0.008481 |
| C24 | 0.0014736 | 0.0025094 |
| C25 | 0.0137087 | -0.020802 |
| C26 | 0 | 0 |
| C27 | 0 | 0 |
| C28 | 0 | 0 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 0 | 0 |
| C38 | -0.001926 | -0.002776 |
| C39 | -0.002711 | -0.004596 |
| C40 | 0.0010171 | 0.0021474 |
| C41 | 0.0055702 | -0.005178 |
| C42 | 0 | 0 |
| C43 | 0 | 0 |
| C44 | 0 | 0 |
| C45 | 0 | 0 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | 0 | 0 |
| C57 | 0 | 0 |
| C58 | 0 | 0 |
| C59 | -0.000887 | -0.001858 |
| C60 | 0.0005582 | 0.0009618 |
| C61 | -0.001206 | 0.0077178 |
| C62 | 0 | 0 |
| C63 | 0 | 0 |
| C64 | 0 | 0 |
| C65 | 0 | 0 |
| C66 | 0 | 0 |

FIG. 11a

Table 1. Standard Zernike Polynomials Terms

| Term | Standard Zernike Polynomial | Description |
| --- | --- | --- |
| 1 | 1 | Piston (constant) |
| 2 | $R\cos\theta$ | Distortion - Tilt (x-axis) |
| 3 | $R\sin\theta$ | Distortion - Tilt (y-axis) |
| 4 | $R^2\cos(2\theta)$ | Astigmatism, Primary (axis at 0° or 90°) |
| 5 | $2R^2 - 1$ | Defocus - Field curvature |
| 6 | $R^2\sin(2\theta)$ | Astigmatism, Primary (axis at ±45°) |
| 7 | $R^3\cos(3\theta)$ | Trefoil, Primary (x-axis) |
| 8 | $(3R^3 - 2R)\cos\theta$ | Coma, Primary (x-axis) |
| 9 | $(3R^3 - 2R)\sin\theta$ | Coma, Primary (y-axis) |
| 10 | $R^3\sin(3\theta)$ | Trefoil, Primary (y-axis) |
| 11 | $R^4\cos(4\theta)$ | Tetrafoil, Primary (x-axis) |
| 12 | $(4R^4 - 3R^2)\cos(2\theta)$ | Astigmatism, Secondary (axis at 0° or 90°) |
| 13 | $6R^4 - 6R^2 + 1$ | Spherical Aberration, Primary |
| 14 | $(4R^4 - 3R^2)\sin(2\theta$ | Astigmatism, Secondary (axis at ±45°) |
| 15 | $R^4\sin(4\theta)$ | Tetrafoil, Primary (y-axis) |
| 16 | $R^5\cos(5\theta)$ | Pentafoil, Primary (x-axis) |
| 17 | $(5R^5 - 4R^3)\cos(3\theta)$ | Trefoil, Secondary (x-axis) |
| 18 | $(10R^5 - 12R^3 + 3R)\cos\theta$ | Coma, Secondary (x-axis) |
| 19 | $(10R^5 - 12R^3 + 3R)\sin\theta$ | Coma, Secondary (y-axis) |
| 20 | $(5R^5 - 4R^3)\sin(3\theta)$ | Trefoil, Secondary (y-axis) |
| 21 | $R^5\sin(5\theta)$ | Pentafoil, Primary (y-axis) |
| 22 | $R^6\cos(6\theta)$ | Hexafoil, Primary (x-axis) |

FIG. 11b

| | | |
|---|---|---|
| 23 | $(6R^6 - 5R^4) \cos(4\theta)$ | Tetrafoil, Secondary (x-axis) |
| 24 | $(15R^6 - 20R^4 + 6R^2) \cos(2\theta)$ | Astigmatism, Tertiary (axis at 0° or 90°) |
| 25 | $20R^6 - 30R^4 + 12R^2 - 1$ | Spherical Aberration, Secondary |
| 26 | $(15R^6 - 20R^4 + 6R^2) \sin(2\theta)$ | Astigmatism, Tertiary (axis at ±45°) |
| 27 | $(6R^6 - 5R^4) \sin(4\theta)$ | Tetrafoil, Secondary (y-axis) |
| 28 | $R^6 \sin(6\theta)$ | Hexafoil, Primary (y-axis) |
| 29 | $R^7 \cos(7\theta)$ | Heptafoil, Primary (x-axis) |
| 30 | $(7R^7 - 6R^5) \cos(5\theta)$ | Pentafoil, Secondary (x-axis) |
| 31 | $(21R^7 - 30R^5 + 10R^3) \cos(3\theta)$ | Trefoil, Tertiary (x-axis) |
| 32 | $(35R^7 - 60R^5 + 30R^3 - 4R) \cos\theta$ | Coma, Tertiary (x-axis) |
| 33 | $(35R^7 - 60R^5 + 30R^3 - 4R) \sin\theta$ | Coma, Tertiary (y-axis) |
| 34 | $(21R^7 - 30R^5 + 10R^3) \sin(3\theta)$ | Trefoil, Tertiary (y-axis) |
| 35 | $(7R^7 - 6R^5) \sin(5\theta)$ | Pentafoil, Secondary (y-axis) |
| 36 | $R^7 \sin(7\theta)$ | Heptafoil, Primary (y-axis) |
| 37 | $R^8 \cos(8\theta)$ | Octafoil, Primary (x-axis) |
| 38 | $(8R^8 - 7R^6) \cos(6\theta)$ | Hexafoil, Secondary (x-axis) |
| 39 | $(28R^8 - 42R^6 + 15R^4) \cos(4\theta)$ | Tetrafoil, Tertiary (x-axis) |
| 40 | $(56R^8 - 105R^6 + 60R^4 - 10R^2) \cos(2\theta)$ | Astigmatism, Quaternary (axis at 0° or 90°) |
| 41 | $70R^8 - 140R^6 + 90R^4 - 20R^2 + 1$ | Spherical Aberration, Tertiary |
| 42 | $(56R^8 - 105R^6 + 60R^4 - 10R^2) \sin(2\theta)$ | Astigmatism, Quaternary (axis at ±45°) |
| 43 | $(28R^8 - 42R^6 + 15R^4) \sin(4\theta)$ | Tetrafoil, Tertiary (y-axis) |
| 44 | $(8R^8 - 7R^6) \sin(6\theta)$ | Hexafoil, Secondary (y-axis) |
| 45 | $R^8 \sin(8\theta)$ | Octafoil, Primary (y-axis) |

FIG. 11c

| | | |
|---|---|---|
| 46 | $R^9\cos(9\theta)$ | Nonafoil, Primary (x-axis) |
| 47 | $(9R^9 - 8R^7)\cos(7\theta)$ | Heptafoil, Secondary (x-axis) |
| 48 | $(36R^9 - 56R^7 + 21R^5)\cos(5\theta$ | Pentafoil, Tertiary (x-axis) |
| 49 | $(84R^9 - 168R^7 + 105R^5 - 20R^3)\cos(3\theta$ | Trefoil, Quaternary (x-axis) |
| 50 | $(126R^9 - 280R^7 + 210R^5 - 60R^3 + 5R)\cos\theta$ | Coma, Quaternary (x-axis) |
| 51 | $(126R^9 - 280R^7 + 210R^5 - 60R^3 + 5R)\sin\theta$ | Coma, Quaternary (y-axis) |
| 52 | $(84R^9 - 168R^7 + 105R^5 - 20R^3)\sin(3\theta)$ | Trefoil, Quaternary (y-axis) |
| 53 | $(36R^9 - 56R^7 + 21R^5)\sin(5\theta)$ | Pentafoil, Tertiary (y-axis) |
| 54 | $(9R^9 - 8R^7)\sin(7\theta)$ | Heptafoil, Secondary (y-axis) |
| 55 | $R^9\sin(9\theta)$ | Nonafoil, Primary (y-axis) |
| 56 | $R^{10}\cos(10\theta)$ | Decafoil, Primary (x-axis) |
| 57 | $(10R^{10} - 9R^8)\cos(8\theta)$ | Octafoil, Secondary (x-axis) |
| 58 | $(45R^{10} - 72R^8 + 28R^6)\cos(6\theta)$ | Hexafoil, Tertiary (x-axis) |
| 59 | $(120R^{10} - 252R^8 + 168R^6 - 35R^4)\cos(4\theta)$ | Tetrafoil, Quaternary (x-axis) |
| 60 | $(210R^{10} - 504R^8 + 420R^6 - 140R^4 + 15R^2)\cos(2\theta)$ | Astigmatism, Quinternary (axis at 0° or 90°) |
| 61 | $252R^{10} - 630R^8 + 560R^6 - 210R^4 + 30R^2 - 1$ | Spherical Aberration, Quaternary |
| 62 | $(210R^{10} - 504R^8 + 420R^6 - 140R^4 + 15R^2)\sin(2\theta)$ | Astigmatism, Quinternary (axis at ±45°) |
| 63 | $(120R^{10} - 252R^8 + 168R^6 - 35R^4)\sin(4\theta)$ | Tetrafoil, Quaternary (y-axis) |
| 64 | $(45R^{10} - 72R^8 + 28R^6)\sin(6\theta)$ | Hexafoil, Tertiary (y-axis) |
| 65 | $(10R^{10} - 9R^8)\sin(8\theta)$ | Octafoil, Secondary (y-axis) |
| 66 | $R^{10}\sin(10\theta)$ | Decafoil, Primary (y-axis) |

FIG. 12

| | first embodiment |
|---|---|
| aperture position | between first and second lenses |
| FOV(θ) | 83.806 ° |
| F number | 1.911 |
| TTL | 4.250 ㎜ |
| ImgH | 6.556 ㎜ |
| EFL | 3.653 |
| EPD | 1.911 |
| f1 | 3.513 |
| f2 | -17.431 |
| f3 | -40.108 |
| f4 | 2.652 |
| f5 | -1.966 |

FIG. 13

| distance from optical axis (mm) | slope angle(°) | | | | | | | | | | | |
|---|---|---|---|---|---|---|---|---|---|---|---|---|
| | first surface | second surface | third surface | fourth surface | fifth surface | sixth surface | seventh surface-X | seventh surface-Y | eighth surface-X | eighth surface-Y | ninth surface | tenth surface |
| 0(optical axis) | 0 | 0 | 0 | 0 | 0 | 0 | 0 | 0 | 0 | 0 | 0 | 0 |
| 0.2 | 0.8500 | 2.379 | 2.571 | 3.887 | -1.906 | -1.424 | 0.123 | 0.119 | -7.698 | -7.701 | -5.903 | 4.794 |
| 0.4 | 17.143 | 3.530 | 4.109 | 7.999 | -6.315 | -4.938 | 0.056 | 0.014 | -14.045 | -14.084 | -13.007 | 6.748 |
| 0.6 | 26.153 | 3.727 | 5.868 | 14.290 | -16.321 | -12.775 | -0.808 | -0.933 | -18.829 | -18.956 | -21.017 | 5.683 |
| 0.8 | 35.733 | 3.281 | 11.144 | | -36.909 | -25.735 | -3.612 | -3.886 | -21.806 | -22.086 | -27.850 | 2.700 |
| 1.0 | 45.208 | -0.678 | | | | -38.480 | -9.482 | -9.986 | -22.451 | -22.957 | -31.255 | -1.240 |
| 1.2 | 37.668 | | | | | | -18.098 | -18.655 | -21.244 | -21.946 | -30.083 | -5.854 |
| 1.4 | | | | | | | -26.632 | -26.784 | -21.392 | -21.915 | -24.500 | -11.476 |
| 1.6 | | | | | | | -32.553 | -34.276 | -27.997 | -27.978 | -16.547 | -18.908 |
| 1.8 | | | | | | | | | -39.120 | -40.763 | -9.066 | -28.604 |
| 2.0 | | | | | | | | | | | -2.184 | -37.892 |
| 2.2 | | | | | | | | | | | 3.640 | -40.746 |
| 2.4 | | | | | | | | | | | 1.686 | -35.538 |
| 2.6 | | | | | | | | | | | | -52.030 |

FIG. 14

| distance(mm) | lens interval (㎜) | | | |
|---|---|---|---|---|
| | first lens/second lens | second lens/third lens | third lens/fourth lens | fourth lens/fifth lens |
| 0(optical axis) | 0.050 | 0.404 | 0.339 | 0.377 |
| 0.2 | 0.050 | 0.395 | 0.342 | 0.380 |
| 0.4 | 0.052 | 0.361 | 0.352 | 0.386 |
| 0.6 | 0.056 | 0.285 | 0.381 | 0.385 |
| 0.8 | 0.071 | | 0.443 | 0367 |
| 1.0 | 0.172 | | 0.546 | 0.335 |
| 1.2 | | | | 0.295 |
| 1.4 | | | | 0.267 |
| 1.6 | | | | 0.281 |
| 1.8 | | | | 0.369 |

FIG. 15

| distance(mm) | thickness of lens (㎜) | | | | |
|---|---|---|---|---|---|
| | first lens | second lens | third lens | fourth lens | fifth lens |
| 0(optical axis) | 0.820 | 0.230 | 0.240 | 0.630 | 0.350 |
| 0.2 | 0.810 | 0.232 | 0.241 | 0.616 | 0.369 |
| 0.4 | 0.775 | 0.241 | 0.244 | 0.576 | 0.423 |
| 0.6 | 0.708 | 0.262 | 0.252 | 0.518 | 0.507 |
| 0.8 | 0.601 | 0.308 | 0.279 | 0.450 | 0.614 |
| 1.0 | 0.435 | | | 0.390 | 0.732 |
| 1.2 | 0.281 | | | 0.358 | 0.840 |
| 1.4 | | | | 0.364 | 0.915 |
| 1.6 | | | | 0.389 | 0.936 |
| 1.8 | | | | | 0.894 |
| 2.0 | | | | | 0.781 |
| 2.2 | | | | | 0.608 |
| 2.4 | | | | | 0.438 |

FIG. 16

| distance from optical axis (mm) | Sag(㎜) | | | | | | | | | | | |
|---|---|---|---|---|---|---|---|---|---|---|---|---|
| | first surface | second surface | third surface | fourth surface | fifth surface | sixth surface | seventh surface-X | seventh surface-Y | eighth surface-X | eighth surface-Y | ninth surface | tenth surface |
| 0(optical axis) | 0 | 0 | 0 | 0 | 0 | 0 | 0 | 0 | 0 | 0 | 0 | 0 |
| 0.2 | 0.015 | 0.004 | 0.005 | 0.007 | -0.003 | -0.002 | 0.00023 | 0.00023 | -0.013741 | -0.01374 | -0.010 | 0.009 |
| 0.4 | 0.060 | 0.015 | 0.017 | 0.027 | -0.016 | -0.012 | 0.000655 | 0.000589 | -0.052672 | -0.052732 | -0.043 | 0.030 |
| 0.6 | 0.140 | 0.028 | 0..034 | 0.066 | -0.054 | -0.042 | -0.000283 | -0.000626 | -0.112214 | -0.112572 | -0.104 | 0.053 |
| 0.8 | 0.260 | 0.041 | 0.032 | | -0.149 | -0.111 | -0.007244 | -0.008257 | -0.18698 | -0.188126 | -0.196 | 0.068 |
| 1.0 | 0.432 | 0.047 | | | | -0.236 | -0.029233 | -0.031616 | -0.269137 | -0.271873 | -0.311 | 0.070 |
| 1.2 | 0.634 | | | | | | -0.077881 | -0.082367 | -0.349624 | -0.354871 | -0.432 | 0.058 |
| 1.4 | | | | | | | -0.161022 | -0.16702 | -0.426335 | -0.434244 | -0.536 | 0.028 |
| 1.6 | | | | | | | -0.275529 | -0.283851 | -0.515605 | -0.52447 | -0.612 | -0.026 |
| 1.8 | | | | | | | | | -0.649512 | -0.660758 | -0.657 | -0.113 |
| 2.0 | | | | | | | | | | | -0.677 | -0.246 |
| 2.2 | | | | | | | | | | | -0.673 | -0.415 |
| 2.4 | | | | | | | | | | | -0.661 | -0.573 |
| 2.6 | | | | | | | | | | | | -0.745 |

FIG. 17

| | first surface | second surface | third surface | fourth surface | fifth surface | sixth surface | seventh surface | eighth surface | ninth surface | tenth surface |
|---|---|---|---|---|---|---|---|---|---|---|
| K= | -0.2258 | -47.5761 | -25.4664 | 9.0980 | 78.6135 | 98.4852 | - | - | -8.5531 | -18.9862 |
| A4= | -0.0072 | -0.0903 | -0.1352 | -0.0534 | -0.1962 | -0.1797 | - | - | -0.2687 | -0.1367 |
| A6= | 0.0950 | 0.1007 | 0.6235 | -0.0959 | 0.0837 | 0.0490 | - | - | 0.1950 | 0.0992 |
| A8= | -0.2818 | 0.0974 | -4.1377 | 4.5744 | -1.3838 | -0.3983 | - | - | -0.0673 | -0.0539 |
| A10= | 0.4464 | -0.6192 | 22.9277 | -7.0969 | 9.0877 | 1.3476 | - | - | 0.0167 | 0.0200 |
| A12= | -0.2148 | 1.5064 | -78.1407 | 18.9045 | -35.1664 | -2.7903 | - | - | -0.0040 | -0.0050 |
| A14= | -0.3521 | -2.3887 | 163.7238 | -30.2865 | 82.2406 | 3.7144 | - | - | 0.0009 | 0.0008 |
| A16= | 0.6035 | 2.2915 | -206.5765 | 26.7456 | -115.1600 | -3.1133 | - | - | -0.000128 | -0.0000614 |
| A18= | -0.3514 | -1.1850 | 144.0180 | -10.0107 | 89.4909 | 1.5896 | - | - | 0.0000103 | 2.02E-06 |
| A20= | 0.0727 | 0.2533 | -42.5740 | 0 | -29.7510 | -0.3851 | - | - | -3.44 E-07 | 1.77E-09 |

FIG. 19

| Frequency | 0F | | 0.2F | | 0.4F | | 0.6F | | 0.8F | | 1.0F | |
|---|---|---|---|---|---|---|---|---|---|---|---|---|
| | RAD | TAN | RAD | TAN | RAD | TAN | RAD | TAN | RAD | TAN | RAD | TAN |
| 0 | 0.999 | 0.999 | 0.999 | 0.999 | 0.999 | 0.999 | 0.999 | 0.999 | 0.999 | 0.999 | 0.999 | 0.999 |
| 11 | 0.982 | 0.982 | 0.977 | 0.979 | 0.980 | 0.981 | 0.976 | 0.977 | 0.967 | 0.970 | 0.934 | 0.943 |
| 22 | 0.959 | 0.959 | 0.944 | 0.949 | 0.955 | 0.956 | 0.943 | 0.946 | 0.919 | 0.925 | 0.871 | 0.892 |
| 33 | 0.932 | 0.932 | 0.901 | 0.911 | 0.925 | 0.928 | 0.903 | 0.909 | 0.863 | 0.873 | 0.795 | 0.832 |
| 44 | 0.902 | 0.902 | 0.857 | 0.871 | 0.892 | 0.896 | 0.858 | 0.866 | 0.803 | 0.816 | 0.725 | 0.771 |
| 55 | 0.868 | 0.868 | 0.804 | 0.824 | 0.857 | 0.861 | 0.809 | 0.820 | 0.740 | 0.755 | 0.645 | 0.706 |
| 66 | 0.833 | 0.832 | 0.758 | 0.779 | 0.820 | 0.825 | 0.758 | 0.772 | 0.679 | 0.698 | 0.584 | 0.649 |
| 77 | 0.795 | 0.794 | 0.705 | 0.729 | 0.783 | 0.788 | 0.707 | 0.722 | 0.617 | 0.639 | 0.516 | 0.589 |
| 88 | 0.759 | 0.756 | 0.661 | 0.685 | 0.745 | 0.750 | 0.656 | 0.673 | 0.562 | 0.586 | 0.471 | 0.542 |
| 99 | 0.719 | 0.716 | 0.613 | 0.638 | 0.707 | 0.713 | 0.607 | 0.624 | 0.507 | 0.532 | 0.416 | 0.492 |
| 110 | 0.682 | 0.677 | 0.573 | 0.597 | 0.671 | 0.676 | 0.560 | 0.577 | 0.460 | 0.487 | 0.382 | 0.460 |

FIG. 21

| lens | surface | radius of curvature (mm) | thickness and Distance (mm) | refractive index | Abbe's Number |
|---|---|---|---|---|---|
| first lens | first surface | 1.412 | 0.801 | 1.511 | 56.999 |
| | second surface | 6.479 | 0.052 | | |
| second lens | third surface | 6.037 | 0.230 | 1.689 | 18.400 |
| | fourth surface | 3.221 | 0.432 | | |
| third lens | fifth surface | -8.153 | 0.245 | 1.689 | 18.400 |
| | sixth surface | -10.365 | 0.548 | | |
| fourth lens | seventh surface | -14.163 | 0.642 | 1.531 | 48.278 |
| | eighth surface | -1.120 | 0.355 | | |
| fifth lens | ninth surface | -2.121 | 0.309 | 1.511 | 56.999 |
| | tenth surface | 1.879 | 0.251 | | |
| filter | thirteenth surface | Infinity | 0.110 | | |
| | fourteenth surface | Infinity | 0.524 | | |
| image sensor | fifteenth surface | Infinity | | | |

FIG. 22

| order | fourth lens | |
|---|---|---|
| | seventh surface (S7) | eighth surface (S8) |
| C1 | -0.235501 | -0.046245 |
| C2 | 0 | 0 |
| C3 | 0 | 0 |
| C4 | 0.0110122 | 0.0132986 |
| C5 | -0.137235 | -0.014936 |
| C6 | 0 | 0 |
| C7 | 0 | 0 |
| C8 | 0 | 0 |
| C9 | 0 | 0 |
| C10 | 0 | 0 |
| C11 | -0.008158 | -0.008344 |
| C12 | 0.002536 | 0.0021973 |
| C13 | -0.040243 | 0.0092502 |
| C14 | 0 | 0 |
| C15 | 0 | 0 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | 0 | 0 |
| C23 | 0 | 0 |
| C24 | -6.28E-05 | 2.076E-05 |
| C25 | 0.0218242 | -0.003317 |
| C26 | 0 | 0 |
| C27 | 0 | 0 |
| C28 | 0 | 0 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 0 | 0 |
| C38 | 0 | 0 |
| C39 | 0 | 0 |
| C40 | 2.555E-05 | 0.0002786 |
| C41 | 0.008169 | -0.012829 |
| C42 | 0 | 0 |
| C43 | 0 | 0 |
| C44 | 0 | 0 |
| C45 | 0 | 0 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | 0 | 0 |
| C57 | 0 | 0 |
| C58 | 0 | 0 |
| C59 | 0 | 0 |
| C60 | 0 | 0 |
| C61 | 0.0001559 | 0.0027781 |
| C62 | 0 | 0 |
| C63 | 0 | 0 |
| C64 | 0 | 0 |
| C65 | 0 | 0 |
| C66 | 0 | 0 |

FIG. 23

| | second embodiment |
|---|---|
| aperture position | between first and second lenses |
| FOV(θ) | 80.388 ° |
| F number | 1.944 |
| TTL | 4.500 mm |
| ImgH | 6.556 mm |
| EFL | 3.880 |
| EPD | 1.995 |
| f1 | 3.352 |
| f2 | -10.370 |
| f3 | -58.091 |
| f4 | 2.541 |
| f5 | -1.900 |

FIG. 24

| distance from optical axis (mm) | slope angle(°) | | | | | | | | | | | |
|---|---|---|---|---|---|---|---|---|---|---|---|---|
| | first surface | second surface | third surface | fourth surface | fifth surface | sixth surface | seventh surface-X | seventh surface-Y | eighth surface-X | eighth surface-Y | ninth surface | tenth surface |
| 0(optical axis) | 0 | 0 | 0 | 0 | 0 | 0 | 0 | 0 | 0 | 0 | 0 | 0 |
| 0.2 | 8.140 | 1.623 | 1.758 | 3.565 | -1.746 | -1.406 | -0.331 | -0.375 | -8.343 | -8.406 | -5.613 | 5.407 |
| 0.4 | 16.436 | 2.628 | 3.057 | 7.436 | -5.641 | -4.549 | -0.396 | -1.049 | -15.219 | -15.381 | -12.310 | 7.796 |
| 0.6 | 25.117 | 3.249 | 4.825 | 13.021 | -14.444 | -11.278 | -2.286 | -2.519 | -20.736 | -21.047 | -19.984 | 7.025 |
| 0.8 | 34.392 | 3.554 | 9.242 | 24.384 | -32.108 | -22.897 | -5.115 | -5.536 | -24.846 | -25.345 | -26.760 | 4.315 |
| 1.0 | 43.947 | 1.651 | | | | -32.833 | -10.162 | -10.838 | -26.796 | -27.511 | -30.603 | 0.815 |
| 1.2 | | | | | | | -17.384 | -18.356 | -26.136 | -27.107 | -30.649 | -3.014 |
| 1.4 | | | | | | | -24.822 | -26.090 | -24.126 | -25.431 | -26.984 | -7.370 |
| 1.6 | | | | | | | -27.875 | -29.547 | -24.967 | -26.751 | -20.334 | -12.756 |
| 1.8 | | | | | | | | | -33.296 | -35.725 | -12.220 | -19.769 |
| 2.0 | | | | | | | | | | | -4.636 | -28.293 |
| 2.2 | | | | | | | | | | | 1.315 | -35.578 |
| 2.4 | | | | | | | | | | | 2.836 | -36.730 |
| 2.6 | | | | | | | | | | | | -35.508 |

FIG. 25

| distance(mm) | lens interval (㎜) | | | |
|---|---|---|---|---|
| | first lens/second lens | second lens/third lens | third lens/fourth lens | fourth lens/fifth lens |
| 0(optical axis) | 0.052 | 0.432 | 0.406 | 0.389 |
| 0.2 | 0.052 | 0.423 | 0.408 | 0.395 |
| 0.4 | 0.053 | 0.392 | 0.415 | 0.406 |
| 0.6 | 0.056 | 0.323 | 0.436 | 0.413 |
| 0.8 | 0.067 | 0.175 | 0.484 | 0.411 |
| 1.0 | 0.113 | | 0.569 | 0.398 |
| 1.2 | | | | 0.378 |
| 1.4 | | | | 0.360 |
| 1.6 | | | | 0.361 |
| 1.8 | | | | 0.411 |

FIG. 26

| distance(mm) | thickness of lens (㎜) | | | | |
|---|---|---|---|---|---|
| | first lens | second lens | third lens | fourth lens | fifth lens |
| 0(optical axis) | 0.801 | 0.230 | 0.245 | 0.750 | 0.309 |
| 0.2 | 0.789 | 0.233 | 0.246 | 0.736 | 0.329 |
| 0.4 | 0.753 | 0.244 | 0.248 | 0.696 | 0.384 |
| 0.6 | 0.688 | 0.265 | 0.255 | 0.636 | 0.469 |
| 0.8 | 0.585 | 0.307 | 0.278 | 0.563 | 0.576 |
| 1.0 | 0.432 | | | 0.492 | 0.696 |
| 1.2 | | | | 0.440 | 0.813 |
| 1.4 | | | | 0.424 | 0.906 |
| 1.6 | | | | 0.437 | 0.959 |
| 1.8 | | | | | 0.960 |
| 2.0 | | | | | 0.900 |
| 2.2 | | | | | 0.779 |
| 2.4 | | | | | 0.620 |

FIG. 27

| distance from optical axis (mm) | Sag(mm) | | | | | | | | | | | |
|---|---|---|---|---|---|---|---|---|---|---|---|---|
| | first surface | second surface | third surface | fourth surface | fifth surface | sixth surface | seventh surface-X | seventh surface-Y | eighth surface-X | eighth surface-Y | ninth surface | tenth surface |
| 0(optical axis) | 0 | 0 | 0 | 0 | 0 | 0 | 0 | 0 | 0 | 0 | 0 | 0 |
| 0.2 | 0.014 | 0.003 | 0.003 | 0.006 | -0.003 | -0.002 | -0.000545 | -0.000616 | -0.014925 | -0.01503 | -0.010 | 0.010 |
| 0.4 | 0.058 | 0.011 | 0.012 | 0.025 | -0.015 | -0.012 | -0.002623 | -0.002956 | -0.057168 | -0.057672 | -0.041 | 0.034 |
| 0.6 | 0.134 | 0.021 | 0.025 | 0.060 | -0.048 | -0.038 | -0.007935 | -0.008855 | -0.12251 | -0.123918 | -0.099 | 0.061 |
| 0.8 | 0.248 | 0.033 | 0.048 | 0.125 | -0.131 | -0.099 | -0.020319 | -0.022364 | -0.20718 | -0.210255 | -0.186 | 0.081 |
| 1.0 | 0.412 | 0.043 | | | | -0.209 | -0.043434 | -0.050415 | -0.304888 | -0.310594 | -0.297 | 0.090 |
| 1.2 | | | | | | | -0.095023 | -0.102066 | -0.405346 | -0.414745 | -0.417 | 0.087 |
| 1.4 | | | | | | | -0.172858 | -0.184452 | -0.499114 | -0.513363 | -0.528 | 0.069 |
| 1.6 | | | | | | | -0.274774 | -0.292833 | -0.588447 | -0.609178 | -0.617 | 0.034 |
| 1.8 | | | | | | | | | -0.697155 | -0.727644 | -0.675 | -0.024 |
| 2.0 | | | | | | | | | | | -0.705 | -0.113 |
| 2.2 | | | | | | | | | | | -0.710 | -0.240 |
| 2.4 | | | | | | | | | | | -0.700 | -0.390 |
| 2.6 | | | | | | | | | | | | -0.531 |

FIG. 28

| | first surface | second surface | third surface | fourth surface | fifth surface | sixth surface | seventh surface | eighth surface | ninth surface | tenth surface |
|---|---|---|---|---|---|---|---|---|---|---|
| K= | -0.1634 | -24.2660 | -9.5381 | 9.7827 | 81.9304 | 82.7684 | - | - | -13.0732 | -15.3337 |
| A4= | 0.0042 | -0.0748 | -0.0805 | -0.0410 | -0.1642 | -0.1589 | - | - | -0.2835 | -0.1325 |
| A6= | 0.0058 | 0.1053 | 0.1609 | 0.0962 | -0.0368 | 0.1001 | - | - | 0.2141 | 0.0916 |
| A8= | 0.0218 | -0.0313 | -0.0634 | -0.0778 | 0.0621 | -0.4434 | - | - | -0.0843 | -0.0441 |
| A10= | -0.0600 | -0.0848 | -0.0473 | 0.0367 | -0.2017 | 0.9904 | - | - | 0.0218 | 0.0142 |
| A12= | 0.0630 | 0.0853 | 0.0538 | 0 | 0.1612 | -1.2658 | - | - | -0.0038 | -0.0031 |
| A14= | -0.0248 | -0.0252 | 0.0026 | 0 | 0 | 0.8596 | - | - | 0.0004 | 0.0004 |
| A16= | 0 | 0 | 0 | 0 | 0 | -0.2254 | - | - | 0.0000284 | -0.0000345 |
| A18= | 0 | 0 | 0 | 0 | 0 | 0 | - | - | 7.96E-07 | 1.55E-06 |
| A20= | 0 | 0 | 0 | 0 | 0 | 0 | | - | 0 | -3.04E-08 |

FIG. 30

| Frequency | 0F | | 0.2F | | 0.4F | | 0.6F | | 0.8F | | 1.0F | |
|---|---|---|---|---|---|---|---|---|---|---|---|---|
| | RAD | TAN | RAD | TAN | RAD | TAN | RAD | TAN | RAD | TAN | RAD | TAN |
| 0 | 0.999 | 0.999 | 0.999 | 0.999 | 0.999 | 0.999 | 0.999 | 0.999 | 0.999 | 0.999 | 0.999 | 0.999 |
| 11 | 0.983 | 0.983 | 0.973 | 0.978 | 0.981 | 0.982 | 0.978 | 0.979 | 0.970 | 0.972 | 0.944 | 0.959 |
| 22 | 0.964 | 0.964 | 0.939 | 0.945 | 0.959 | 0.962 | 0.950 | 0.953 | 0.928 | 0.934 | 0.851 | 0.891 |
| 33 | 0.943 | 0.942 | 0.893 | 0.905 | 0.933 | 0.939 | 0.918 | 0.923 | 0.879 | 0.890 | 0.742 | 0.804 |
| 44 | 0.921 | 0.919 | 0.843 | 0.861 | 0.906 | 0.915 | 0.883 | 0.889 | 0.826 | 0.841 | 0.646 | 0.714 |
| 55 | 0.896 | 0.895 | 0.789 | 0.814 | 0.876 | 0.889 | 0.845 | 0.852 | 0.768 | 0.787 | 0.562 | 0.628 |
| 66 | 0.871 | 0.870 | 0.738 | 0.769 | 0.846 | 0.863 | 0.807 | 0.814 | 0.712 | 0733 | 0.498 | 0.552 |
| 77 | 0.845 | 0.843 | 0.685 | 0.722 | 0.814 | 0.835 | 0.767 | 0.774 | 0.655 | 0.678 | 0.440 | 0.485 |
| 88 | 0.818 | 0.817 | 0.637 | 0.680 | 0.783 | 0.808 | 0.728 | 0.735 | 0.603 | 0.626 | 0.392 | 0.428 |
| 99 | 0.791 | 0.791 | 0.592 | 0.641 | 0.751 | 0.780 | 0.690 | 0.693 | 0.554 | 0.576 | 0.351 | 0.379 |
| 110 | 0.763 | 0.763 | 0.544 | 0.600 | 0.720 | 0.752 | 0.653 | 0.654 | 0506 | 0524 | 0.307 | 0.338 |

FIG. 32

| lens | surface | radius of curvature (mm) | thickness and Distance (mm) | refractive index | Abbe's Number |
|---|---|---|---|---|---|
| first lens | first surface | 1.361 | 0.846 | 1.511 | 56.999 |
| | second surface | 4.344 | 0.050 | | |
| second lens | third surface | 4.090 | 0.20 | 1.689 | 18.400 |
| | fourth surface | 2.996 | 0.418 | | |
| third lens | fifth surface | -7.728 | 0.238 | 1.689 | 18.400 |
| | sixth surface | -10.529 | 0.516 | | |
| fourth lens | seventh surface | -15.408 | 0.554 | 1.536 | 46.601 |
| | eighth surface | -1.215 | 0.280 | | |
| fifth lens | ninth surface | -2.005 | 0.350 | 1.511 | 56.999 |
| | tenth surface | 2.009 | 0.671 | | |
| filter | thirteenth surface | Infinity | 0.110 | | |
| | fourteenth surface | Infinity | 0.016 | | |
| image sensor | fifteenth surface | Infinity | | | |

FIG. 33

| order | fourth lens | |
| --- | --- | --- |
| | seventh surface (S7) | eighth surface (S8) |
| C1 | -0.211154 | -0.060231 |
| C2 | 0 | 0 |
| C3 | 0 | 0 |
| C4 | 0.009155 | 0.0146224 |
| C5 | -0.091521 | -0.003075 |
| C6 | 0 | 0 |
| C7 | 0 | 0 |
| C8 | 0 | 0 |
| C9 | 0 | 0 |
| C10 | 0 | 0 |
| C11 | -0.015329 | -0.02322 |
| C12 | 0.0046758 | 0.0075074 |
| C13 | -0.044165 | -0.024434 |
| C14 | 0 | 0 |
| C15 | 0 | 0 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | -0.004812 | -0.005932 |
| C23 | -0.005152 | -0.007879 |
| C24 | 0.0019791 | 0.0039497 |
| C25 | 0.0122906 | -0.019783 |
| C26 | 0 | 0 |
| C27 | 0 | 0 |
| C28 | 0 | 0 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 0 | 0 |
| C38 | -0.001556 | -0.002228 |
| C39 | -0.002113 | -0.004106 |
| C40 | 0.0012347 | 0.002779 |
| C41 | 0.0052327 | -0.006316 |
| C42 | 0 | 0 |
| C43 | 0 | 0 |
| C44 | 0 | 0 |
| C45 | 0 | 0 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | 0 | 0 |
| C57 | 0 | 0 |
| C58 | 0 | 0 |
| C59 | -0.000659 | -0.001627 |
| C60 | 0.0006094 | 0.0011588 |
| C61 | -0.000766 | 0.0068111 |
| C62 | 0 | 0 |
| C63 | 0 | 0 |
| C64 | 0 | 0 |
| C65 | 0 | 0 |
| C66 | 0 | 0 |

FIG. 34

| | third embodiment |
|---|---|
| aperture position | between first and second lenses |
| FOV(θ) | 82.976 ° |
| F number | 1.927 |
| TTL | 4.300 mm |
| ImgH | 6.556 mm |
| EFL | 3.707 |
| EPD | 1.923 |
| f1 | 3.538 |
| f2 | -17.775 |
| f3 | -43.695 |
| f4 | 2.611 |
| f5 | -1.907 |

FIG. 35

| distance from optical axis (mm) | slope angle(°) | | | | | | | | | | | |
|---|---|---|---|---|---|---|---|---|---|---|---|---|
| | first surface | second surface | third surface | fourth surface | fifth surface | sixth surface | seventh surface-X | seventh surface-Y | eighth surface-X | eighth surface-Y | ninth surface | tenth surface |
| 0(optical axis) | 0 | 0 | 0 | 0 | 0 | 0 | 0 | 0 | 0 | 0 | 0 | 0 |
| 0.2 | 8.423 | 2.367 | 2.530 | 3.809 | -1.879 | -1.426 | 0.110 | 0.100 | -7.742 | -7.752 | -5.936 | 5.018 |
| 0.4 | 16.980 | 3.522 | 4.021 | 7.823 | -6.208 | -4.901 | 0.057 | 0.002 | -14.009 | -14.066 | -12.947 | 7.073 |
| 0.6 | 25.690 | 3.702 | 5.630 | 13.880 | -15.995 | -12.618 | -0.801 | -0.948 | -18.693 | -18.848 | -20.810 | 6.071 |
| 0.8 | 35.365 | 3.285 | 10.424 | | -35.566 | -25.341 | -3.612 | 3.923 | -21.760 | -22.077 | -27.591 | 3.164 |
| 1.0 | 44.952 | -0.494 | | | | -37.432 | -9.380 | -9.955 | -22.767 | -23.326 | -31.101 | -0.657 |
| 1.2 | 41.061 | | | | | | -17.759 | -18.493 | -21.975 | -22.796 | -30.160 | -5.106 |
| 1.4 | | | | | | | -26.276 | -27.001 | -22.129 | -22.989 | -24.833 | -10.549 |
| 1.6 | | | | | | | -31.546 | -35.398 | -28.205 | -29.147 | -16.971 | -17.776 |
| 1.8 | | | | | | | | | -38.783 | -42.812 | -9.282 | -27.261 |
| 2.0 | | | | | | | | | | | -1.955 | -36.613 |
| 2.2 | | | | | | | | | | | 4.187 | -39.775 |
| 2.4 | | | | | | | | | | | 2.170 | -33.484 |
| 2.6 | | | | | | | | | | | | -47.652 |

FIG. 36

| distance(mm) | lens interval (㎜) | | | |
|---|---|---|---|---|
| | first lens/second lens | second lens/third lens | third lens/fourth lens | fourth lens/fifth lens |
| 0(optical axis) | 0.050 | 0.418 | 0.346 | 0.354 |
| 0.2 | 0.050 | 0.408 | 0348 | 0.358 |
| 0.4 | 0.051 | 0.375 | 0359 | 0.364 |
| 0.6 | 0.055 | 0.300 | 0387 | 0.363 |
| 0.8 | 0.069 | | 0.448 | 0.346 |
| 1.0 | | | 0.549 | 0.315 |
| 1.2 | | | | 0.277 |
| 1.4 | | | | 0.251 |
| 1.6 | | | | 0.266 |
| 1.8 | | | | 0.353 |

FIG. 37

| distance(mm) | thickness of lens(㎜) | | | | |
|---|---|---|---|---|---|
| | first lens | second lens | third lens | fourth lens | fifth lens |
| 0(optical axis) | 0.846 | 0.230 | 0.238 | 0.650 | 0.350 |
| 0.2 | 0.836 | 0.232 | 0.239 | 0.636 | 0.370 |
| 0.4 | 0.802 | 0.240 | 0.242 | 0.597 | 0.425 |
| 0.6 | 0.736 | 0.261 | 0.249 | 0.538 | 0.509 |
| 0.8 | 0.630 | 0.306 | 0.274 | 0.471 | 0.617 |
| 1.0 | 0.466 | | | 0.410 | 0.735 |
| 1.2 | 0.277 | | | 0.375 | 0.846 |
| 1.4 | | | | 0.377 | 0.924 |
| 1.6 | | | | 0.398 | 0.951 |
| 1.8 | | | | | 0.915 |
| 2.0 | | | | | 0.809 |
| 2.2 | | | | | 0.642 |
| 2.4 | | | | | 0.476 |

FIG. 38

| distance from optical axis (mm) | Sag(㎜) | | | | | | | | | | | |
|---|---|---|---|---|---|---|---|---|---|---|---|---|
| | first surface | second surface | third surface | fourth surface | fifth surface | sixth surface | seventh surface-X | seventh surface-Y | eighth surface-X | eighth surface-Y | ninth surface | tenth surface |
| 0(optical axis) | 0 | 0 | 0 | 0 | 0 | 0 | 0 | 0 | 0 | 0 | 0 | 0 |
| 0.2 | 0.015 | 0.004 | 0.005 | 0.007 | -0.003 | -0.002 | 0.000199 | 0.00019 | -0.013848 | -0.013859 | -0.010 | 0.009 |
| 0.4 | 0.060 | 0.015 | 0.016 | 0.027 | -0.016 | -0.012 | 0.000597 | 0.000489 | -0.052826 | -0.052944 | -0.043 | 0.032 |
| 0.6 | 0.138 | 0.028 | 0.033 | 0.064 | -0.053 | -0.042 | -0.000318 | -0.000764 | -0.112011 | -0.112515 | -0.104 | 0.055 |
| 0.8 | 0.257 | 0.040 | 0.059 | | -0.146 | -0.110 | -0.007275 | -0.008491 | -0.186324 | -0.187745 | -0.195 | 0.072 |
| 1.0 | 0.427 | 0.047 | | | | -0.232 | -0.02914 | -0.031907 | -0.268955 | -0.272147 | -0.309 | 0.076 |
| 1.2 | 0.635 | | | | | | -0.076967 | -0.082256 | -0.351626 | -0.357675 | -0.429 | 0.067 |
| 1.4 | | | | | | | -0.158575 | -0.166741 | -0.431503 | -0.441088 | -0.535 | 0.039 |
| 1.6 | | | | | | | -0.270805 | -0.286934 | -0.522846 | -0.535971 | -0.611 | -0.010 |
| 1.8 | | | | | | | | | -0.656363 | -0.680369 | -0.658 | -0.093 |
| 2.0 | | | | | | | | | | | -0.678 | -0.219 |
| 2.2 | | | | | | | | | | | -0.673 | -0.381 |
| 2.4 | | | | | | | | | | | -0.659 | -0.533 |
| 2.6 | | | | | | | | | | | | -0.686 |

FIG. 39

| | first surface | second surface | third surface | fourth surface | fifth surface | sixth surface | seventh surface | eighth surface | ninth surface | tenth surface |
|---|---|---|---|---|---|---|---|---|---|---|
| K= | -0.2070 | -46.1429 | -26.9461 | 9.2628 | 78.9780 | 94.6225 | - | - | -9.3543 | -18.7518 |
| A4= | -0.0103 | -0.0882 | -0.1196 | -0.0578 | -0.2037 | -0.1763 | - | - | -0.2657 | -0.1310 |
| A6= | 0.1072 | 0.0811 | 0.3643 | 0.0211 | 0.2976 | 0.0635 | - | - | 0.1917 | 0.0917 |
| A8= | -0.3414 | 0.1762 | -1.7312 | 0.5086 | -3.4305 | -0.5221 | - | - | -0.0682 | -0.0468 |
| A10= | 0.6220 | -0.8432 | 9.6122 | -2.0869 | 20.1483 | 1.8009 | - | - | 0.0185 | 0.0159 |
| A12= | -0.5584 | 1.9142 | -33.4079 | 5.2818 | -71.3479 | -3.6777 | - | - | -0.0049 | -0.0035 |
| A14= | 0.0901 | -2.8157 | 71.1332 | -8.6968 | 155.4055 | 4.7304 | - | - | 0.0011 | 0.0004 |
| A16= | 0.2485 | 2.5202 | -91.2297 | 8.1920 | -204.3615 | -3.7869 | - | - | -0.0002 | -0.0000203 |
| A18= | -0.1919 | -1.2267 | 64.7827 | -3.3084 | 149.3175 | 1.8108 | - | - | 0.0000125 | -8.33E-07 |
| A20= | 0.0427 | 0.2481 | -19.5485 | | -46.6201 | -0.4057 | - | - | -4.11E-07 | 8.52E-08 |

| Frequency | 0F | | 0.2F | | 0.4F | | 0.6F | | 0.8F | | 1.0F | |
|---|---|---|---|---|---|---|---|---|---|---|---|---|
| | RAD | TAN | RAD | TAN | RAD | TAN | RAD | TAN | RAD | TAN | RAD | TAN |
| 0 | 0.999 | 0.999 | 0.999 | 0.999 | 0.999 | 0.999 | 0.999 | 0.999 | 0.999 | 0.999 | 0.999 | 0.999 |
| 11 | 0.982 | 0.982 | 0.977 | 0.979 | 0.980 | 0.980 | 0.977 | 0.977 | 0.969 | 0.971 | 0.908 | 0.868 |
| 22 | 0.958 | 0.958 | 0.943 | 0.948 | 0.954 | 0.955 | 0.945 | 0.947 | 0.925 | 0.930 | 0.825 | 0.756 |
| 33 | 0.930 | 0.929 | 0.897 | 0.909 | 0.923 | 0.924 | 0.908 | 0.911 | 0.874 | 0.881 | 0.712 | 0.667 |
| 44 | 0.899 | 0.895 | 0.851 | 0.867 | 0.889 | 0.890 | 0.865 | 0.871 | 0.819 | 0.828 | 0.623 | 0.601 |
| 55 | 0.863 | 0.858 | 0.797 | 0.818 | 0.852 | 0.853 | 0.819 | 0.827 | 0.762 | 0.773 | 0.535 | 0.545 |
| 66 | 0.825 | 0.818 | 0.748 | 0.770 | 0.814 | 0.814 | 0.771 | 0.782 | 0.707 | 0.720 | 0.476 | 0.500 |
| 77 | 0.785 | 0.776 | 0.693 | 0.718 | 0.774 | 0.774 | 0.723 | 0.735 | 0.651 | 0.666 | 0.420 | 0.457 |
| 88 | 0.744 | 0.733 | 0.645 | 0.670 | 0.734 | 0.734 | 0.675 | 0.690 | 0.601 | 0.618 | 0.376 | 0.416 |
| 99 | 0.702 | 0.688 | 0.601 | 0.625 | 0.694 | 0.694 | 0.628 | 0.645 | 0.554 | 0.574 | 0.331 | 0.382 |
| 110 | 0.661 | 0.646 | 0.552 | 0.576 | 0.655 | 0.655 | 0.586 | 0.602 | 0.507 | 0.528 | 0.305 | 0.350 |

OPTICAL MODULE

CROSS-REFERENCE TO RELATED APPLICATIONS

This application is the U.S. national stage application of International Patent Application No. PCT/KR2022/012819, filed Aug. 26, 2022, which claims the benefit under 35 U.S.C. § 119 of Korean Application No. 10-2021-0114295, filed Aug. 27, 2021, the disclosures of each of which are incorporated herein by reference in their entirety.

TECHNICAL FIELD

The embodiment relates to an optical module capable of realizing high resolution and miniaturization.

BACKGROUND ART

Camera modules perform the function of photographing objects and saving them as images or videos, and are installed in various applications. In particular, the camera module is manufactured in an ultra-small size and is applied to not only portable devices such as smartphones, tablet PCs, and laptops, but also drones and vehicles, providing various functions.

For example, an optical system of the camera module may include an imaging lens that forms an image, and an image sensor that converts the formed image into an electrical signal. At this time, the camera module may perform an autofocus (AF) function that automatically adjusts a distance between the image sensor and the imaging lens to align the focal length of the lens, and may focus on distant objects through a zoom lens. The zooming function of zoom up or zoom out may be performed by increasing or decreasing the magnification of the camera. In addition, the camera module adopts image stabilization (IS) technology to correct or inhibit image shake caused by camera movement due to an unstable fixation device or the user's movement.

The most important element for this camera module to obtain an image is the imaging lens that forms the image. Recently, interest in high resolution has been increasing, and research using multiple lenses is being conducted to achieve this. In addition, research using a plurality of imaging lenses with positive (+) or negative (−) refractive power is being conducted to realize high resolution.

In addition, recently, as the front display of smartphones equipped with a camera module is required, the form factor of the front camera is continuously changing, and as a result, an under display camera that hides the front camera under the display is being applied.

However, when the camera is placed at the bottom of the display, problems such as deterioration in image quality of the camera module, reduction in brightness, and occurrence of ghosts/flares occur due to loss of light due to the display panel. In particular, as brightness drops to 20% of the existing level, a new optical structure that may compensate for the brightness of the camera is required.

Therefore, an optical system with a new structure that may have improved resolution and improved illuminance regardless of the position of the camera is required.

DISCLOSURE

Technical Problem

The embodiment seeks to provide an optical system that has improved resolution, improved illuminance, and improved optical characteristics and can be miniaturized.

Technical Solution

An optical module according to an embodiment includes a sensor; and an optical system including a first lens, a second lens, a third lens, a fourth lens, a fifth lens, and a sixth lens arranged sequentially along an optical axis from the object side to the sensor side, wherein at least one of the object side surface and the sensor side surface of the fourth lens includes a freeform surface, and the fourth lens satisfies Equation A below, $$|\text{max Sag\_O\_x\_4}| \neq |\text{max Sag\_O\_y\_4}| \quad \text{[Equation A]}$$

(In equation A, max |Sag_O_x_4| means an absolute value of a maximum Sag value in a X-axis direction on the object side surface of the fourth lens, and max |Sag_O_y_4| means an absolute value of a maximum Sag value in a Y-axis direction on the object side surface of the fourth lens.)

The optical system satisfies the following Equations 1 to 3

$$60° \leq FOV \leq 90° \quad \text{[Equation 1]}$$

(FOV in Equation 1 means an angle of view.)

$$0.50 \leq TTL/ImgH \leq 1.0 \quad \text{[Equation 2]}$$

(In Equation 2, TTL means a distance in the optical axis direction from a vertex of the object side surface of the first lens to an image surface of an image sensor unit, and ImgH means twice the diagonal distance from the image surface of the image sensor unit overlapping the optical axis to the 1.0 field region of an image sensor.)

$$\text{CA\_O\_x} < \text{CA\_O\_5} \quad \text{[Equation 3]}$$

(In Equation 3, CA_O_x means an effective diameter of the object side surface of the lens closest to an aperture among the lenses between the aperture and the sensor, and CA_O_5 means an effective diameter of the object side surface of the fifth lens.)

Advantageous Effects

The optical system and camera module according to the embodiment may have improved optical characteristics. In detail, the optical system may have improved aberration characteristics, resolution, etc. as a plurality of lenses have a set shape, refractive power, thickness, interval, etc.

Additionally, the optical system and camera module according to the embodiment may have improved distortion and aberration control characteristics and may have good optical performance not only in a center portion but also in a peripheral region of the field of view (FOV).

Additionally, the optical system according to the embodiment may have improved optical characteristics and a small TTL (Total Track Length), so the optical system and the camera module including the same may be provided in a slim and compact structure.

Additionally, the embodiment includes five lenses sequentially arranged along the optical axis in the direction from the object side to the sensor side, and at least one of the object side surface and sensor side surface of the fourth lens among the five lenses may be formed as a freeform surface.

In detail, at least one of the object side surface and the sensor side surface of the fourth lens may have a Sag value and a change in the Sag value defined by equations, and the free curved shape of at least one of the object side surface or the sensor side surface of the fourth lens may be defined by the Sag value and a change value of the Sag value defined by the above equations.

Accordingly, when light passes through the fourth lens and moves to the image sensor unit, a relative illumination of the light incident on the image sensor unit can be improved. In detail, the relative illumination of the light passing through the fourth lens and incident on the image sensor unit may be 30% or more. In detail, the relative illumination of the light passing through the fourth lens and incident on the image sensor unit may be 35% or more. In detail, the relative illumination of the light passing through the fourth lens and incident on the image sensor unit may be 45% or more.

Accordingly, the camera module including the optical system can compensate for a decrease in the amount of light that may vary depending on the position of the display device. That is, the camera module including the optical system can secure sufficient brightness of light without being affected by the position of the display device, thereby realizing improved resolution.

Therefore, the optical system according to the embodiment can increase the amount of light incident on the image sensor unit while maintaining the size of the lenses and improved optical characteristics without enlarging an aperture of the lenses, in order to increase the amount of light incident on the image sensor unit.

Additionally, the optical module according to the embodiment can implement miniaturization of the optical system and optical module by using a fourth lens having a freeform surface.

In detail, the optical module according to the embodiment can improve the relative illumination while reducing the size of the optical system and optical module.

If there is no fourth lens including a freeform surface, the TTL (distance in the optical axis direction of the first lens and the image sensor unit) of the optical system must be increased to improve the relative illumination, but the optical module according to the embodiment can improve the relative illumination without increasing TTL by controlling the direction of movement of light by a fourth lens including a freeform surface.

That is, the optical module according to the embodiment can reduce a size of TTL by 10% to 20% compared to an optical module that does not include a fourth lens including a freeform surface. Accordingly, the optical module can be miniaturized, and the optical module can be easily applied to various display devices.

Additionally, the optical module according to the embodiment may have an improved MTF and improved resolution by a fourth lens having a freeform surface.

In detail, the optical module according to the embodiment may have improved MTF characteristics by increasing the amount of light incident on the image sensor unit to the fourth lens having a freeform surface.

In addition, the optical module according to the embodiment improves the relative illumination of the light incident on the image sensor unit, thereby inhibiting a decrease in resolution due to post-processing after image acquisition.

In other words, an optical module that does not include a lens with a freeform surface has a low relative illumination of the image sensor unit, so a post-processing process is required to obtain the image through the image sensor unit and then adjust the image size to be implemented. Accordingly, the resolution of the optical module may deteriorate during this post-processing process.

However, the optical module according to the embodiment increases the relative illumination of the image sensor unit by using a lens having a freeform surface, and as a result, post-processing is not required or resolution is not significantly reduced due to the post-processing process, so it may have improved resolution.

DESCRIPTION OF DRAWINGS

FIGS. 2 and 3 are diagrams for explaining an object side surface of an optical system and a fourth lens of an optical module according to an embodiment.

FIGS. 4 and 5 are diagrams for explaining a sensor side surface of an optical system and a fourth lens of an optical module according to an embodiment.

FIG. 6 is a graph for explaining Sag values at various angles of the optical system and the fourth lens of the optical module according to the embodiment.

FIG. 7 is a diagram for explaining a slope angle of the lens of the optical system and the optical module according to the embodiment.

FIG. 9 is a table for explaining the lenses of the optical system and optical module according to the first embodiment.

FIG. 10 is a table explaining the optical system and the fourth lens of the optical module according to the first embodiment.

FIGS. ***11a*-*11c*** are tables explaining the optical system and the fourth lens of the optical module according to the embodiment.

FIG. 12 is a table explaining specific values of the optical system and optical module according to the first embodiment.

FIGS. 13 to 17 are tables for explaining the slope angle, interval, thickness, Sag value, and aspheric coefficient of the lenses of the optical system and optical module according to the first embodiment.

Figure 18:
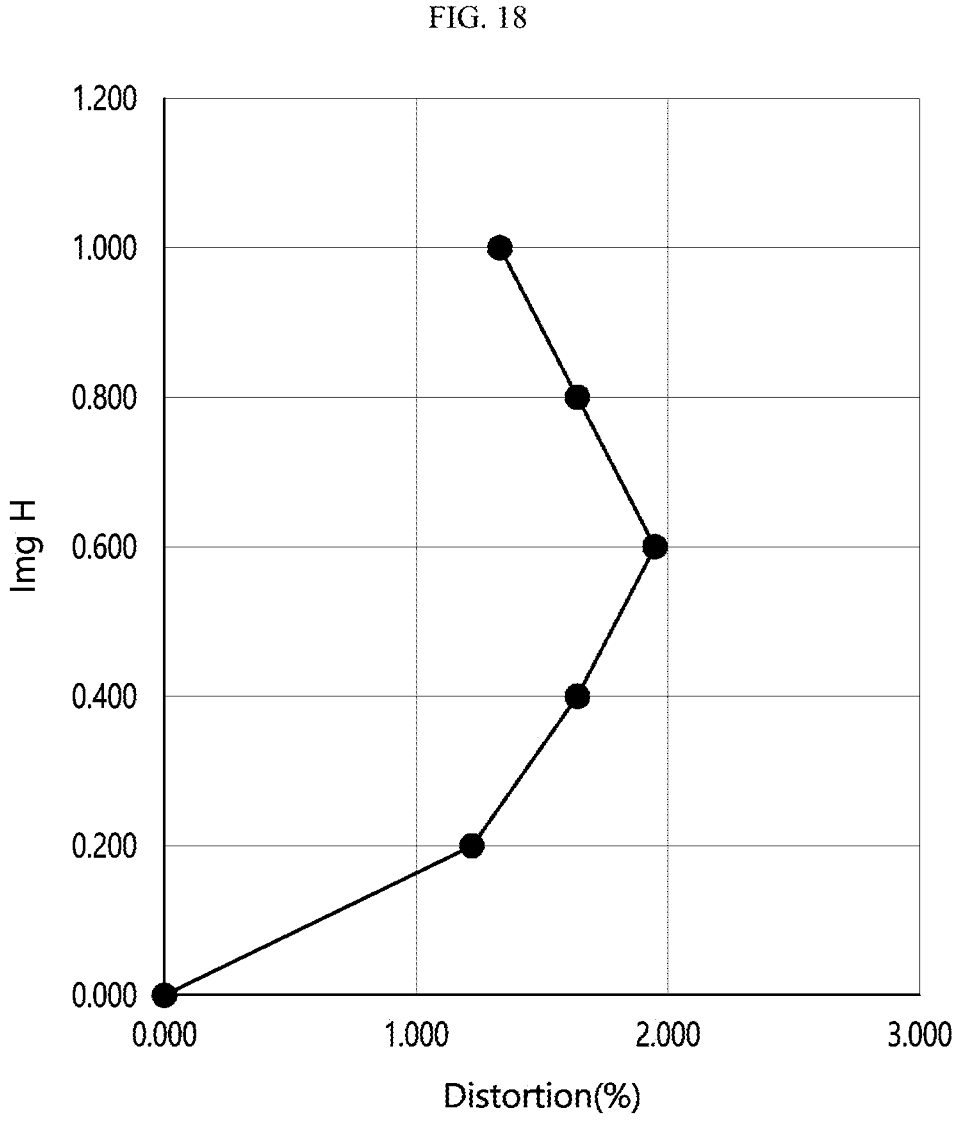

FIG. 18 is a graph showing distortion of the optical system and optical module according to the first embodiment.

FIG. 19 is a table explaining the MTF characteristics of the optical system and optical module according to the first embodiment.

Figure 20:
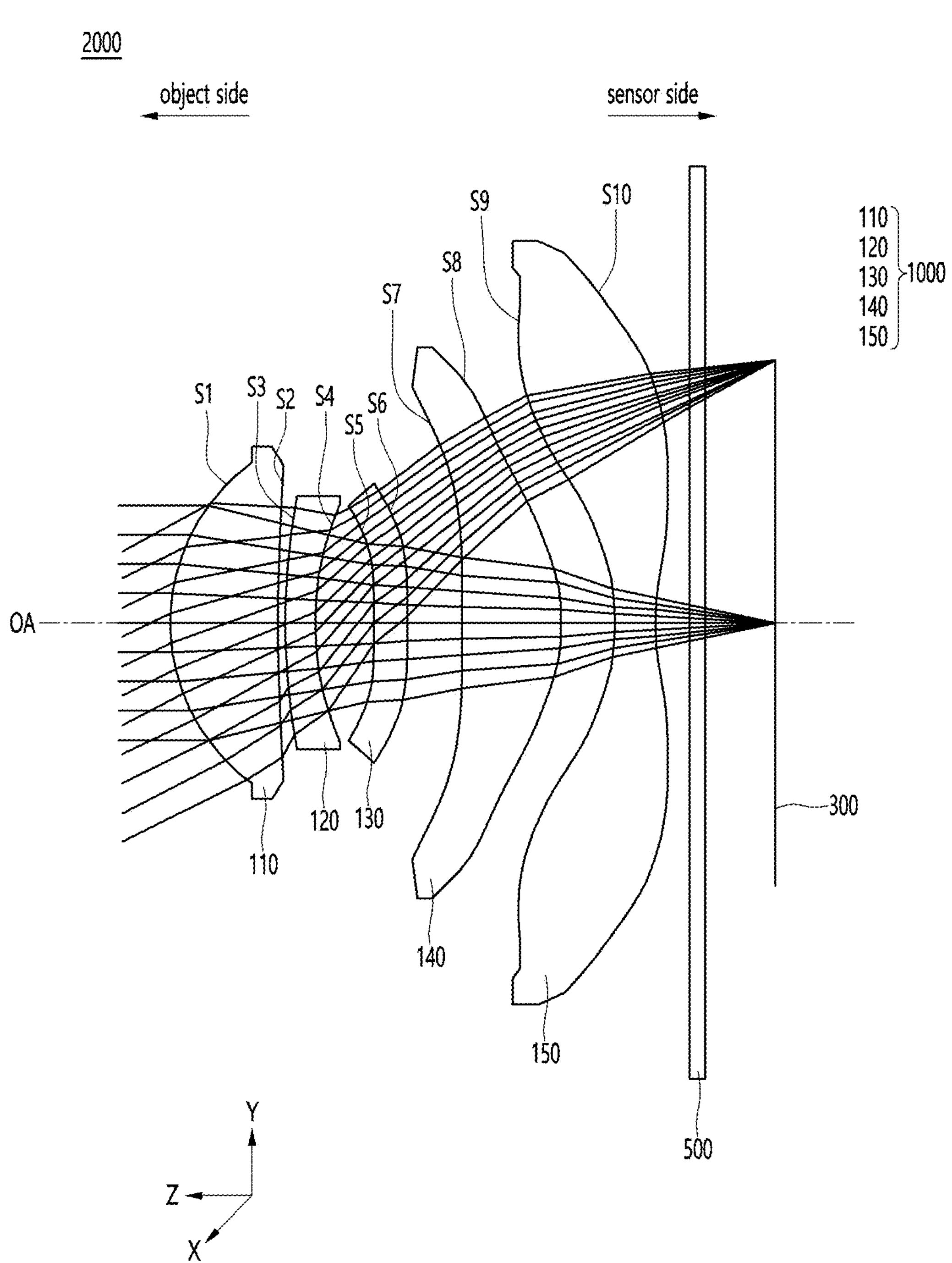

FIG. 20 is a diagram showing the configuration of an optical system and an optical module according to the second embodiment.

FIG. 21 is a table for explaining the lenses of the optical system and optical module according to the second embodiment.

FIG. 22 is a table explaining the optical system and the fourth lens of the optical module according to the second embodiment.

FIG. 23 is a table explaining specific values of the optical system and optical module according to the second embodiment.

FIGS. 24 to 28 are tables explaining the slope angle, interval, thickness, Sag value, and aspherical coefficient of the lenses of the optical system and optical module according to the second embodiment.

Figure 29:
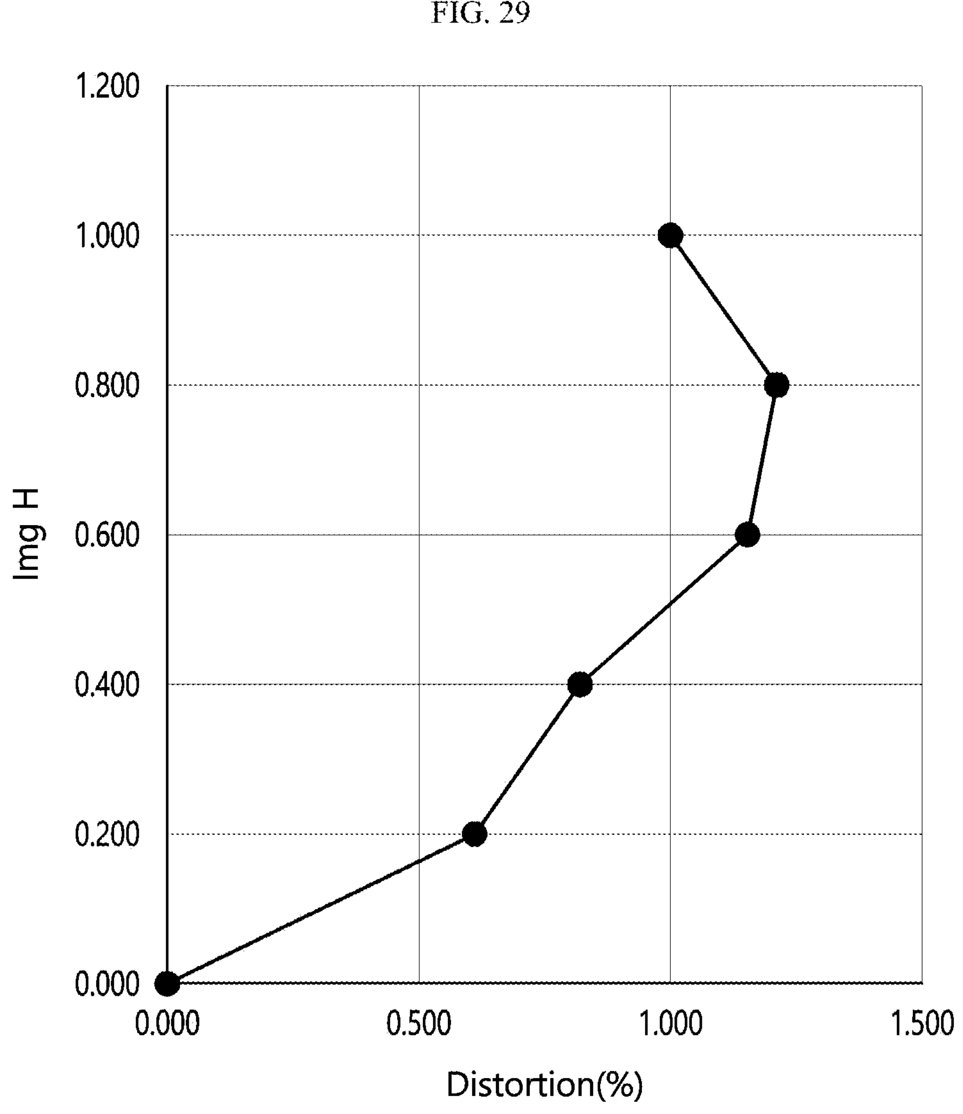

FIG. 29 is a graph showing distortion of the optical system and optical module according to the second embodiment.

FIG. 30 is a table explaining the MTF characteristics of the optical system and optical module according to the second embodiment.

Figure 31:
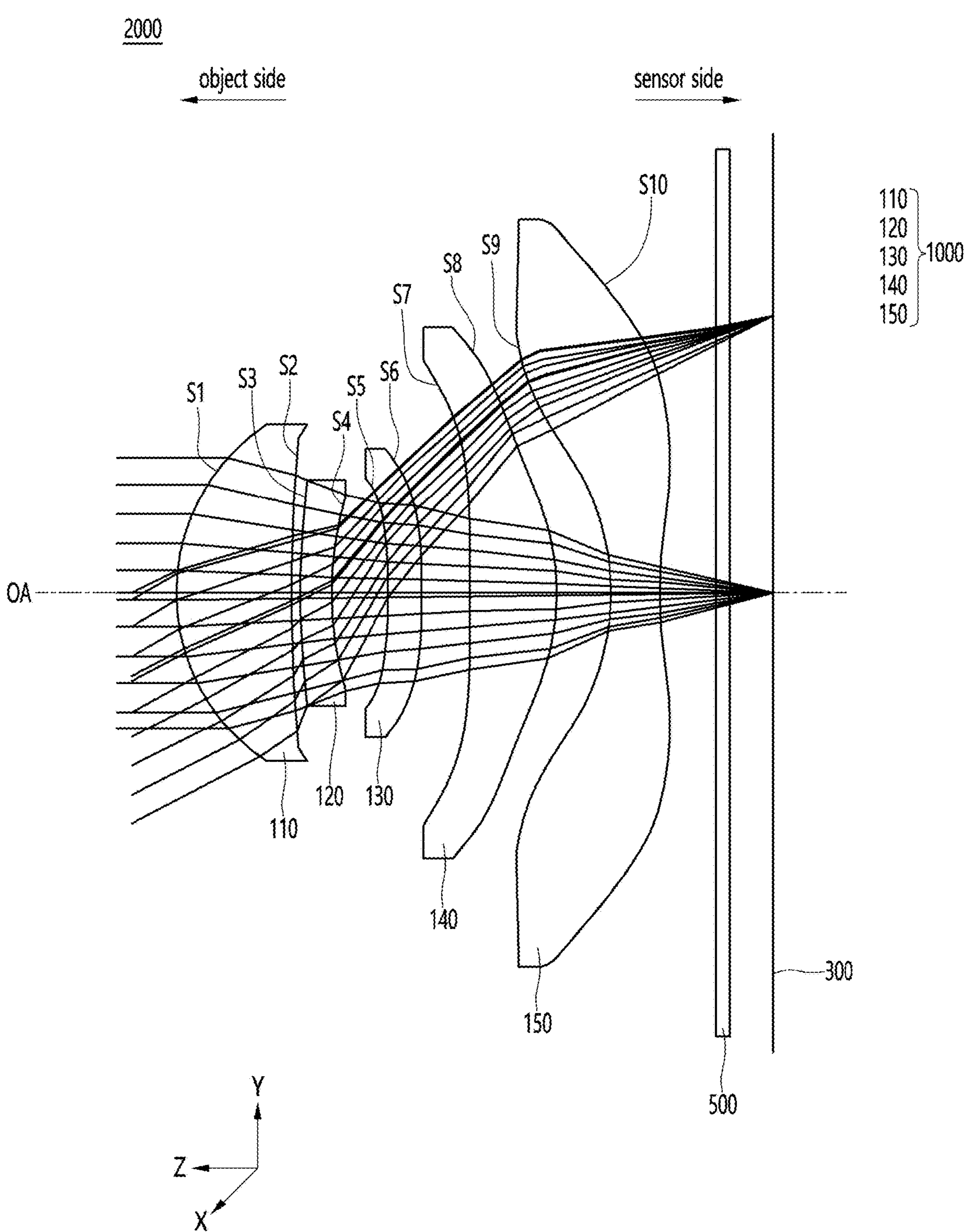

FIG. 31 is a diagram showing the configuration of an optical system and an optical module according to the third embodiment.

FIG. 32 is a table for explaining the lenses of the optical system and optical module according to the third embodiment.

FIG. 33 is a table explaining the optical system and the fourth lens of the optical module according to the third embodiment.

FIG. 34 is a table explaining specific values of the optical system and optical module according to the third embodiment.

FIGS. 35 to 39 are tables explaining the slope angle, interval, thickness, Sag value, and aspherical coefficient of the lenses of the optical system and optical module according to the third embodiment.

Figure 40:
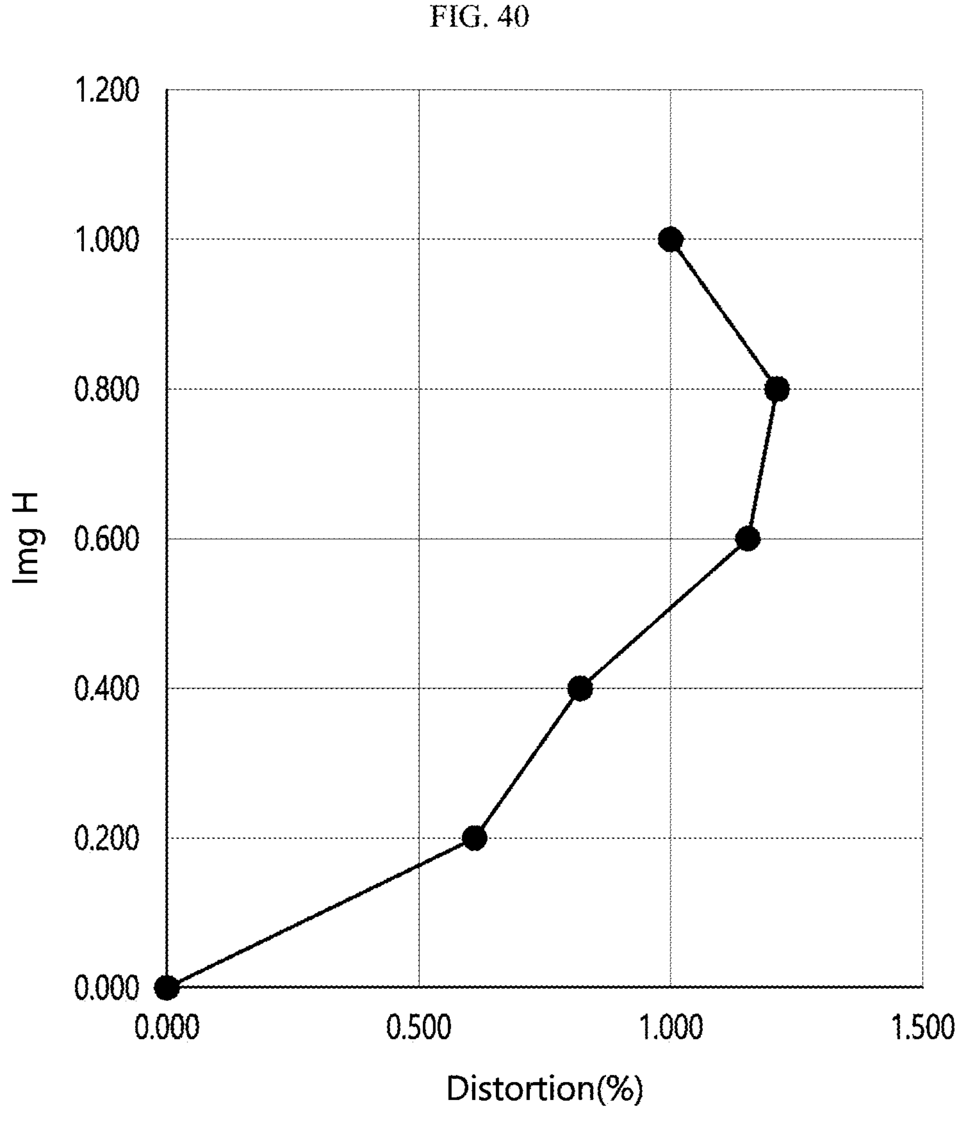

FIG. 40 is a graph showing distortion of the optical system and optical module according to the third embodiment.

Figures 41, 42:
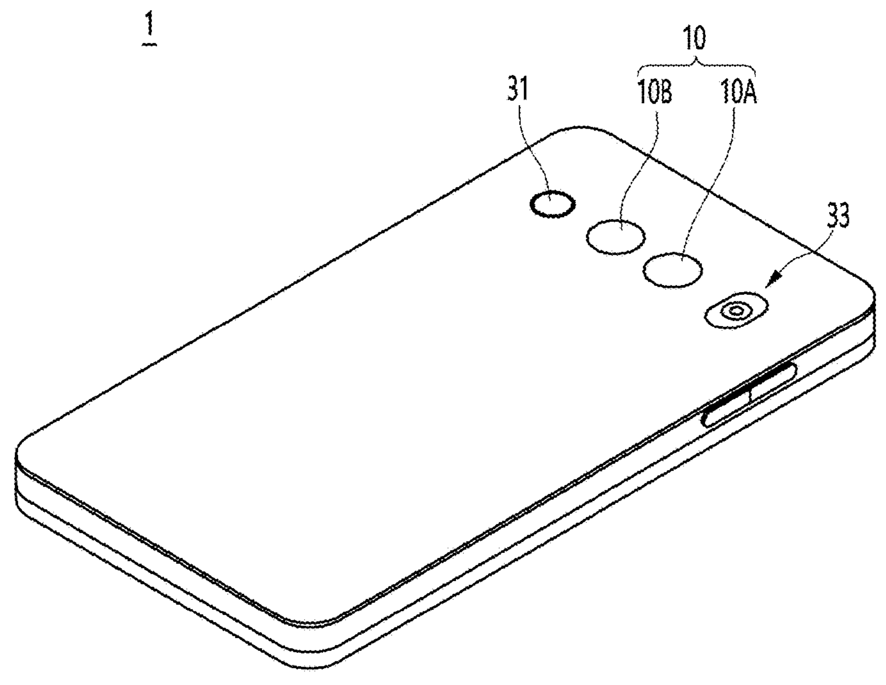

FIG. 41 is a table explaining the MTF characteristics of the optical system and optical module according to the third embodiment.

Figure 43:
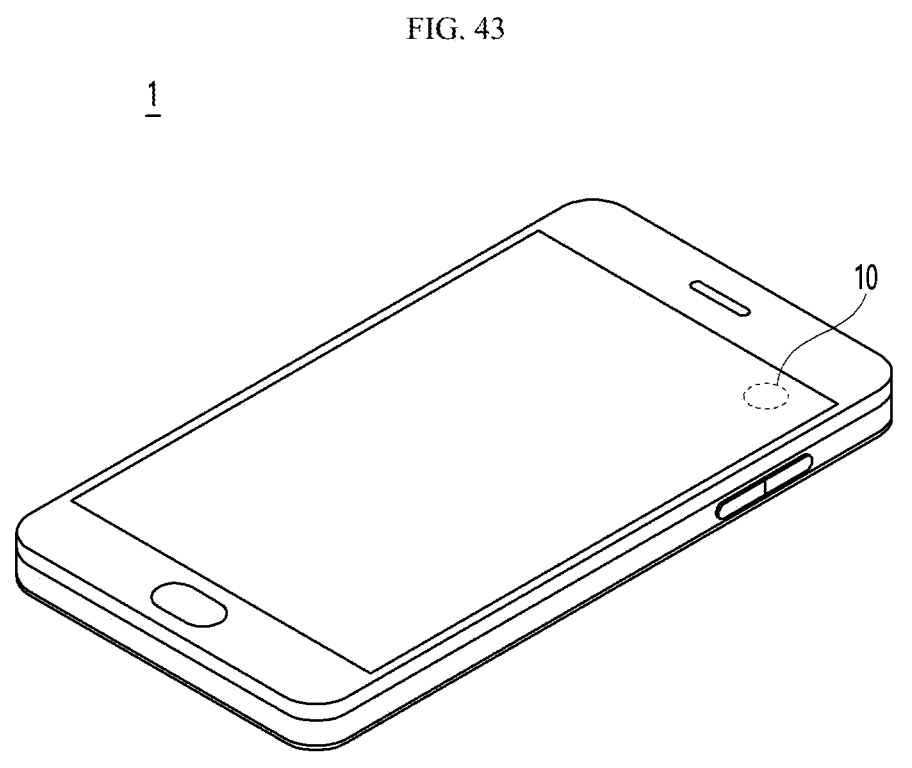

FIGS. 42 and 43 are diagrams for explaining a display device to which an optical system and an optical module are applied according to an embodiment.

MODE FOR INVENTION

Hereinafter, preferred embodiments of the invention will be described in detail with reference to the accompanying drawings.

A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. The terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is “connected”, “coupled” or “joined” to another component, the description may include not only being directly connected, coupled or joined to the other component but also being “connected”, “coupled” or “joined” by another component between the component and the other component.

In the case of being described as being formed or disposed “above (on)” or “below (under)” of each component, the description includes not only when two components are in direct contact with each other, but also when one or more other components are formed or disposed between the two components. In addition, when expressed as “above (on)” or “below (under)”, it may refer to a downward direction as well as an upward direction with respect to one element.

In the following description, the first lens refers to the lens closest to the object side, and the last lens (n-th lens) refers to the lens closest to the sensor side. Additionally, unless otherwise specified, the units for lens radius, effective diameter, thickness, interval, BFL (Back focal length), TTL (Total track length or Total top length), etc. are all mm.

Additionally, a shape of the lens is expressed based on the optical axis of the lens. For example, the fact that the object-side surface of the lens is convex means that a vicinity of the optical axis on the object-side surface of the lens is convex, and does not mean that a periphery of the optical axis is convex. Therefore, even if the object-side surface of the lens is described as convex, the periphery region of the optical axis on the object-side surface of the lens may be concave. In addition, “object-side surface” may refer to a surface of the lens facing the object side based on the optical axis, and “sensor side surface (image side surface) may be defined as a surface of the lens facing the imaging surface based on the optical axis.

Additionally, the critical point of the lens is defined as the point on the lens surface that becomes 0 during the first differentiation. In detail, the critical point means a point at which the sign of the slope value for the optical axis OA and the direction perpendicular to the optical axis OA changes from positive (+) to negative (−) or from negative (−) to positive (+), where the slope value is 0. Here, the critical point is the point where convexity and concavity change, and may mean the point where the sign changes from positive (+) to negative (−) or from negative (−) to positive (+) during the second differentiation. The critical point may be a point where the sign of refractive power changes. The critical point may be a point where the sign of the slope angle changes.

Additionally, the Sag value of the object side surface of the lens may be defined as the distance in the optical axis direction between an arbitrary point on the object side surface of the lens and the point of contact between the optical axis and the object side surface of the lens. Additionally, the Sag value of the sensor side surface of the lens may be defined as the distance in the optical axis direction between an arbitrary point on the sensor side surface of the lens and the contact point between the optical axis and the sensor side surface of the lens.

Additionally, a size of the Sag value described below may be compared based on the absolute value of the Sag value.

In addition, in the X-axis (first direction), Y-axis (second direction), and Z-axis direction (third direction) shown in the drawing, the Z-axis direction (third direction) may refer to an optical axis direction or a direction parallel to the optical axis direction.

Hereinafter, for convenience of explanation, the X-axis direction (first direction) is defined as a direction perpendicular to the Z-axis direction (third direction) on the same plane, and the Y-axis direction (second direction) may be defined as a direction perpendicular to the Z-axis direction (third direction) in a different plane.

Additionally, the X-axis direction (first direction), the Y-axis direction (second direction), and the Z-axis direction (third direction) may be defined as vertical directions in the same plane or another plane.

Hereinafter, an optical system, an optical module including the optical system, and a camera module including the optical system and the optical module according to embodiments will be described with reference to the drawings.

Figure 1:
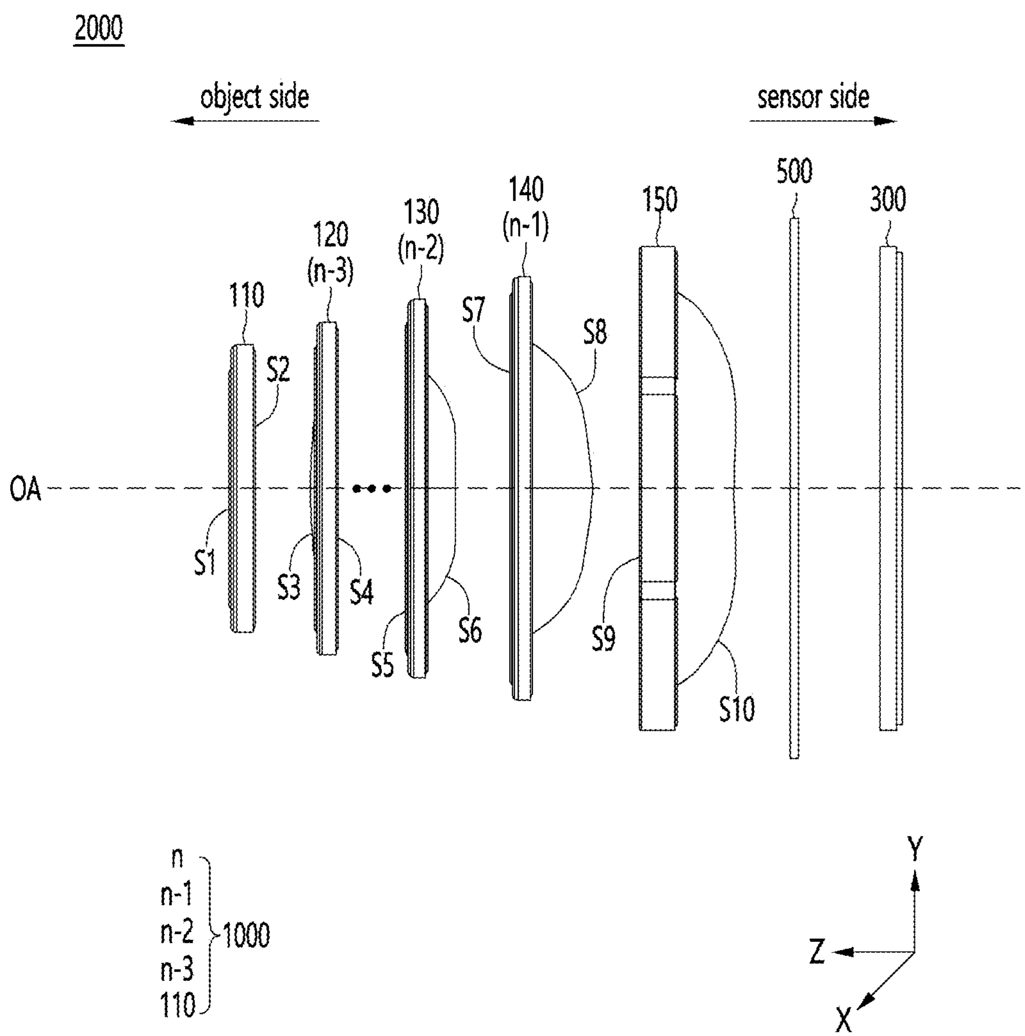
FIG. 1 is a diagram showing the configuration of an optical system and an optical module according to an embodiment.

Referring to FIG. 1, an optical system 1000 according to an embodiment may include a plurality of lenses. For example, the optical system 1000 may include n lenses. In detail, the optical system 1000 may include a first lens 110 to an n-th lens (n).

In detail, the optical system 1000 may include the first lens 110 to the nth lens (n) sequentially arranged from the object side to the sensor side. At this time, n may include a natural number of 2 or more. In detail, n may be a natural number having a value of 2 to 5.

FIG. 1 show that the optical system 1000 according to the embodiment includes five lenses such as a first lens 110, a second lens 120, a third lens 130, a fourth lens 140, a fifth lens 150, but the embodiment is no limited to this, and the optical system 1000 may include two to four lenses.

That is, when n has a value of 5 in the optical system 1000 according to the embodiment, the optical system 1000 may include a first lens, a second lens, a third lens, a fourth lens, and a fifth lens. That is, if n has a value of 5, a n−4th lens may be the first lens, and a n−3th lens may be the second lens, a n−2th lens may be the third lens, and a n−1th lens may be the fourth lens, and the n-th lens may be the fifth lens.

Hereinafter, for convenience of explanation, it will be mainly described that the optical system 1000 according to the embodiment includes five lenses, a first lens 110, a second lens 120, a third lens 130, a fourth lens 140 and a fifth lens 150.

Referring to FIG. 1, the optical system 1000 may further include an image sensor unit 300 and a filter unit 500 to form an optical module 2000.

That is, the optical module 200 may include an optical system 1000 including n lenses described above, and a filter unit 500 and an image sensor unit 300 disposed in the sensor side direction of the optical system.

The first lens 110, the second lens 120, the third lens 130, the fourth lens 140, and the fifth lens 150 may be sequentially arranged along the optical axis OA of the optical system 1000.

Light corresponding to information of the object disposed on the object side may sequentially pass through the first lens 110, the second lens 120, the third lens 130, the fourth lens 140, and the fifth lens 150 and the filter unit 500 and be incident on the image sensor unit 300.

The first lens 110, the second lens 120, the third lens 130, the fourth lens 140, and the fifth lens 150 may each include an effective region and a non-effective region. The effective region may be an effective diameter through which light incident on each lens of the first lens 110, the second lens 120, the third lens 130, the fourth lens 140, and the fifth lens 150 passes. That is, the effective region may be defined as a region in which the incident light is refracted to realize optical characteristics.

The effective diameter (effective region) of the lens may be related to an inner diameter of a spacer disposed between the lenses. That is, the effective diameter of the lens may be related to the inner diameter of the spacer disposed between surfaces of adjacent lenses.

In detail, the effective diameter of the lens may be the same as or different from the inner diameter of the spacer disposed between the surfaces of adjacent lenses. More specifically, the effective diameter of the lens may be less than or greater than the inner diameter of the spacer disposed between the surfaces of adjacent lenses.

More specifically, the effective diameter of the lens may have a size within ±0.4 mm of the inner diameter of the spacer disposed between the surfaces of adjacent lenses. More specifically, the effective diameter of the lens may have a size within ±0.3 mm of the inner diameter of the spacer disposed between the surfaces of adjacent lenses. More specifically, the effective diameter of the lens may have a size within ±0.2 mm of the inner diameter of the spacer disposed between the surfaces of adjacent lenses. More specifically, the effective diameter of the lens may have a size within ±0.1 mm of the inner diameter of the spacer disposed between the surfaces of adjacent lenses.

Alternatively, the effective diameter of the lens may be related to the inner diameter of a flange portion of the lens on which the spacer is supported.

In detail, the effective diameter may be 2 mm or less, 1 mm or less, or 0.3 mm or less relative to the inner diameter of the flange portion.

The non-effective region may be arranged around the effective region. The non-effective region may be arranged on the periphery of the effective region. That is, a region excluding the effective region of the lens may be a non-effective region. The non-effective region may be a region where the light is not incident. That is, the non-effective region may be a region unrelated to the optical characteristics. Additionally, the non-effective region may be a region fixed to a barrel (not shown) that accommodates the lens.

The optical system 1000 according to the embodiment may include an aperture (or aperture stop) (not shown) to control the amount of incident light. At least one aperture may be disposed between two adjacent lenses among the first lens 110, the second lens 120, the third lens 130, the fourth lens 140, and the fifth lens 150. For example, the aperture may be disposed between the first lens 110 and a lens closest to the first lens 110. For example, the aperture may be disposed between the first lens 110 and the second lens 120.

In addition, at least one lens among the first lens 110, the second lens 120, the third lens 130, the fourth lens 140 and the fifth lens 150 may serve as an aperture. For example, the object side or sensor side of at least one of the first lens, the second lens, the third lens, the fourth lens or the fifth lenses 150 may function as an aperture to adjust the amount of light. Accordingly, the overall length of the optical system can be reduced by removing the aperture disposed between the lenses, thereby making it possible to miniaturize the optical system.

At least one lens among the first lens 110, the second lens 120, the third lens 130, the fourth lens 140 and the fifth lens 150 may include a freeform surface on at least one surface of the lens. That is, at least one lens among the first lens 110, the second lens 120, the third lens 130, the fourth lens 140, or the fifth lens 150 may be a freeform lens.

A freeform lens in which at least one surface of the lens has a freeform surface will be described in detail below.

The first lens 110 may have positive (+) refractive power on the optical axis. The first lens 110 may include plastic or glass. For example, the first lens 110 may be made of plastic.

The first lens 110 may include a first surface S1 defined as an object side surface and a second surface S2 defined as a sensor side surface. The first surface S1 may be convex with respect to the object side surface on the optical axis, and the second surface S2 may be concave with respect to the sensor side surface on the optical axis. That is, the first lens 110 may overall have a meniscus shape convex from the optical axis toward the object side.

At least one of the first surface S1 or the second surface S2 may be an aspherical surface. For example, both the first surface S1 and the second surface S2 may be aspherical.

The first lens 110 may include a critical point. In detail, at least one of the first surface S1 or the second surface S2, which are the object side surface and the sensor side surface of the first lens 110, may include a critical point. For example, the second surface S2 of the first lens 110 may include a critical point.

In the first lens 110, the effective diameter of the first surface S1 of the first lens 110 on the object side may be different from the effective diameter of the second surface S2 on the sensor side. For example, the effective diameter of the first side S1 of the first lens 110 may be larger than the effective diameter of the second side S2.

The second lens 120 may have negative refractive power on the optical axis. The second lens 120 may include plastic or glass. For example, the second lens 120 may be made of plastic.

The second lens 120 may include a third surface S3 defined as the object side surface and a fourth surface S4 defined as the sensor side surface. The third surface S3 may be convex with respect to the object side surface on the optical axis, and the fourth surface S4 may be concave with respect to the sensor side surface on the optical axis. That is, the second lens 120 may overall have a meniscus shape convex from the optical axis toward the object side.

At least one of the third surface S3 or the fourth surface S4 may be an aspherical surface. For example, both the third surface S3 and the fourth surface S4 may be aspherical.

An effective diameter of the third surface S3 of the second lens 120 on the object side may be different from an effective diameter of the fourth surface S4 on the sensor side. For example, the effective diameter of the third surface S3 of the second lens 120 may be larger than the effective diameter of the fourth surface S4.

The third lens 130 may have positive (+) or negative (−) refractive power on the optical axis. The third lens 130 may include plastic or glass. For example, the third lens 130 may be made of plastic.

The third lens 130 may include a fifth surface S5 defined as an object side surface and a sixth surface S6 defined as a sensor side surface. The fifth surface S5 may be convex with respect to the object side surface on the optical axis, and the sixth surface S6 may be concave with respect to the sensor side surface on the optical axis. That is, the third lens 130 may have an overall meniscus shape convex from the optical axis toward the object side. Alternatively, the fifth surface S5 may be convex with respect to the object side surface on the optical axis, and the sixth surface S6 may be convex with respect to the sensor side surface on the optical axis. That is, the third lens 130 may have an overall shape in which both sides are convex on the optical axis. Alternatively, the fifth surface S5 may be concave with respect to the object side surface on the optical axis, and the sixth surface S6 may be concave with respect to the sensor side surface on the optical axis. That is, the third lens 130 may have an overall shape where both sides are concave on the optical axis. Alternatively, the fifth surface S5 may be concave with respect to the object side surface on the optical axis, and the sixth surface S6 may be convex with respect to the sensor side surface on the optical axis. That is, the third lens 130 may overall have a meniscus shape convex from the optical axis toward the sensor side.

At least one of the fifth surface S5 or the sixth surface S6 may be an aspherical surface. For example, both the fifth surface S5 and the sixth surface S6 may be aspherical.

An effective diameter of the fifth surface S5 of the third lens 130 on the object side may be different from an effective diameter of the sixth surface S6 on the sensor side. For example, the effective diameter of the fifth surface S5 of the third lens 130 may be smaller than the effective diameter of the sixth surface S6.

The fourth lens 140 may have positive (+) refractive power on the optical axis. The fourth lens 140 may include plastic or glass. For example, the fourth lens 140 may be made of plastic.

The fourth lens 140 may include a seventh surface S7 defined as an object side surface and an eighth surface S8 defined as a sensor side surface. The seventh surface S7 may be concave with respect to the object side surface on the optical axis, and the tenth surface S10 may be convex with respect to the sensor side surface on the optical axis. That is, the fourth lens 140 may have an overall meniscus shape convex from the optical axis toward the sensor side.

At least one of the seventh surface S7 or the eighth surface S8 may be a freeform surface. That is, the fourth lens 140 may be a freeform lens.

The fourth lens 140 may include a critical point. In detail, at least one of the seventh surface S7 or eighth surface S8, which are the object side surface and the sensor side surface of the fourth lens 140, may include a critical point. For example, the seventh surface S7 of the fourth lens 140 may include a critical point.

An effective diameter of the seventh surface S7 of the fourth lens 140 on the object side may be different from an effective diameter of the eighth surface S8 on the sensor side. For example, the effective diameter of the seventh surface S7 of the fourth lens 140 may be smaller than the effective diameter of the eighth surface S8.

The fourth lens, which is a freeform lens, will be described in detail below.

The fifth lens 150 may have negative (−) refractive power at the optical axis. The fifth lens 150 may include plastic or glass. For example, the fifth lens 150 may be made of plastic.

The fifth lens 150 may include a ninth surface S9 defined as an object side surface and a tenth surface S10 defined as a sensor side surface. The ninth surface S9 may be concave with respect to the object side surface on the optical axis, and the tenth surface S10 may be concave with respect to the sensor side surface on the optical axis. That is, the fifth lens 150 may have an overall shape where both sides are concave on the optical axis.

At least one of the ninth surface S9 or the tenth surface S10 may be an aspherical surface. For example, the ninth surface S9 and the tenth surface S10 may both be aspherical surfaces.

The fifth lens 150 may include a critical point. In detail, at least one of the ninth surface S9 or the tenth surface S10, which are the object side surface and the sensor side surface of the fifth lens 150, may include a critical point. For example, the ninth surface S9 and the tenth surface S10 of the fifth lens 150 may include a critical point.

An effective diameter of the ninth surface S9 on the object side of the fifth lens 150 may be different from an effective diameter of the tenth surface S10 on the sensor side. For example, the effective diameter of the ninth surface S9 of the fifth lens 150 may be smaller than the effective diameter of the tenth surface S12.

As previously described, at least one lens among the first lens 110, the second lens 120, the third lens 130, the fourth lens 140, or the fifth lens 150 may be formed in a freeform shape.

For example, among the lenses of the optical system 1000, a lens disposed close to the image sensor unit 300 may be formed in a freeform shape. For example, the fourth lens 140 may be formed in a freeform shape. That is, when the optical system 1000 includes n lenses, the n−1th lens may be formed in a freeform shape.

For convenience of explanation, it will be mainly described that the fourth lens 140 is a freeform lens.

At least one of the seventh surface S7 or the eighth surface S8 of the fourth lens 140 may be formed in a freeform shape. In detail, at least one of the seventh surface S7 or the eighth surface S8 may include a freeform surface. For example, the fourth lens 140 has one of the seventh surface S7 and the eighth surface S8 having a freeform surface, or both the seventh surface S7 and the eighth surface S8 may have freeform surfaces.

The fourth lens 140 may have a double plane symmetrical shape. In detail, the fourth lens 140 may have a shape that is symmetrical to the X-Z plane and symmetrical to the Y-Z plane. Additionally, the fourth lens 140 may have a shape that is asymmetrical to the X-Y plane. That is, the fourth lens 140 may have a symmetrical shape in the X and Y axes and an asymmetrical shape in the Z axis.

Figure 3:
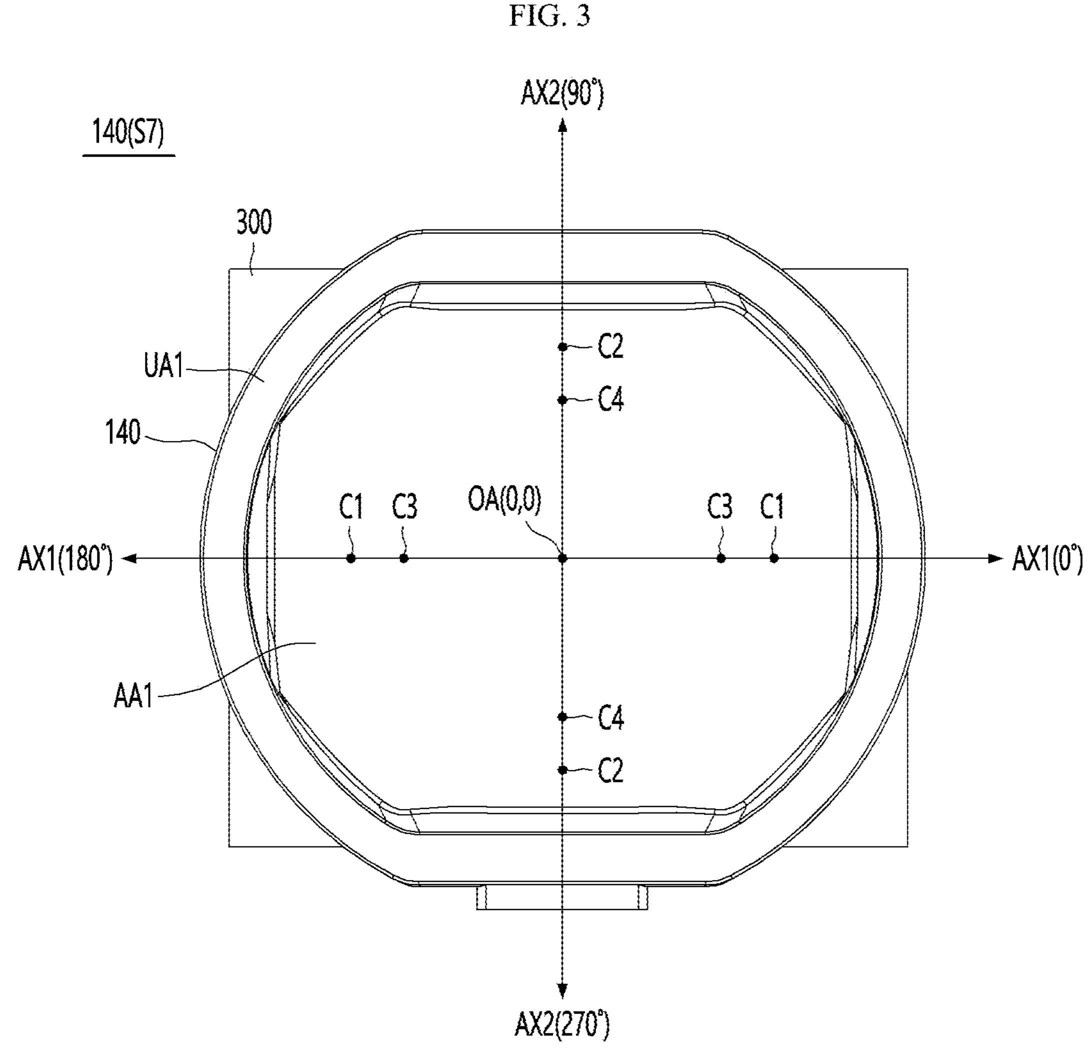

FIGS. 2 and 3 are diagrams for explaining the freeform surface of the seventh surface S7 of the fourth lens 140.

Referring to FIG. 2, the seventh surface S7 of the fourth lens 140 may include a first effective region AA1 and a first non-effective region UAL. In detail, the seventh surface S9 of the fourth lens 140 may include the first effective region AA1, which is a region through which light incident on the fourth lens 140 passes. Light incident on the fourth lens 140 may be refracted in the first effective region AA1 of the seventh surface S7 of the fourth lens 140 to implement optical characteristics.

Additionally, the seventh surface S7 of the fourth lens 140 may include a first non-effective region UA1, which is a region through which light incident on the fourth lens 140 does not pass. Light incident on the fourth lens 140 may not pass through the first non-effective region UA1 of the fourth lens 140. Accordingly, the first non-effective region UA1 of the seventh surface S7 may be unrelated to the optical characteristics of light incident on the fourth lens 140. Additionally, some regions of the first non-effective region UA1 may be fixed to the barrel accommodating the fourth lens 140.

Referring to FIG. 3, a virtual axis for setting the coordinates of the seventh surface S7 of the fourth lens 140 may be set.

In detail, a first axis AX1 and a second axis AX2 may be set on the seventh surface S7 of the fourth lens 140. The first axis AX1 may be defined as a direction parallel to the longitudinal direction of the long axis of the image sensor unit 300. That is, the first axis AX1 may be defined as an axis that passes through the optical axis OA and extends in a direction parallel to the long axis of the image sensor unit 300.

Additionally, the second axis AX2 may be defined as a direction parallel to a minor axis longitudinal direction of the image sensor unit 300. That is, the second axis AX2 may be defined as an axis that passes through the optical axis OA and extends in a direction parallel to the minor axis of the image sensor unit 300.

For example, the first axis AX1 may be defined as the X-axis direction and may be defined as an axis having angles of 0° and 180° with respect to the optical axis OA. Additionally, the second axis AX2 may be defined as the Y-axis direction and may be defined as an axis having angles of 90° and 270° with respect to the optical axis OA.

However, the embodiment is not limited to this, and the first axis may be defined as the Y-axis direction, and the second axis may be defined as the X-axis direction. Hereinafter, for convenience of explanation, the description will focus on the case where the first axis AX1 is defined in the X-axis direction and the second axis AX2 is defined in the Y-axis direction.

The first axis AX1 and the second axis AX2 may be perpendicular to each other. That is, the first axis AX1 and the second axis AX2 may be perpendicular to each other in the optical axis OA. Accordingly, the first axis AX1 may be perpendicular to the optical axis OA. Additionally, the second axis AX2 may be perpendicular to the optical axis OA. That is, the optical axis OA, the first axis AX1, and the second axis AX2 may be perpendicular to each other.

A plurality of coordinates may be set on the seventh surface S7 of the fourth lens 140, respectively, on the first axis AX1 and the second axis AX2.

In detail, the seventh surface S7 of the fourth lens 140 may have a first coordinate C1 and a third coordinate C3 set on the first axis AX1. In detail, the seventh surface S7 of the fourth lens 140 may be set to a first coordinate C1 with a coordinate of (±A, 0) and a third coordinate C3 with a coordinate of (±B, 0) on the first axis AX1.

In addition, the seventh surface S7 of the fourth lens 140 has a first Sag value S1 at the first coordinate C1, and may have a third Sag value S3 at the third coordinate C3.

Additionally, the seventh surface S7 of the fourth lens 140 may have a second coordinate C2 and a fourth coordinate C4 set on the second axis AX2. In detail, the ninth surface S9 of the fourth lens 140 may be set to a second coordinate C2 with a coordinate of (0, ±A) and a fourth coordinate C4 with a coordinate of (0, ±B) on the second axis AX2.

The seventh surface S7 of the fourth lens 140 may have a second Sag value S2 at the second coordinate C2 and a fourth Sag value S4 at the fourth coordinate C4.

At this time, the fourth lens may satisfy the following equations A to I:

$$|\text{max Sag\_o\_x\_4}| \neq |\text{max Sag\_O\_y\_4}| \quad \text{[Equation A]}$$

(In equation A, max |Sag_O_x_4| means an absolute value of a maximum Sag value in a X-axis direction on the object side surface of the fourth lens, and max |Sag_O_y_4| means an absolute value of a maximum Sag value in a Y-axis direction on the object side surface of the fourth lens.)

$$1um \leq \max|Sag\_O\_x\_4| - \max|Sag\_O\_y\_4| \leq 20um \text{ or, } 3um \leq \max|Sag\_O\_x\_4| - \max|Sag\_O\_y\_4| \leq 15um \text{ or, } 4um \leq \max|Sag\_O\_x\_4| - \max|Sag\_O\_y\_4| \leq 10um \quad \text{[Equation B]}$$

$$|S2 - S1| > |S4 - S3| \quad |A| > |B| \quad |S4 - S3| \leq 10um \text{ or } |S4 - S3| \leq 5um \text{ or } |S4 - S3| \leq 1um \quad \text{[Equation C]}$$

In Equation C, each formula may be independent, or multiple formulas may be combined with each other.

In other words, the difference between the Sag values on the first axis and the Sag values on the second axis at coordinates that are located further away from the optical axis (0, 0) on the seventh surface S7 of the fourth lens 140 may be greater than the difference between the Sag values on the first axis and the Sag values on the second axis at coordinates that are located closer to the optical axis (0, 0).

That is, as the seventh surface S7 of the fourth lens 140 moves away from the optical axis (0, 0), the difference between the Sag value on the first axis and the Sag value on the second axis may increase.

A range of the |S4–S3| values and the |S2 –S1| values may be related to the amount of light passing through the fourth lens and incident on the image sensor unit and the optical characteristics of the optical system.

In addition, when the |S2–S1| is set to a value exceeding the |S4–S3|, that is, when |S2–S1| exceeds 10 um, 5 um, or 1 um, the amount of light passing through the fourth lens 140 and incident on the image sensor unit may increase. Accordingly, the relative illumination RI of the image sensor unit may be increased to 35% or more, and improved optical characteristics may be achieved. That is, the optical system including the fourth lens may have improved MTF characteristics. Additionally, resolution may be improved by increasing the amount of light incident on the image sensor unit.

Here, the relative illumination of the image sensor unit may be defined as a relative ratio of the illuminance in the darkest region to the illuminance in the brightest region among the plurality of regions of the image sensor unit. That is, the relative illumination of 35% or more may mean that the illuminance in the darkest region of the image sensor unit is 35% or more of the illuminance in the brightest region of the image sensor unit.

However, when |S4 –S3| is set to a value exceeding 10 um, the amount of light passing through the fourth lens 140 and incident toward the image sensor unit may decrease, or the MTF characteristics of the entire optical system may deteriorate, thereby deteriorating optical characteristics.

That is, if |S4–S3| of the fourth lens 140 does not satisfy a value of 10 um or less, the amount of light incident on the image sensor unit decreases, resulting in a decrease in resolution, or the overall optical characteristics of the optical system deteriorate, so aberrations and distortions may increase.

On the seventh surface S7 of the fourth lens 140, as the distance from the optical axis (0, 0) increases, the absolute values of the Sag value on the first axis and the Sag value on the second axis gradually increase, the difference between the Sag value on the first axis and the Sag value on the second axis may increase from a specific point.

Additionally, the left and right Sag values of the seventh surface S7 of the fourth lens 140 in the first axis AX1 direction and the top and bottom Sag values in the second axis AX2 direction may be symmetrical to each other.

Accordingly, the seventh surface S7 of the fourth lens 140, where the shape of the freeform surface is defined by the Sag values, may be symmetrical in the first axis AX1 direction and symmetrical in the second axis direction AX2. However, rotational symmetry from the first axis AX1 to the second axis AX2 is not satisfied.

Meanwhile, the Sag value of the seventh surface S7 of the fourth lens 140 may be set by Equation D below.

$$Z = \frac{cr^2}{1 + \sqrt{(1+k)c^2r^2}} + \sum_{i=1}^{n} C_j Z_j \quad \text{[Equation D]}$$

(In equation D, Z is a Sag value of the fourth lens, c is a curvature value of the fourth lens, r is an effective diameter value of the fourth lens, k is Koenig's constant, Cj is Zernike coefficient at order j, and Zj is Zernike basis at order j.)

Additionally, the first coordinate C1, the second coordinate C2, the third coordinate C3, and the fourth coordinate C4 may satisfy the following equation E.

$$h1 = H - t1 * \tan(\theta h - \alpha), \quad |B| < 0.7 * h1 \leq |A| \quad \text{[Equation E]}$$

(In equation E, h1 is a distance from the optical axis in the negative or positive direction of the first axis, H is ½ length of the minor axis of the image sensor unit, t1 is a distance from the seventh surface S7 to the image sensor unit, θh is Chief Ray Angle in the 0.6 field of the image sensor unit, and α is sin−1(1/(2*F number)). Here, when the center of the image sensor unit is set to 0 field, and half the diagonal length from the center of the image sensor unit to the corner is set to 1.0 field, a field of the image sensor unit may be defined as a relative distance from the center of the image sensor unit to any point along the diagonal length.)

Meanwhile, when the optical system is applied to a mobile display device such as a smartphone, the average angle of θh may be 34°.

Additionally, the seventh surface S7 of the fourth lens 140 may satisfy Equation F below.

$$|S4 - S3| = 0 \quad \text{[Equation F]}$$

That is, the third Sag value of the third coordinate and the fourth Sag value of the fourth coordinate may be the same. That is, the absolute value of the difference between the third Sag value of the third coordinate and the fourth Sag value of the fourth coordinate that satisfies Equation D may be 0 or more and 10 um or less.

In detail, the absolute value of the difference between the third Sag value of the third coordinate and the fourth Sag value of the fourth coordinate that satisfies the equation E may be 0 or more and 5 um or less. In more detail, the absolute value of the difference between the third Sag value of the third coordinate and the fourth Sag value of the fourth coordinate that satisfies the equation E may be 0 or more and 1 um or less.

Figure 4:
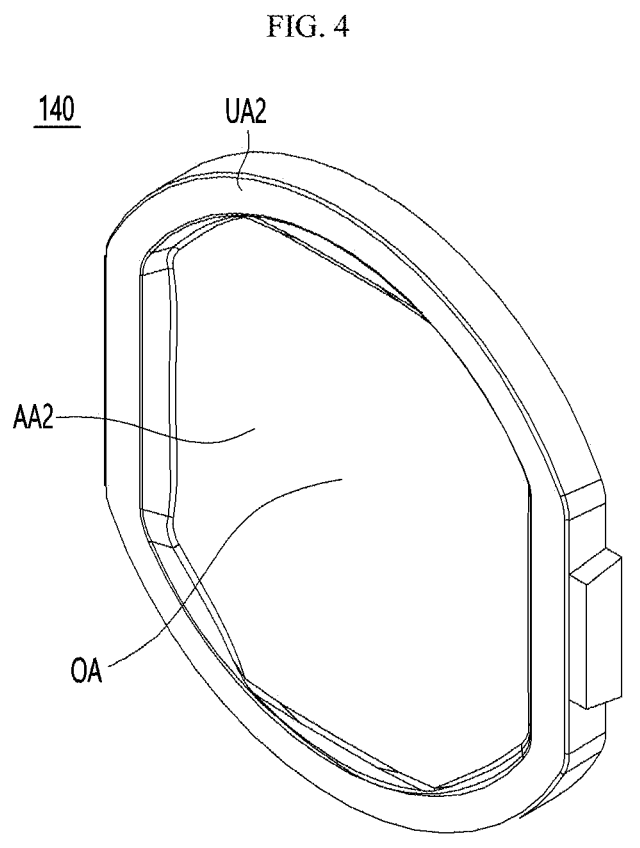
Figure 5:
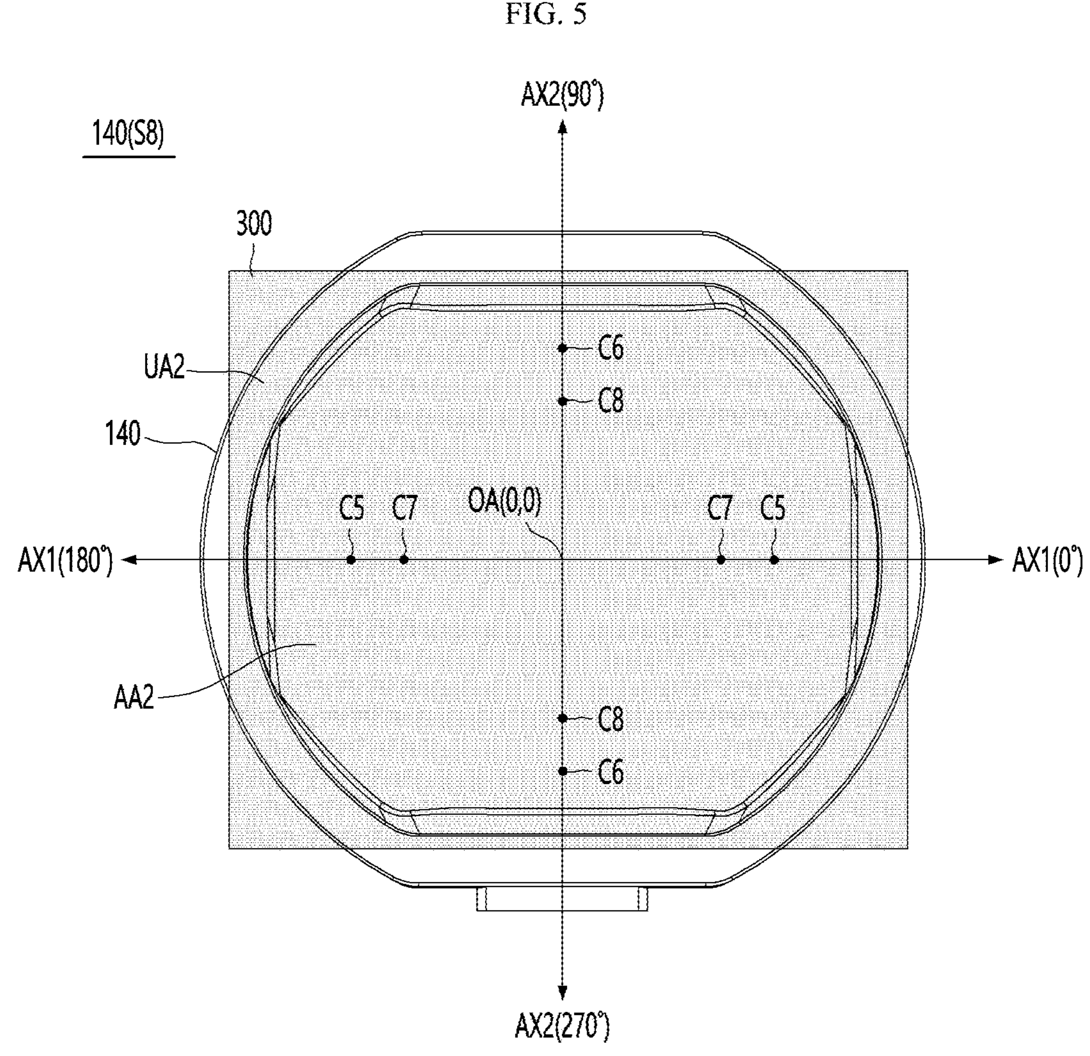

FIGS. 4 and 5 are diagrams for explaining the freeform surface of the eighth surface S8 of the fourth lens 140.

Referring to FIG. 4, the eighth surface S8 of the fourth lens 140 may include a second effective region AA2 and a second non-effective region UA2. In detail, the eighth surface S8 of the fourth lens 140 may include the second effective region AA2, which is a region through which light incident on the fourth lens 140 passes. Light incident on the fourth lens 140 may be refracted in the second effective region AA2 of the eighth surface S8 of the fourth lens 140 to implement optical characteristics.

Additionally, the eighth surface S8 of the fourth lens 140 may include a second non-effective region UA2, which is a region through which light incident on the fourth lens 140 does not pass. Light incident on the fourth lens 140 may not pass through the second non-effective region UA2 of the fourth lens 140. Accordingly, the second non-effective region UA2 of the eighth surface S8 may be unrelated to the optical characteristics of light incident on the fourth lens 140. Additionally, some regions of the second non-effective region UA2 may be fixed to the barrel accommodating the fourth lens 140.

Referring to FIG. 5, a virtual axis for setting the coordinates of the eighth surface S8 of the fourth lens 140 may be set.

In detail, a first axis AX1 and a second axis AX2 may be set on the eighth surface S8 of the fourth lens 140. The first axis AX1 may be defined as a direction parallel to the longitudinal direction of the long axis of the image sensor unit 300. That is, the first axis AX1 may be defined as an axis that passes through the optical axis OA and extends in a direction parallel to the long axis of the image sensor unit 300.

Additionally, the second axis AX2 may be defined as a direction parallel to the minor axis longitudinal direction of the image sensor unit 300. That is, the second axis AX2 may be defined as an axis that passes through the optical axis OA and extends in a direction parallel to the minor axis of the image sensor unit 300.

For example, the first axis AX1 may be defined as the X-axis direction or the Y-axis direction, and may be defined as an axis having angles of 0° and 180° with respect to the optical axis OA. Additionally, the second axis AX2 may be defined as the Y-axis direction or the X-axis direction, and may be defined as an axis having angles of 90° and 270° with respect to the optical axis OA.

The first axis AX1 and the second axis AX2 may be perpendicular to each other. That is, the first axis AX1 and the second axis AX2 may be perpendicular to each other in the optical axis OA. Accordingly, the first axis AX1 may be perpendicular to the optical axis OA. Additionally, the second axis AX2 may be perpendicular to the optical axis OA. That is, the optical axis OA, the first axis AX1, and the second axis AX2 may be perpendicular to each other.

A plurality of coordinates may be set on the eighth surface S8 of the fourth lens 140, respectively, on the first axis AX1 and the second axis AX2.

In detail, the fifth coordinate C5 and the seventh coordinate C7 of the eighth surface S8 of the fourth lens 140 may be set on the first axis AX1. In detail, the eighth surface S8 of the fourth lens 140 may be set to a fifth coordinate C5 with a coordinate of (±C, 0) and a seventh coordinate C7 with a coordinate of (±D, 0) on the first axis AX1.

In addition, the eighth surface S8 of the fourth lens 140 has a fifth Sag value S5 at the fifth coordinate C5, and may have a seventh Sag value S7 at the seventh coordinate C7.

In addition, the eighth surface S8 of the fourth lens 140 may have a sixth coordinate C6 and an eighth coordinate C8 set on the second axis AX2. In detail, the eighth surface S8 of the fourth lens 140 may be set to a sixth coordinate C6 with a coordinate of (0, +C) and an eighth coordinate C8 with a coordinate of (0, ±D) on the second axis AX2.

In addition, the eighth surface S8 of the fourth lens 140 has a sixth Sag value S6 at the sixth coordinate C6, and may have an eighth Sag value S8 at the eighth coordinate C8.

At this time, the fourth lens may satisfy the following equation G.

$$|S6 - S5| > |S8 - S7| \quad \text{[Equation G]}$$

$$|C| > |D|$$

$$|S8 - S7| \leq 10um \text{ or } |S8 - S7| \leq 5\ um \text{ or } |S8 - S7| \leq 1um$$

In the above equation G, each equation may be independent, or multiple equations may be combined with each other.

Additionally, the rage of |S8 −S7| values may be related to the amount of light passing through the fourth lens 140 and incident on the image sensor unit and the optical characteristics of the optical system.

In detail, when the |S6–S5| is set to exceeding |S8–S71, that is, if|S6–S5| is set to a value greater than 10 um or greater than 5 um or greater than 1 um, the amount of light passing through the fourth lens 140 and incident on the image sensor unit may be increased.

Accordingly, the relative illumination RI of the image sensor unit may be increased to 35% or more, and improved optical characteristics may be achieved. That is, the optical system including the fourth lens may have improved MTF characteristics. Additionally, resolution can be improved by increasing the amount of light incident on the image sensor unit.

However, if the above |S8–S7| is set to a value greater than 10 μm, specifically, if the above |S6–S5| is set to a value greater than |S8–S7|, that is, if the above |S6–S5| is set to a value greater than 10 μm, the amount of light passing through the force lens above 140 and incident toward the image sensor unit above 140 may decrease, or the MTF characteristics of the entire optical system may deteriorate, thereby deteriorating optical properties.

That is, if the |S8–S7| of the force lens 140 does not satisfy a value of 10 μm or less, specifically, if the |S6–S5| is set to a value greater than |S8–S7|, that is, if the |S6–S5| is set to a value greater than 10 μm, the amount of light incident on the image sensor may decrease, resulting in a decrease in resolution or a decrease in the overall optical properties of the optical system, thereby increasing aberration and distortion.

That is, the difference between the Sag value in the first axis and the Sag value in the second axis at coordinates arranged far from the optical axis (0, 0) may be greater than the difference between the Sag value in the first axis and the Sag value in the second axis at coordinates arranged close to the optical axis (0, 0).

That is, as the eighth surface S8 of the fourth lens 140 moves away from the optical axis (0, 0), the difference between the Sag value on the first axis and the Sag value on the second axis may increase.

In the eighth surface S8 of the fourth lens 140, as the distance from the optical axis (0, 0) increases, the absolute value of the Sag value on the first axis and the absolute value of the Sag value on the second axis gradually increase, and it may be seen that a difference between the Sag value on the first axis and the Sag value on the second axis increases significantly from a specific point.

In addition, it can be seen that the left and right Sag values of the eighth surface S8 of the fourth lens 140 with respect to the optical axis in the first axis AX1 direction and the top and bottom Sag values with respect to the optical axis in the second axis AX2 direction are symmetrical to each other.

Accordingly, the eighth surface S8 of the fourth lens 140, where the shape of the freeform surface is defined by the Sag values, is symmetrical in the first axis AX1 direction and symmetrical in the second axis direction AX2. However, rotational symmetry from the first axis AX1 to the second axis AX2 is not satisfied.

Meanwhile, the Sag value of the eighth surface S10 of the fourth lens 150 may be set by equation H.

Additionally, the fifth coordinate C5, the sixth coordinate C6, the seventh coordinate C7, and the eighth coordinate C8 may satisfy the following equation H.

$$h2 = H - t2 * \tan(\theta h - \alpha), \quad \text{[Equation H]}$$

$$|D| < 0.7 * h1 \leq |C|$$

(In equation H, h2 is a distance from the optical axis in the negative or positive direction of the first axis, H is ½ length of the minor axis of the image sensor unit, t2 is a distance from the eighth surface S8 to the image sensor unit, θh is a chief ray angle in the 0.6 field of the image sensor unit, and a is sin−1 (1/(2*F number)). Here, when half the diagonal length from the center of the image sensor unit to the edge is set as 1.0 field, it may be defined as the relative distance from the center of the image sensor unit to any point along the diagonal length.)

Meanwhile, when the optical system is applied to a mobile display device such as a smartphone, the average angle of θh may be 34°.

Additionally, the eighth surface S8 of the fourth lens 140 may satisfy Equation I below.

$$|S8 - S7| = 0 \quad \text{[Equation I]}$$

That is, the seventh Sag value of the seventh coordinate and the eighth Sag value of the eighth coordinate may be the same. That is, the absolute value of the difference between the seventh Sag value of the seventh coordinate and the eighth Sag value of the eighth coordinate that satisfies Equation I may be 0 or more and 10 μm or less.

In detail, the absolute value of the difference between the seventh Sag value of the seventh coordinate and the eighth Sag value of the eighth coordinate that satisfies Equation I may be 0 or more and 5 μm or less. In more detail, the absolute value of the difference between the seventh Sag value of the seventh coordinate and the eighth Sag value of the eighth coordinate that satisfies the equation G may be 0 or more and 3 μm or less.

FIG. 6 is a table of Sag values at various angles of the seventh surface and the eighth surface of the fourth lens having a freeform surface.

In detail, FIG. 6 is a table showing Sag values at 0°, 30°, 45°, 53°, 60°, and 90°.

Referring to FIG. 6, the seventh surface and the eighth surface of the fourth lens may be symmetrical at all angles along the first axis AX1 and symmetrical along the second axis AX2. However, the ninth surface and the tenth surface of the fifth lens do not satisfy rotational symmetry from the first axis AX1 to the second axis AX2 at all angles.

In the optical system according to the embodiment, the fourth lens 140 has a Sag value set by the above equations and a relationship between the Sag values, and the object side surface and the sensor side surface of the fourth lens 140 may have a freeform surface formed by the Sag value and the relationship between the Sag values.

Accordingly, when light passes through the optical system according to the embodiment and enters the image sensor unit, the relative illumination of the image sensor unit can be improved.

That is, the optical system according to the embodiment inputs light into the image sensor unit through the fourth lens 140, thereby expanding the region where light is incident from the optical system to the image sensor unit, that is, by expanding the effective region of the image sensor unit, when light is incident on the image sensor unit, the relative illumination of the image sensor unit can be improved.

In detail, when the optical system according to the embodiment compares the illuminance in the brightest and darkest regions of the image sensor unit, light may be incident on the image sensor unit so that the illuminance in the darkest region is 30% or more in the brightest region. In detail, the optical system according to the embodiment compares the illuminance in the brightest and darkest regions of the image sensor unit, light may be incident on the image sensor unit so that the illuminance in the darkest region is 35% or more in the brightest region. In more detail, the optical system according to the embodiment compares the illuminance in the brightest and darkest regions of the image sensor unit, light may be incident on the image sensor unit so that the illuminance in the darkest region is 45% or more in the brightest region.

Therefore, in order to increase the amount of light incident on the image sensor unit, the optical system according to the embodiment can increase the amount of light incident on the image sensor unit while maintaining the size of the lenses and improved optical characteristics without enlarging the aperture of the lenses.

Additionally, the optical module according to the embodiment can implement miniaturization of the optical system and optical module by using a fourth lens having a freeform surface.

In detail, the optical module according to the embodiment can improve the relative illumination while reducing the size of the optical system and optical module.

If there is no fourth lens containing a freeform surface, in order to improve the relative illumination, the TTL (distance in the optical axis direction of the first lens and the image sensor unit) of the optical system must be increased, but the optical module according to the embodiment controls the direction of movement of light by a fourth lens including a freeform surface, the relative illumination may be improved without increasing TTL.

That is, the optical module according to the embodiment can reduce the size of TTL by 10% to 20% compared to an optical module that does not include a fourth lens including a freeform surface. Accordingly, the optical module can be miniaturized, and the optical module can be easily applied to various display devices.

Additionally, the optical module according to the embodiment may have an improved MTF and improved resolution by a fourth lens having a freeform surface.

In detail, the optical module according to the embodiment may have improved MTF characteristics by increasing the amount of light incident on the image sensor unit to the fourth lens having a freeform surface.

In addition, the optical module according to the embodiment improves the relative illumination of the light incident on the image sensor unit, thereby inhibiting a decrease in resolution due to post-processing after image acquisition.

In other words, an optical module that does not include a lens with a freeform surface has a low relative illumination of the image sensor unit, so a post-processing process is required to obtain the image through the image sensor unit and then adjust the image size to be implemented, and during this post-processing process, the resolution of the optical module may deteriorate.

However, the optical module according to the embodiment increases the relative illumination of the image sensor unit by using a lens having a freeform surface, and as a result, post-processing is not required or resolution is not significantly reduced due to the post-processing process, so it may have improved resolution.

Meanwhile, the third lens 130 and the fifth lens 150, which are disposed adjacent to the fourth lens 140, which is a freeform lens, may have a peripheral shape curved toward the object side. In detail, the third lens 130 and the fifth lens 150 may be formed in a shape that bends in the direction of the object side as it goes from the optical axis to the end of the effective diameter of the lens.

The shapes of the third lens 140 and the fifth lens 150 may be defined by changes in the slope angle of the lenses. Additionally, the thickness and interval at each position of the third lens 130 and the fifth lens 150 may be defined by changes in the slope angles of the third lens 130 and the fifth lens 150.

Figure 7:
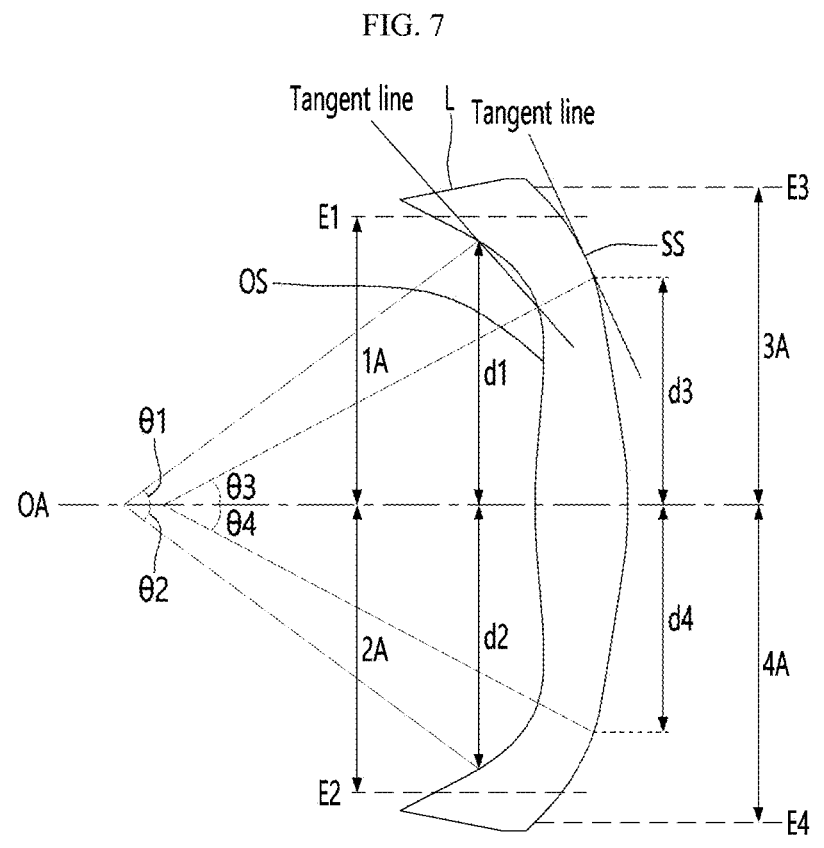

FIG. 7 is a diagram for explaining the slope angle of the lens of an optical module according to an embodiment. The definition of the slope angle of the lens described in FIG. 7 may be equally applied to the first to fifth lenses.

Referring to FIG. 7, the lens L may have a normal line defined that passes through an arbitrary point on the object side surface OS of the lens. In detail, the object side surface OS of the lens extends in a direction perpendicular to a tangent line passing through an arbitrary point of the object side surface OS, and a normal line passing through an arbitrary point may be defined.

Accordingly, the object side surface OS of the lens may have a slope angle defined as the angle between the normal line passing through an arbitrary point of the object side surface OS and the internal angle formed by the optical axis.

The slope angle may be expressed as positive (+) or negative (−) depending on the position at which the interior angle is formed. In detail, if the interior angle is formed in the sensor side direction based on the object side surface OS of the lens, the slope angle may be positive (+). Additionally, if the interior angle is formed in the direction of the object side based on the object side surface OS, the slope angle may be negative (−). That is, the increase or decrease in the slope angle of the lens L may be determined based on the absolute value of the slope angle. That is, the description of the size of the slope angle described below is based on the size of the absolute value of the slope angle, which is the absolute value of the interior angle.

The lens (L) may have a first end E1 and a second end E2 that define the effective region of the object side surface OS of the lens. In detail, the object side surface OS of the lens may be defined as a first end E1 and a second end E2 in the X-axis or Y-axis direction in the optical axis.

At this time, The size of the slope angle of the object side surface OS of the lens may change depending on the position in a first region 1A from the optical axis OA to the first end E1 and a second region 2A from the optical axis OA to the second end E2. The first region 1A and the second region 2A may each be defined by an effective radius that is half of the effective diameter (effective region) of the object side surface OS of the lens.

The object side surface OS of the lens may be defined by a first slope angle θ1 in the first region 1A and a second slope angle θ2 in the second region 2A.

The first slope angle θ1 and the second slope angle θ2 may have a positive (+) or negative (−) value depending on the position of the interior angle.

Likewise, an slope angle may be defined on the sensor side surface SS of the lens. In detail, the lens (L) may have a normal line defined that passes through an arbitrary point on the sensor side surface SS of the lens. In detail, the sensor side surface SS of the lens extends in a direction perpendicular to a tangent line passing through an arbitrary point of the sensor side surface SS, and a normal line passing through an arbitrary point may be defined.

Accordingly, the sensor side surface SS of the lens will have a slope angle defined as the angle between the normal line passing through an arbitrary point of the sensor side surface SS and the internal angle formed by the optical axis.

At this time, a size of the slope angle of the sensor side surface SS of the lens may change depending on the position in a third region 3A from the optical axis OA to a third end E3 and a fourth region 4A from the optical axis OA to a fourth end E4. The third region 3A and the fourth region 4A may each be defined by an effective radius that is half of the effective diameter (effective region) of the sensor side surface SS of the lens.

The sensor side surface SS of the lens may be defined by a third slope angle θ3 in the third region 3A and a fourth slope angle θ4 in the fourth region 4A.

The third slope angle θ3 and the fourth slope angle θ4 may have a positive (+) or negative (−) value depending on the position of the interior angle.

The size of the slope angle of the third lens 130 and the fifth lens 150 may change as they move from the optical axis of the lens toward the end of the effective diameter. In detail, the optical module according to the embodiment may improve the optical characteristics of the optical module by setting the slope angle for each position of the third lens 130 and the fifth lens 150, which are arranged adjacent to the fourth lens 140, which is a freeform lens, and the thickness and interval for each position set by the slope angle within a set range.

First, the third lens 130 is explained.

The size of the slope angle of the fifth surface S5 of the third lens 130 may change depending on the position of the fifth surface S5. In detail, the size of the slope angle of the fifth surface S5 may change depending on the position within the effective region of the fifth surface S5. In more detail, the size of the slope angle of the fifth surface S5 may change for each position of the seventh surface S7 while extending from the optical axis in the X-axis or Y-axis direction of the fifth surface S5 perpendicular to the optical axis.

In detail, the first slope angle θ1 and the second slope angle θ2 of the fifth surface S5 may change in the first region 1A and the second region 2A. In detail, the first slope angle θ1 may increase in the first region 1A, and the second slope angle θ2 may increase in the second region 2A.

That is, an absolute value of the first slope angle θ1 may gradually increase as the fifth surface S5 extends from the optical axis toward the first end E1, and an absolute value of the second tilt angle θ2 may gradually increase as it extends from the optical axis toward the second end E2.

Accordingly, the fifth surface S5 may be formed in a shape whose curvature gradually increases while extending from the optical axis toward the first end E1 and the second end E2. That is, the fifth surface S5 is formed in a shape that is curved in the direction of the object side, and the curvature may increase as it extends from the optical axis toward the first end E1 and the second end E2.

In addition, the amount of change in the first slope angle θ1 and the second slope angle θ2 of the fifth surface S5 may gradually increase as it extends from the optical axis toward the first end E1 and the second end E2.

In detail, when the total distance from the optical axis to the first end E1 is defined as 1, the first region of the fifth surface S5 is that the amount of change in the first slope angle θ1 in the first region ranging from 0.5 in the direction from the optical axis to the first end E1 may be smaller than the amount of change in the slope angle in the first region ranging from more than 0.5 to 1.

In addition, the second region of the fifth surface S5 is that the amount of change in the second slope angle θ2 in the second region ranging from 0.5 in the direction from the optical axis to the second end E2 may be smaller than the amount of change in the slope angle in the second region ranging from more than 0.5 to 1.

That is, the amount of change in the first slope angle θ1 and the second slope angle θ2 of more than 50% to 100% of the effective radius of the fifth surface S5 on the optical axis may be greater than the amount of change in the first slope angle θ1 and the second slope angle θ2 of 50% or less.

Accordingly, the seventh surface S7 has a small curvature and a small amount of curvature change in the first and second regions up to 50% of the effective diameter on the optical axis, and the seventh surface S7 may be formed into a shape with large curvature and large curvature change while extending from more than 50% to the end of the effective diameter.

Additionally, the size of the slope angle of the sixth surface S6 of the third lens 130 may change depending on the position of the sixth surface S6. In detail, the size of the slope angle of the sixth surface S6 may vary depending on the position within the effective region of the sixth surface S6. More specifically, the size of the slope angle of the sixth surface S6 may change for each position of the sixth surface S6 while extending from the optical axis in the X-axis or Y-axis direction of the sixth surface S6 perpendicular to the optical axis.

In detail, the third slope angle θ3 and the fourth slope angle θ4 of the sixth surface S6 may change in the third region 3A and the fourth region 4A. In detail, the third slope angle θ3 may increase in the third region 3A, and the fourth slope angle θ4 may increase in the fourth region 4A.

That is, an absolute value of the third slope angle θ3 may gradually increase as the sixth surface S6 extends from the optical axis toward the third end E3, and an absolute value of the fourth slope angle θ4 may gradually increase as it extends from the optical axis toward the fourth end E4.

Accordingly, the sixth surface S6 may be formed in a shape whose curvature gradually increases while extending from the optical axis toward the third end E3 and the fourth end E4. That is, the sixth surface S6 is formed in a shape that bends in the direction of the object side, and the curvature may increase as it extends from the optical axis toward the third end E3 and the fourth end E4.

In addition, the amount of change in the third slope angle θ3 and the fourth slope angle θ4 of the sixth surface S6 may gradually increase as it extends from the optical axis toward the third end E3 and the fourth end E4.

In detail, the third region of the sixth surface S6 is that the amount of change in the third slope angle θ3 in the third region from the optical axis to 0.5 in the direction of the third end E3 may be less than the amount of change in the third slope angle θ3 in the third region, which ranges from more than 0.5 to 1.

Additionally, the fourth region of the sixth surface S6 is that the amount of change in the fourth slope angle θ4 in the fourth region from the optical axis to 0.5 in the direction of the fourth end E4 may be smaller than the amount of change in the fourth slope angle θ4 in the fourth region, which ranges from more than 0.5 to 1.

That is, the amount of change in the third slope angle θ3 and the fourth slope angle θ4 of more than 50% to 100% of the effective radius of the sixth surface S6 on the optical axis may be greater than the amount of change in the third slope angle θ3 and fourth slope angle θ4 of 50% or less.

Accordingly, the sixth surface S6 has a small curvature and a small curvature change in the third and fourth regions up to 50% of the effective diameter on the optical axis, and the sixth surface S6 may be formed into a shape with large curvature and large curvature change while extending from more than 50% to the end of the effective diameter.

Additionally, the third lens 130 may have different slope angles on the fifth surface S5 and the sixth surface S6.

For example, the maximum size of the absolute value of the slope angle of the fifth surface S5 of the third lens 130 may be different from the maximum size of the absolute value of the slope angle of the sixth surface S6. In detail, the maximum absolute value of the slope angle of the fifth surface S5 may be smaller than the maximum absolute value of the slope angle of the sixth surface S6.

In addition, a difference between a maximum size of an absolute value of the slope angle of the fifth surface S5 and a minimum size that is not 0 and a difference between a maximum size and the minimum non-zero size of an absolute value of the slope angle of the sixth surface S6 of the third lens 130 may be different. The difference between the maximum size and the minimum non-zero absolute value of the slope angle of the fifth surface S5 may be smaller than the difference between the maximum size and the minimum non-zero size of the absolute value of the slope angle of the sixth surface S6.

Additionally, the thickness of the third lens 130 may change while extending from the optical axis in the direction of the effective diameter. In detail, the third lens 130 may vary in thickness while extending from the optical axis toward the first end E1 or the second end E2, which is the effective region of the fifth surface S5.

For example, the thickness of the third lens 130 may increase while extending from the optical axis toward the first end E1, which is the effective region of the fifth surface S5. Additionally, the thickness of the third lens 130 may increase while extending from the optical axis toward the second end E1, which is the effective region of the fifth surface S5.

A maximum thickness of the third lens 130 may be the end of the effective region of the third lens 130. Additionally, a minimum thickness of the third lens 130 may be within the effective region of the third lens 130. For example, the minimum thickness of the third lens 130 may be a thickness at the optical axis of the third lens 130.

Additionally, the Sag value of the third lens 130 may change as it extends from the optical axis in the direction of the effective diameter.

The size of the Sag value of the fifth surface S5 of the third lens 130 may change depending on the position of the fifth surface S5. In detail, the size of the Sag value of the fifth surface S5 may change depending on the position within the effective region of the fifth surface S5. In more detail, the size of the Sag value of the fifth surface S5 may change for each position of the fifth surface S5 while extending from the optical axis in the X-axis or Y-axis direction of the fifth surface S5 perpendicular to the optical axis.

In detail, the Sag value of the fifth surface S5 may change in the first region 1A and the second region 2A. In detail, the Sag value may increase in the first region 1A and may increase in the second region 2A.

That is, the absolute value of the Sag value may gradually increase as the fifth surface S5 extends from the optical axis toward the first end E1, and the absolute value of the Sag value may gradually increase as it extends from the optical axis toward the second end E2.

Additionally, the amount of change in the Sag value of the fifth surface S5 may gradually increase as it extends from the optical axis toward the first end E1 and the second end E2.

In detail, in the first region of the fifth surface S5, the amount of change in the Sag value in the first region from the optical axis to 0.5 in the direction of the first end E1 may be smaller than the amount of change in the sag value in the first region, which ranges from more than 0.5 to 1.

In addition, the second region of the fifth surface S5 is that the amount of change in the Sag value in the second region from the optical axis to 0.5 in the direction of the second end E2 may be smaller than the amount of change in the sag value in the second region, which ranges from more than 0.5 to 1.

That is, the amount of change in the Sag value of more than 50% to 100% of the effective radius of the fifth surface S5 on the optical axis may be greater than the amount of change in the Sag value of 50% or less.

Additionally, the size of the Sag value of the sixth surface S6 of the third lens 140 may change depending on the position of the sixth surface S6. In detail, the size of the Sag value of the sixth surface S6 may change depending on the position within the effective region of the sixth surface S6. In more detail, the size of the Sag value of the sixth surface S6 may change for each position of the sixth surface S6 while extending from the optical axis in the X-axis or Y-axis direction of the sixth surface S6 perpendicular to the optical axis.

In detail, the Sag value of the sixth surface S6 may change in the third region 3A and the fourth region 4A. In detail, the Sag value may increase in the third region 3A and the fourth region 34.

That is, the absolute value of the Sag value may gradually increase as the sixth surface S6 extends from the optical axis toward the third end E3 and the fourth end E4.

Additionally, the amount of change in the Sag value of the sixth surface S6 may gradually increase as it extends from the optical axis toward the third end E3 and the fourth end E4.

In detail, in the third region and the fourth region of the sixth surface S6, the amount of Sag value change in the third and fourth regions up to 0.5 from the optical axis toward the third end E3 and the fourth end E4 may be less than the amount of change in the Sag value in the third and fourth regions, which ranges from more than 0.5 to 1.

That is, the amount of change in the Sag value of more than 50% to 100% of the effective radius of the sixth surface S6 on the optical axis may be greater than the amount of change in the Sag value of 50% or less.

Hereinafter, the fifth lens 150 will be described.

The size of the slope angle of the ninth surface S9 of the fifth lens 150 may change depending on the position of the ninth surface S9. In detail, the size of the slope angle of the ninth surface S9 may vary depending on the position within the effective region of the ninth surface S9. In more detail, the size of the slope angle of the ninth surface S9 may change for each position of the ninth surface S9 while extending from the optical axis in the X-axis or Y-axis direction of the ninth surface S9 perpendicular to the optical axis.

In detail, the first slope angle θ1 and the second slope angle θ2 of the ninth surface S9 may change in the first region 1A and the second region 2A. In detail, the first slope angle θ1 may increase or decrease in the first region 1A, and the second slope angle θ2 may increase or decrease in the second region 2A.

In detail, the first slope angle θ1 may increase and then decrease in the first region 1A, and the second slope angle θ2 may increase and then decrease in the second region 2A.

That is, the absolute value of the first slope angle θ1 of the ninth surface S9 may gradually increase and then decrease while extending from the optical axis toward the first end E1, and the absolute value of the second slope angle θ2 may gradually increase and then decrease while extending from the optical axis toward the second end E2.

Accordingly, the ninth surface S9 may be formed in a shape whose curvature gradually increases and then decreases while extending from the optical axis toward the first end E1 and the second end E2. That is, the ninth surface S9 is formed in a shape that bends in the direction of the object side, and the curvature may be formed to increase and then decrease as it extends from the optical axis toward the first end E1 and the second end E2.

In detail, when the total distance from the optical axis to the first end E1 and the second end E2 is defined as 1, the first slope angle θ2 and the second slope angle θ2 in the first region and the second region from 0.1 to 0.6 in the direction from the optical axis to the first end E1 and the second end E2 may increase. That is, the first slope angle θ1 and the second slope angle θ2 in the first region and the second region from the optical axis to a distance of more than 10% to 60% of the effective radius of the ninth surface S9 may decrease.

In addition, the first slope angle θ2 and the second slope in the first and second regions exceed 0.6 to 0.9 in the direction from the optical axis to the first end E1 and the second end E2 angle θ2 may decrease. That is, the first slope angle θ1 and the second slope angle θ2 in the first region and the second region from the optical axis to a distance of more than 60% to 90% of the effective radius of the ninth surface S9 may decrease.

Additionally, the ninth surface S9 may include a region where the sign of the slope angle changes. In detail, the ninth surface S9 may include a critical point. In detail, the first region and the second region of the ninth surface S9 may include a critical point at which the sign of the slope angle in the first region and the second region changes from more than 0.6 to 0.9 in the direction from the optical axis to the first end E1 and the second end. That is, in the first and second regions ranging from more than 60% to 90% of the effective radius of the ninth surface S9 from the optical axis, a critical point may be located near a point where the signs of the first slope angle θ1 and the second slope angle θ2 change.

Additionally, the size of the slope angle of the tenth surface S10 of the fifth lens 150 may change depending on the position of the tenth surface S10. In detail, the size of the slope angle of the tenth surface S10 may change depending on the position within the effective region of the tenth surface S10. In more detail, the size of the slope angle of the tenth surface S10 may change for each position of the tenth surface S10 while extending from the optical axis in the X-axis or Y-axis direction of the tenth surface S10 perpendicular to the optical axis.

In detail, the third slope angle θ3 and the fourth slope angle θ4 of the tenth surface S10 may change in the third region 3A and the fourth region 4A. In detail, the third slope angle θ3 may increase or decrease in the third region 3A, and the fourth slope angle θ4 may increase or decrease in the fourth region 4A. In more detail, the third slope angle θ3 may increase in the third region 3A, then decrease, and then increase again. Additionally, the fourth slope angle θ4 may increase in the fourth region 4A, then decrease, and then increase again.

That is, as the tenth surface S10 extends from the optical axis toward the third end E3, the absolute value of the third slope angle θ3 may gradually increase, decrease, and then increase again, and as it extends from the optical axis toward the fourth end E4, the absolute value of the fourth slope angle θ4 may gradually increase, decrease, and then increase again.

Accordingly, the tenth surface S10 extends from the optical axis toward the third end E3 and the fourth end E4, and may be formed in a shape in which the curvature gradually increases, then decreases, and then increases again. That is, the tenth surface S10 is formed in a shape that bends in the direction of the object side, and the curvature may be formed to increase, decrease, and then increase again as it extends from the optical axis toward the third end E3 and the fourth end E4.

For example, when the total distance from the optical axis to the third end E3 and the fourth end E4 is defined as 1, the third region and the fourth region of the tenth surface S10 are that the third slope angle θ3 and the fourth slope angle θ4 in the third and fourth regions may increase from 0.1 to 0.3 in the direction from the optical axis to the third end E1 and the fourth end E4. That is, the third slope angle θ3 and fourth slope angle θ4 in the third and fourth regions from the optical axis to a distance of 10% to 30% of the effective radius of the tenth surface S10 may increase.

In addition, the third region and the fourth region of the tenth surface S10 are that the third slope angle θ3 and fourth slope angle θ4 in the third and fourth regions exceeding 0.3 to 0.5 in the direction from the optical axis to the third end E3 and the fourth end E4 are may decrease. That is, the third slope angle θ3 and fourth slope angle θ4 in the third and fourth regions from the optical axis to a distance of more than 30% to 50% of the effective radius of the tenth surface S10 may decrease.

In addition, the third region and the fourth region of the tenth surface S10 are that the third slope angle θ3 and fourth slope angle θ4 in the third and fourth regions exceeding 0.7 to 0.9 in the direction from the optical axis to the third end E3 and the fourth end E4 may increase. That is, the third slope angle θ3 and fourth slope angle θ4 in the third and fourth regions from the optical axis to a distance of more than 70% to 90% of the effective radius of the tenth surface S10 may increase.

Additionally, the tenth surface S10 may include a region where the sign of the slope angle changes. In detail, the tenth surface S10 may include a critical point. In detail, the third and fourth regions of the tenth surface S10 may include a critical point at which the sign of the slope angle in the third and fourth regions changes from 0.3 to 0.5 in the direction from the optical axis to the third end E3 and the fourth end.

Additionally, the fifth lens 150 may have different slope angles at the ninth surface S9 and the tenth surface S10.

For example, the maximum size of the absolute value of the slope angle of the ninth surface S9 of the fifth lens 150 may be different from the maximum size of the absolute value of the slope angle of the tenth surface S10. In detail, the maximum absolute value of the slope angle of the ninth surface S9 may be smaller than the maximum absolute value of the slope angle of the tenth surface S10.

In addition, in the fifth lens 150, the difference between the maximum size and minimum non-zero size of the absolute value of the slope angle of the ninth surface S9 and the maximum size and minimum non-zero size of the absolute value of the slope angle of the tenth surface S10 may be different. In detail, the difference between the maximum size and the minimum non-zero size of the absolute value of the slope angle of the ninth surface S9 may be smaller than the difference between the maximum and minimum non-zero absolute values of the slope angle of the tenth surface S10.

Additionally, the thickness of the fifth lens 150 may change while extending from the optical axis in the direction of the effective diameter. In detail, the thickness of the fifth lens 150 may change while extending from the optical axis toward the first end E1 or the second end E2, which is the effective region of the ninth surface S9.

For example, the thickness of the fifth lens 150 may increases and decreases while extending from the optical axis toward the first end E1 and the second end E2, which are the effective region of the ninth surface S9. In detail, the thickness of the fifth lens 150 may increase or decrease while extending from the optical axis toward the first end E1 and the second end E2, which are the effective region of the ninth surface S9. In more detail, the thickness of the fifth lens 150 may increase and then decrease while extending from the optical axis toward the first end E1 and the second end E2, which are the effective region of the ninth surface S9.

For example, the thickness of the fifth lens 150 may increase from more than 0.1 to 0.75 in the direction from the optical axis to the first end E1 and the second end E2.

Additionally, the thickness of the fifth lens 150 may decrease from more than 0.75 to 0.95 in the direction from the optical axis to the first end E1 and the second end E2.

A maximum thickness of the fifth lens 150 may be located within the effective region of the fifth lens 150. For example, the maximum thickness of the fifth lens 150 may be in the range of 0.60 to 0.70 from the optical axis toward the first end E1 and the second end E2.

Additionally, a minimum thickness of the fifth lens 150 may be located within the effective region of the fifth lens 150. For example, the minimum thickness of the fifth lens 150 may be a thickness at the optical axis of the fifth lens 150.

Additionally, the Sag value of the fifth lens 150 may change while extending from the optical axis in the direction of the effective diameter.

The size of the Sag value of the ninth surface S9 of the fifth lens 150 may change depending on the position of the ninth surface S9. In detail, the size of the Sag value of the ninth surface S9 may change depending on the position within the effective region of the ninth surface S9. In more detail, the size of the Sag value of the ninth surface S9 may change for each position of the ninth surface S9 while extending from the optical axis in the X-axis or Y-axis direction of the ninth surface S9 perpendicular to the optical axis.

In detail, the Sag value of the ninth surface S9 may change in the first region 1A and the second region 2A. In detail, the Sag value may increase or decrease in the first region 1A and may increase or decrease in the second region 1A. More specifically, the Sag value may increase and then decrease in the first region 1A, and may increase and then decrease in the second region 1A.

That is, the absolute value of the Sag value of the ninth surface S9 may increase and then decrease while extending from the optical axis toward the first end E1, and the absolute value of the Sag value may increase and then decrease while extending from the optical axis toward the second end E2.

For example, the first region and the second region of the ninth surface S9 are that the Sag values in the third and fourth regions may increase from 0.1 to 0.85 in the direction from the optical axis to the first end E1 and the second end E2.

In addition, the first region and the second region of the ninth surface S9 are that the Sag value in the first region and the second region may be reduced from more than 0.85 to 0.95 in the direction from the optical axis to the first end E1 and the second end E2.

Additionally, the size of the Sag value of the tenth surface S10 of the fifth lens 150 may change depending on the position of the tenth surface S10. In detail, the size of the Sag value of the tenth surface S10 may change depending on the position within the effective region of the tenth surface S10. In more detail, the size of the Sag value of the tenth surface S10 may change for each position of the tenth surface S10 while extending from the optical axis in the X-axis or Y-axis direction of the tenth surface S10 perpendicular to the optical axis.

In detail, the Sag value of the tenth surface S10 may change in the third region 3A and the fourth region 4A. In detail, the Sag value may increase or decrease in the third region 3A and the fourth region 34. In more detail, the Sag value may increase, decrease, and then increase again in the third region 3A and the fourth region 34.

That is, as the tenth surface S10 extends from the optical axis toward the third end E3 and the fourth end E4, the absolute value of the Sag value may gradually increase, decrease, and then increase again.

For example, in the third region and the fourth region of the tenth surface S10, the Sag values in the third and fourth regions may increase from 0.1 to 0.45 in the direction from the optical axis to the first end E1 and the fourth end E4.

In addition, in the third region and the fourth region of the tenth surface S10, the Sag value in the third region and the fourth region may be reduced from more than 0.45 to 0.7 in the direction from the optical axis to the first end E1 and the fourth end E4.

In addition, in the third region and the fourth region of the tenth surface S10, the Sag value in the third region and the fourth region may increase from more than 0.7 to 0.95 in the direction from the optical axis to the first end E1 and the fourth end E4.

Additionally, the tenth surface S10 may include a region where the sign of the Sag value changes. In detail, the third region and the fourth region of the tenth surface S10 are that the signs of the Sag values in the third region and the fourth region may vary from 0.45 to 0.7 in the direction from the optical axis to the third end E4 and the fourth end E4.

Additionally, the amount of change in the Sag value of the tenth surface S10 may gradually increase as it extends from the optical axis toward the third end E3 and the fourth end E4.

In detail, the third region and the fourth region of the tenth surface S10 are that the amount of Sag value change in the third and fourth regions up to 0.5 from the optical axis toward the third end E3 and the fourth end E4 may be less than the amount of change in the Sag value in the third region, which ranges from more than 0.5 to 1.

That is, the amount of change in the Sag value exceeding 50% to 100% of the effective radius of the tenth surface S10 on the optical axis may be greater than the amount of change in the Sag value less than 50%.

The optical system and optical module according to the embodiment may satisfy at least one of the equations described below. Accordingly, the optical system and optical module according to the embodiment can improve aberration characteristics and have improved optical characteristics.

The optical system and optical module according to the embodiment may satisfy Equation 1 below.

$$60° \leq FOV \leq 90° \quad \text{[Equation 1]}$$

(FOV in Equation 1 means the effective viewing angle of the optical system.)

The optical system and optical module according to the embodiment may satisfy Equation 2 including any one of Equation 2-1, Equation 2-2, or Equation 2-3 below.

$$0.40 \leq TTL.ImgH \leq 4.0 \quad \text{[Equation 2-1]}$$

$$0.50 \leq TTL/ImgH \leq 1.0 \quad \text{[Equation 2-2]}$$

$$0.60 \leq TTL/ImgH \leq 0.75 \quad \text{[Equation 2-3]}$$

(In Equation 2, TTL (Total track length) means a distance in the optical axis direction from a vertex of the object side surface of the first lens to the image surface of the image sensor unit, and ImgH means twice the diagonal distance from the image surface of the image sensor unit overlapping the optical axis to the 1.0 field region of the image sensor unit.)

The optical system and optical module according to the embodiment may have a small TTL size as it satisfies Equation 2 above. Accordingly, the optical system and optical module according to the embodiment can be miniaturized, and the optical system and optical module according to the embodiment can be easily applied to a display device such as a smartphone.

The optical system and optical module according to the embodiment may satisfy Equation 3 below.

$$CA\_O\_x < CA\_O\_5 \quad \text{[Equation 3]}$$

(In Equation 3, CA_O_x means an effective diameter of the object side of the lens closest to the aperture, and CA_O_5 means an effective diameter of the object side of the fifth lens.)

As the optical system and optical module according to the embodiment satisfy Equation 3 above, the fifth lens with a large effective diameter and sensitive optical characteristics is placed far from the aperture, and the sensitivity reduction characteristics of optical systems and optical modules can be improved.

The optical system and optical module according to the embodiment may satisfy Equation 4 including any one of Equation 4-1, Equation 4-2, or Equation 4-3 below.

$$5° < |SA1\_O\_3| \leq 60°$$
$$5° < |SA1\_S\_3| \leq 60° \quad \text{[Equation 4-1]}$$

$$10° < |SA1\_O\_3| \leq 50°$$
$$10° < |SA1\_S\_3| \leq 50° \quad \text{[Equation 4-2]}$$

$$15° < |SA1\_O\_3| \leq 40°$$
$$15° < |SA1\_S\_3| \leq 40° \quad \text{[Equation 4-3]}$$

(In Equation 4, SA1_O_3 refers to the slope angle between the normal line of the object side surface and the optical axis at any point on the object side surface at a distance ranging from 75% to 95% of the distance from the optical axis of the third lens to the effective diameter, and SA1_S_3 means the slope angle between the normal line of the object side surface and the optical axis at any point on the sensor side surface at a distance ranging from 75% to 95% of the distance from the optical axis of the third lens to the effective diameter.)

As the optical system and optical module according to the embodiment satisfy Equation 4 above, the curvature of the lens surface may be increased in the region farthest from the optical axis of the third lens, which is placed adjacent to the fourth lens, which is a freeform lens, that is, in the region adjacent to the end direction of the effective diameter of the third lens. Accordingly, the aberration characteristics of the optical system and optical module can be improved.

The optical system and optical module according to the embodiment may satisfy Equation 5 including any one of Equation 5-1, Equation 5-2, or Equation 5-3 below.

$$1° < |SA1\_O\_5| \leq 30°$$
$$5° < |SA1\_S\_5| \leq 70° \quad \text{[Equation 5-1]}$$

$$3° < |SA1\_O\_5| \leq 20°$$
$$10° < |SA1\_S\_5| \leq 65° \quad \text{[Equation 5-2]}$$

$$5° < |SA1\_O\_5| \leq 10°$$
$$15° < |SA1\_S\_5| \leq 60° \quad \text{[Equation 5-3]}$$

(In Equation 5, SA1_O_5 means the slope angle between the normal line of the object side surface and the optical axis at any point on the object side surface at a distance in the range of 75% to 95% of the distance from the optical axis of the fifth lens to the effective diameter, and SA1_S_5 means the slope angle between the normal line of the object side surface and the optical axis at any point on the sensor side surface at a distance ranging from 75% to 95% of the distance from the optical axis of the fifth lens to the effective diameter.)

As the optical system and optical module according to the embodiment satisfy Equation 5 above, the curvature of the fifth lens, which is placed closest to the image sensor unit and adjacent to the fourth lens, which is a freeform lens, may be increased within a set region range. Accordingly, the aberration characteristics of the optical system and optical module may be improved.

The optical system and optical module according to the embodiment may satisfy Equation 6 including any one of Equation 6-1, Equation 6-2, or Equation 6-3 below.

$$5° \leq |SA1\_O\_x\_4| \leq 60°,$$
$$5° \leq |SA1\_O\_y\_4| \leq 60° \quad \text{[Equation 6-1]}$$

$$10° \leq |SA1\_O\_x\_4| \leq 55°,$$
$$10° \leq |SA1\_O\_y\_4| \leq 55° \quad \text{[Equation 6-2]}$$

$$15° \leq |SA1\_O\_x\_4| \leq 50°,$$
$$15° \leq |SA1\_O\_y\_4| \leq 50° \quad \text{[Equation 6-3]}$$

(In Equation 6, SA1_O_x_4 means a slope angle between the normal and the optical axis at any point on the object side at a distance in the range of 75% to 95% of the distance from the optical axis to the effective diameter in the X-axis direction from the optical axis of the fourth lens, and SA1_O_y_4 means an angle between the normal line and the optical axis at a point on the object side at a distance in the range of 75% to 95% of the distance from the optical axis to the effective diameter in the Y-axis direction from the optical axis of the fourth lens.)

As the optical system and optical module according to the embodiment satisfy Equation 6 above, the curvature of the fourth lens, which is a freeform lens, may be formed in a set range in a set region. Accordingly, the aberration characteristics of the optical system and optical module can be improved, and the image quality in the peripheral region can be improved.

The optical system and optical module according to the embodiment may satisfy Equation 7 including any one of Equation 7-1, Equation 7-2, or Equation 7-3 below.

$$5° \leq |SA1\_S\_x\_4| \leq 55°,$$
$$5° \leq |SA1\_S\_y\_4| \leq 70° \quad \text{[Equation 7-1]}$$

$$10° \leq |SA1\_S\_x\_4| \leq 50°,$$
$$10° \leq |SA1\_S\_y\_4| \leq 60° \quad \text{[Equation 7-2]}$$

$$15° \leq |SA1\_S\_x\_4| \leq 45°,$$
$$20° \leq |SA1\_S\_y\_4| \leq 50° \quad \text{[Equation 7-3]}$$

(In Equation 7, SA1_S_x_4 means a slope angle between the normal line and the optical axis at any point on the sensor side surface in the 75% to 95% distance range between the optical axis and the effective diameter in the X-axis direction of the fourth lens, and SA1_S_y_4 means a slope angle between the normal line and the optical axis at any point on the sensor side surface in the 75% to 95% distance range between the optical axis and the effective diameter in the Y-axis direction of the fourth lens.)

As the optical system and optical module according to the embodiment satisfy Equation 7 above, the curvature of the fourth lens, which is a freeform lens, may be formed in a set range in a set region. Accordingly, the aberration characteristics of the optical system and optical module may be improved, and the image quality in the peripheral region can be improved.

The optical system and optical module according to the embodiment may satisfy Equation 8 including any one of Equation 8-1, Equation 8-2, or Equation 8-3 below.

$$0.3 \leq CT\_5/T\_O\_c\_5 \leq 1.5 \quad \text{[Equation 8-1]}$$

$$0.4 \leq CT\_5/T\_O\_c\_5 \leq 1.3 \quad \text{[Equation 8-2]}$$

$$0.5 \leq CT\_5/T\_O\_c\_5 \leq 1.0 \quad \text{[Equation 8-3]}$$

(In Equation 8, CT_5 means a thickness at the optical axis of the fifth lens, T_O_c_5 means a thickness in the direction parallel to the optical axis direction in a critical point region of the sensor side surface of the fifth lens, and the critical point region is defined as a range of 0.1 mm based on the critical point.)

As the optical system and optical module according to the embodiment satisfy Equation 8, the fifth lens may be formed so that the thickness of the optical axis is smaller than the thickness of the optical axis passing through the critical point of the fifth lens. Accordingly, aberrations of the optical system and optical module may be reduced.

The optical system and optical module according to the embodiment may satisfy Equation 9 including any one of Equation 9-1, Equation 9-2, or Equation 9-3 below.

$$0.1 \leq CD\_(3/4)/\max D\_(3/4) \leq 1.5 \quad \text{[Equation 9-1]}$$

$$0.2 \leq CD\_(3/4)/\max D\_(3/4) \leq 1.0 \quad \text{[Equation 9-2]}$$

$$0.3 \leq CD\_(3/4)/\max D\_(3/4) \leq 0.7 \quad \text{[Equation 9-3]}$$

(In Equation 9, CD_(3/4) means a distance in the optical axis between the third lens and the fourth lens, and max D_(3/4) means a maximum distance between the third lens and the fourth lens.)

As the optical system and optical module according to the embodiment satisfy Equation 9 above, the distance on the optical axis between the third lens and the fourth lens may be smaller than the maximum distance. Accordingly, the third lens and the fourth lens may be formed in a shape that increases as the distance between the third lens and the fourth lens increases from the optical axis. Accordingly, aberrations of the optical system and optical module can be reduced, and image quality in the peripheral region can be improved.

The optical system and optical module according to the embodiment may satisfy Equation 10 below.

$$CA\_O\_x < CA\_O\_x+1 < CA\_O\_x+2 \cdots < CA\_O\_5 \quad \text{[Equation 10]}$$

(In Equation 10, CA_O_x mean the effective diameter of the object side of the lens closest to the aperture, and CA_O_5 refers to the effective diameter of the object side of the fifth lens.)

As the optical system and optical module according to the embodiment satisfy the above equation 10, the aberration characteristics of the optical system and optical module may be improved by arranging lenses with large effective diameter and sensitive optical characteristics away from the aperture, and TTL can be reduced to achieve miniaturization of the optical module.

The optical system and optical module according to the embodiment may satisfy Equation 11 below.

$$\min |Sag\_O\_x\_4| \neq \min |Sag\_O\_y\_4 \quad \text{[Equation 11]}$$

As the optical system and optical module according to the embodiment satisfy Equation 11 above, the minimum absolute value of the Sag value in the X-axis direction and the minimum absolute value of the Sag value in the Y-axis direction of the fourth lens, which is a freeform lens, may be different. Accordingly, the relative illumination of the optical system and optical module can be improved, thereby improving image quality in the peripheral region.

The optical system and optical module according to the embodiment may satisfy Equation 12 below.

$$\max |Sag\_O\_x\_4| - \min |Sag\_O\_x\_4| \neq \max |Sag\_O\_y\_4| - \min |Sag\_O\_y\_4| \quad \text{[Equation 12]}$$

(In Equation 12, max |Sag_O_x_4| means an absolute value of the maximum Sag value in the X-axis direction on the object side of the fourth lens, min |Sag_O_x_4| means an absolute value of the minimum non-zero Sag value in the X-axis direction on the object side of the fourth lens, max |Sag_O_y_4| means an absolute value of the maximum Sag value in the Y-axis direction on the object side of the fourth lens, and min |Sag_O_y_4| means an absolute value of the minimum Sag value in the Y-axis direction that is not 0 on the object side of the fourth lens.)

As the optical system and optical module according to the embodiment satisfy Equation 12 above, the difference between the Sag value in the X-axis direction and the Sag value in the Y-axis direction of the fourth lens, which is a freeform lens, may be changed. Accordingly, the relative illumination of the optical system and optical module can be improved by differentiating the optical characteristics of the light passing in the X-axis direction and the light passing in the Y-axis direction of the fourth lens, thereby improving image quality in the peripheral region.

The optical system and optical module according to the embodiment may satisfy Equation 13 including any one of Equation 13-1, Equation 13-2, or Equation 13-3 below.

$$50um \leq \max |Sag\_O\_x\_4| - \min |Sag\_O\_x\_4| \leq 400um \quad \text{[Equation 13-1]}$$
$$60um \leq \max |Sag\_O\_y\_4| - \min |Sag\_O\_y\_4| \leq 400um$$

$$100um \leq \max |Sag\_O\_x\_4| - \min |Sag\_O\_x\_4| \leq 350um \quad \text{[Equation 13-2]}$$
$$120um \leq \max |Sag\_O\_y\_4| - \min |Sag\_O\_y\_4| \leq 80um$$

$$150um \leq \max |Sag\_O\_x\_4| - \min |Sag\_O\_x\_4| \leq 300um \quad \text{[Equation 13-3]}$$
$$180um \leq \max |Sag\_O\_y\_4| - \min |Sag\_O\_y\_4| \leq 300um$$

As the optical system and optical module according to the embodiment satisfy Equation 13 above, the size of the difference between the Sag value in the X-axis direction and the Sag value in the Y-axis direction of the fourth lens, which is a freeform lens, may be set to a set range. Accordingly, the relative illumination of the optical system and optical module can be improved by differentiating the optical characteristics of the light passing in the X-axis direction and the light passing in the Y-axis direction of the fourth lens, thereby improving image quality in the peripheral region.

The optical system and optical module according to the embodiment may satisfy Equation 14 below.

$$|\max T\_3 - \min T\_3| < |\max T\_4 - \min T\_4| \quad \text{[Equation 14]}$$

(In Equation 15, max T_3 means the maximum thickness of the third lens, min T_3 means the minimum thickness of the third lens, max T_4 means a maximum thickness of the fourth lens, and min T_4 means a minimum thickness of the fourth lens.)

As the optical system and optical module according to the embodiment satisfy Equation 14 above, the thickness difference between the fourth lens, which is a freeform lens, and the third lens disposed adjacent to the fourth lens may be controlled. In detail, the difference between the maximum and the minimum thickness of the third lens may be made smaller than the difference between the maximum and minimum thickness of the fourth lens. Accordingly, aberrations of the optical system and optical module can be reduced, and image quality in the peripheral region can be improved.

The optical system and optical module according to the embodiment may satisfy Equation 15 below.

$$|\max T\_5 - \min T\_5| < |\max T45 - \min T\_4| \quad \text{[Equation 15]}$$

(In Equation 15, max T_4 means the maximum thickness of the fourth lens, min T_4 means the minimum thickness of the fourth lens, max T_5 means the maximum thickness of the fifth lens, and min T_5 means the minimum thickness of the fifth lens.)

As the optical system and optical module according to the embodiment satisfy Equation 15 above, the thickness difference between the fourth lens, which is a freeform lens, and the fifth lens disposed adjacent to the fourth lens may be controlled. In detail, the difference between the maximum and minimum thickness of the fifth lens may be made larger than the difference between the maximum and minimum thickness of the fourth lens. Accordingly, aberrations of the optical system and optical module can be reduced, and image quality in the peripheral region can be improved.

The optical system and optical module according to the embodiment may satisfy Equation 16 below.

$$CT\_3 \neq \min T\_5, \quad \text{[Equation 16]}$$

$$CT\_4 \neq \min T\_4,$$

$$CT\_5 = \min T\_5$$

(In Equation 16, CT_3 means the thickness at the optical axis of the third lens, CT_4 means a thickness at the optical axis of the fourth lens, and CT_5 means the thickness at the optical axis of the fifth lens.)

As the optical system and optical module according to the embodiment satisfy Equation 16 above, the thickness of the fourth lens, which is a freeform lens, and the third lens and fifth lens disposed adjacent to the fourth lens may be controlled. In detail, the size of the minimum thickness of the third lens may be equal to the thickness at the optical axis of the third lens, the size of the minimum thickness of the fourth lens may be different from the thickness of the optical axis of the fourth lens, and the size of the minimum thickness of the fifth lens may be the same as the thickness of the optical axis of the fifth lens. As a result, aberrations in the optical system and optical module can be reduced, and image quality in the peripheral region can be improved.

The optical system and optical module according to the embodiment may satisfy Equation 17 including an one of Equation 17-1 Equation 17-2 or Equation 17-3 below.

$$0.5 \leq \max D\_3/4/\min D\_3/4 \leq 20 \quad \text{[Equation 17-1]}$$

$$1.0 \leq \max D\_3/4/\min D\_3/4 \leq 10 \quad \text{[Equation 17-2]}$$

$$1.5 \leq \max D\_3/4/\min D\_3/4 \leq 5 \quad \text{[Equation 17-3]}$$

(In Equation 17, max D_3/4 means the maximum distance between the third lens and the fourth lens, and min D_3/4 means a minimum distance between the third lens and the fourth lens.)

As the optical system and optical module according to the embodiment satisfy Equation 17 above, the distance between the fourth lens, which is a freeform lens, and the third lens disposed adjacent to the fourth lens may be set to a set range. Accordingly, aberrations of the optical system and optical module can be reduced, the relative illumination can be increased, and image quality in the peripheral region can be improved.

The optical system and optical module according to the embodiment may satisfy Equation 18 including any one of Equation 18-1, Equation 18-2, or Equation 18-3 below.

$$0.1 \leq \max D\_4/5/\min D\_4/5 \leq 10 \quad \text{[Equation 18-1]}$$

$$0.5 \leq \max D\_4/5/\min D\_4/5 \leq 5 \quad \text{[Equation 18-2]}$$

$$1.0 \leq \max D\_4/5/\min D\_4/5 \leq 3 \quad \text{[Equation 18-3]}$$

(In Equation 18, max D_4/5 means a maximum distance between the fourth lens and the fifth lens, and min D_4/5 means a minimum distance between the fourth lens and the fifth lens.)

As the optical system and optical module according to the embodiment satisfy Equation 18 above, the distance between the fourth lens, which is a freeform lens, and the fifth lens disposed adjacent to the fourth lens may be set to a set range. Accordingly, aberrations of the optical system and optical module can be reduced, the relative illumination can be increased, and image quality in the peripheral region can be improved.

The optical system and optical module according to the embodiment may satisfy Equation 19 below.

$$\min D\_3/4 > \min T\_3, \quad \text{[Equation 19]}$$

$$\min D\_4/5 < \min T\_5$$

As the optical system and optical module according to the embodiment satisfy Equation 19 above, the respective thicknesses of the third lens and fifth lens disposed adjacent to the freeform lenses, the fourth lens and the fourth lens, and the distance between the lenses may be controlled. In detail, the minimum distance between the third lens and the fourth lens may be made larger than the minimum thickness of the third lens, and the minimum distance between the fourth lens and the fifth lens may be made smaller than the minimum thickness of the fifth lens. Accordingly, aberrations of the optical system and optical module can be reduced, the relative illumination can be increased, and image quality in the peripheral region can be improved.

The optical system and optical module according to the embodiment may satisfy Equation 20 below.

$$\min T\_5 < T\_c\_5 \leq \max T\_5 \quad \text{[Equation 20]}$$

(In Equation 20, min T_5 means the minimum thickness of the fifth lens, max T_5 means the maximum thickness of the fifth lens, T_c_5 means a thickness in the direction parallel to the optical axis direction in the critical point region of the sensor side of the fifth lens, and the critical point region is defined as a range of 0.1 mm based on the critical point)

As the optical system and optical module according to the embodiment satisfy Equation 20 above, the thickness size of the fifth lens disposed close to the fourth lens, which is a freeform lens, may be controlled at various positions. In detail, the thickness of the lens passing through the critical point region of the fifth lens may be made larger than the minimum thickness of the fifth lens and smaller than the maximum thickness. Accordingly, the aberration of the optical system and optical module can be reduced by adjusting the thickness of each region of the fifth lens.

The optical system and optical module according to the embodiment may satisfy Equation 21 including any one of Equation 21-1, Equation 21-2, or Equation 21-3 below.

$$20° < \max |SA\_O\_3| < 60° \quad \text{[Equation 21-1]}$$
$$25° < \max |SA\_S\_3| < 65°$$
$$0° < \max |SA\_O\_3| - \max |SA\_S\_3| < 20°$$

$$25° < \max |SA\_O\_3| < 50° \quad \text{[Equation 21-2]}$$
$$30° < \max |SA\_S\_3| < 60°$$
$$0° < \max |SA\_O\_3| - \max |SA\_S\_3| < 10°$$

$$30° < \max |SA\_O\_3| < 40° \quad \text{[Equation 21-3]}$$
$$35° < \max |SA\_S\_3| < 55°$$
$$0° < \max |SA\_O\_3| - \max |SA\_S\_3| < 5°$$

(In Equation 21, max |SA_O_3| means a maximum angle of the slope angle between the normal and the optical axis at any point on the object side surface in the distance range from the optical axis of the third lens to the effective diameter, and max |SA_S_3| means a maximum angle of the slope angle between the normal and the optical axis at any point on the sensor side in the distance range from the optical axis of the third lens to the effective diameter.)

As the optical system and optical module according to the embodiment satisfy Equation 21 above, the shape of the third lens disposed close to the fourth lens, which is a freeform lens, may be controlled. In detail, the distance between the third lens and the fourth lens adjacent to the fourth lens may be adjusted by setting the difference between the maximum slope angle of the third lens and the maximum slope angle to a set range. Accordingly, the aberration of the optical system and optical module can be reduced by adjusting the slope angle of the third lens.

The optical system and optical module according to the embodiment may satisfy Equation 22 including any one of Equation 22-1, Equation 22-2, or Equation 22-3 below.

$$10° < \max |SA\_O\_5| < 60° \quad \text{[Equation 22-1]}$$
$$20° < \max |SA\_S\_5| < 70°$$
$$0° < \max |SA\_O\_5| - \max |SA\_S\_5| < 35°$$

-continued $$15° < \max |SA\_O\_5| < 40° \quad \text{[Equation 22-2]}$$
$$25° < \max |SA\_S\_5| < 66°$$
$$0° < \max |SA\_O\_5| - \max |SA\_S\_5| < 30°$$

$$20° < \max |SA\_O\_5| < 35° \quad \text{[Equation 22-3]}$$
$$30° < \max |SA\_S\_5| < 60°$$
$$0° < \max |SA\_O\_5| - \max |SA\_S\_5| < 25°$$

(In Equation 22, max |SA_O_5| means a maximum angle of the slope angle between the normal and the optical axis at any point on the object side surface in the distance range from the optical axis of the fifth lens to the effective diameter, and max |SA_S_5| means a maximum angle of the slope angle between the normal and the optical axis at any point on the sensor side in the distance range from the optical axis of the fifth lens to the effective diameter.)

As the optical system and optical module according to the embodiment satisfy Equation 22 above, the shape of the fifth lens disposed close to the fourth lens, which is a freeform lens, may be controlled. In detail, the distance between the fourth lens and the adjacent fifth lens and fourth lens may be adjusted by setting the difference between the maximum slope angle of the fourth lens and the maximum slope angle to a set range. Accordingly, the aberration of the optical system and optical module can be reduced by adjusting the slope angle of the fifth lens.

The optical system and optical module according to the embodiment may satisfy Equation 23 including any one of Equation 23-1, Equation 23-2, or Equation 23-3 below.

$$\max |SA\_O\_5| < \max |SA\_O\_3|, \quad \text{[Equation 23-1]}$$
$$\max |SA\_S\_5| > \max |SA\_S\_3|,$$
$$\max |SA\_O\_5| < 45°$$
$$\max |SA\_S\_5| < 70°$$

$$\max |SA\_O\_5| < \max |SA\_O\_3|, \quad \text{[Equation 23-2]}$$
$$\max |SA\_S\_5| > \max |SA\_S\_3|,$$
$$\max |SA\_O\_5| < 40°$$
$$\max |SA\_S\_5| < 65°$$

$$\max |SA\_O\_5| < \max |SA\_O\_3|, \quad \text{[Equation 23-3]}$$
$$\max |SA\_S\_5| > \max |SA\_S\_3|,$$
$$\max |SA\_O\_5| < 35°$$
$$\max |SA\_S\_5| < 60°$$

(In Equation 23, max |SA_O_3| means a maximum angle of the slope angle between the normal and the optical axis at any point on the object side surface in the distance range from the optical axis of the third lens to the effective diameter, max |SA_S_3| means a maximum angle of the slope angle between the normal and the optical axis at any point on the sensor side in the distance range from the optical axis of the third lens to the effective diameter, max |SA_O_5| means a maximum angle of the slope angle between the normal and the optical axis at any point on the object side surface in the distance range from the optical axis of the fifth lens to the effective diameter, max |SA_S_5| means a maximum angle of the slope angle between the normal line of the sensor side surface and the optical axis at any point in the distance range from the optical axis of the fifth lens to the effective diameter.)

As the optical system and optical module according to the embodiment satisfy Equation 23 above, the shapes of the third lens and fifth lens disposed adjacent to the fourth lens, which is a freeform lens, may be controlled. In detail, the maximum slope angle of the object side surface of the fifth lens may be smaller than the maximum slope angle of the object side surface of the third lens, and the maximum slope angle of the sensor side surface of the fifth lens may be greater than the maximum slope angle of the sensor side surface of the third lens.

Accordingly, the distance between the third and fifth lenses adjacent to the fourth lens may be adjusted. Accordingly, the aberration of the optical system and optical module can be reduced by adjusting the inclination angles of the third lens and fifth lens, which are lenses adjacent to the fourth lens, which is a freeform lens.

The optical system and optical module according to the embodiment may satisfy Equation 24 below.

$$P\_1 \text{ is positive } (+), \quad P\_2 \text{ is negative } (-), \text{ and } \quad P\_4 \text{ is positive } (+) \qquad \text{[Equation 24]}$$

(In Equation 24, P_1 means a refractive power sign of the first lens, P_2 means a refractive power sign of the second lens, and P_4 means a refractive power sign of the fourth lens.)

As the optical system and optical module according to the embodiment satisfy Equation 24 above, the TTL size of the optical system module may be reduced, and the effective diameter of the object side surface of the lenses may be reduced. As a result, the optical system and optical module may be easily applied to display devices such as smartphones, resolution can be improved, and image quality in the peripheral region can be improved.

The optical system and optical module according to the embodiment may satisfy Equation 25 including any one of Equation 25-1, Equation 25-2, or Equation 25-3 below.

$$FOV(\theta) \leq 90°, \quad 1 \leq CA\_O\_5/CO\_O\_x \leq 3.5 \qquad \text{[Equation 25-1]}$$

$$FOV(\theta) \leq 90°, \quad 1.3 \leq CA\_O\_5/CO\_O\_x \leq 3.3 \qquad \text{[Equation 25-2]}$$

$$FOV(\theta) \leq 90°, \quad 1.5 \leq CA\_O\_5/CO\_O\_x \leq 3.0 \qquad \text{[Equation 25-3]}$$

(In Equation 25, FOV means an effective angle of view of the optical system, CA_O_x means an effective diameter of the object side of the lens closest to the aperture, and CA_O_5 means an effective diameter of the object side of the fifth lens.)

As the optical system and optical module according to the embodiment satisfy Equation 25 above, the effective diameter is large within the set effective angle of view range, by adjusting the effective diameter ratio of lenses with sensitive optical characteristics and lenses with small and relatively insensitive effective diameters, the aberration characteristics and resolution of optical systems and optical modules can be improved.

The optical system and optical module according to the embodiment may satisfy Equation 26 below.

$$P\_4 \text{ sign} \neq P\_5 \text{ sign}, \qquad \text{[Equation 26]}$$

-continued $$C\_5 > V\_4, \quad 10 < V4 < 50 < V5, \quad N\_5 < N\_4$$

(In Equation 26, P_4 sign is the refractive power sign of the fourth lens with a positive (+) or negative (−) sign, P_5 sign is a refractive power sign of the fifth lens, which has a positive (+) or negative (−) sign, V_4 is an Abbe number of the fourth lens, V_5 is an Abbe number of the fifth lens, N_4 is a refractive index of the fourth lens, and N_5 is a refractive index of the fifth lens.)

As the optical system and optical module according to the embodiment satisfies Equation 26 above, the refractive indices and Abbe numbers of the fourth lens and fifth lens may be set to a set range, thereby improving the chromatic aberration of the optical system and optical module.

The optical system and optical module according to the embodiment may satisfy Equation 27 including any one of Equation 27-1, Equation 27-2, and Equation 27-3 below.

$$1.00 \leq |EFL/f\_3| + |EFL/f\_4| + |EFL/f\_5| \leq 10.00 \qquad \text{[Equation 27-1]}$$

$$2.00 \leq |EFL/f\_3| + |EFL/f\_4| + |EFL/f5| \leq 7.00 \qquad \text{[Equation 27-2]}$$

$$3.00 \leq |EFL/f\_3| + |EFL/f\_4| + |EFL/f\_5| \leq 5.00 \qquad \text{[Equation 27-3]}$$

(In Equation 27, f_3 means a focal length of the third lens, f_4 means a focal length of the fourth lens, and f_5 means a focal length of the fifth lens.)

As the optical system and optical module according to the embodiment satisfy Equation 27 above, the aberration characteristics of the optical system and optical module can be improved by setting the ratio of the effective focal lengths of the sequentially arranged third lens, fourth lens, fifth lens, and sixth lens to a set range.

The optical system and optical module according to the embodiment may satisfy Equation 28 including any one of Equation 28-1, Equation 28-2, and Equation 28-3 below.

$$1 \leq |f\_1/f\_2| + |f\_1/f\_3| + |f\_1/f\_4| + |f\_1/f\_5| \leq 15 \qquad \text{[Equation 28-1]}$$

$$2 \leq |f\_1/f\_2| + |f\_1/f\_3| + |f\_1/f\_4| + |f\_1/f\_5| \leq 10 \qquad \text{[Equation 28-2]}$$

$$3 \leq |f\_1/f\_2| + |f\_1/f\_3| + |f\_1/f\_4| + |f\_1/f\_5| \leq 5 \qquad \text{[Equation 28-3]}$$

(In Equation 28, f_1 means a focal length of the first lens, f_2 means a focal length of the second lens, f_3 means the focal length of the third lens, f_4 means the focal length of the fourth lens, and f_5 means the focal length of the fifth lens.)

As the optical system and optical module according to the embodiment satisfy Equation 28 above, the aberration characteristics of the optical system and optical module can be improved by setting the ratio of the effective focal lengths of the sequentially arranged third lens, fourth lens, fifth lens, and sixth lens to a set range.

The optical system and optical module according to the embodiment may satisfy Equation 29 including any one of Equation 29-1, Equation 29-2, or Equation 29-3 below.

$$50 < |f\_3/CT\_3| \leq 300 \qquad \text{[Equation 29-1]}$$

-continued $$100 < |f\_3/CT\_3| \leq 250 \quad \text{[Equation 29-2]}$$

$$150 < |f\_3/CT\_3| \leq 200 \quad \text{[Equation 29-3]}$$

(In Equation 29, f_3 means the focal length of the third lens, and CT_3 means the thickness at the optical axis of the third lens.)

As the optical system and optical module according to the embodiment satisfy Equation 29 above, the aberration characteristics of the optical system and optical module can be improved by setting a ratio of the focal length of the third lens, which is placed adjacent to the fourth lens, which is a freeform lens, and the thickness in the optical axis to a set range.

The optical system and optical module according to the embodiment may satisfy Equation 30 including any one of Equation 30-1, Equation 30-2, or Equation 30-3 below.

$$1 < |f\_5/CT\_5| \leq 15 \quad \text{[Equation 30-1]}$$

$$2 \leq |f\_5/CT\_5| \leq 10 \quad \text{[Equation 30-2]}$$

$$3 \leq |f\_5/CT\_5| \leq 5 \quad \text{[Equation 30-3]}$$

(In Equation 30, f_5 means the focal length of the fifth lens, and CT_5 means the thickness at the optical axis of the fifth lens.)

As the optical system and optical module according to the embodiment satisfy Equation 30 above, the aberration characteristics of the optical system and optical module can be improved by setting a ratio of the focal length of the fifth lens, which is placed adjacent to the fourth lens, which is a freeform lens, and the thickness in the optical axis to a set range.

The optical system and optical module according to the embodiment may satisfy Equation 31 including any one of Equation 31-1, Equation 31-2, or Equation 31-3 below.

$$0.2 \leq CT\_5/CT\_3 \leq 2.5 \quad \text{[Equation 31-1]}$$

$$0.5 \leq CT\_5/CT\_3 \leq 2.0 \quad \text{[Equation 31-2]}$$

$$0.7 \leq CT\_5/CT\_3 \leq 1.5 \quad \text{[Equation 31-3]}$$

(In Equation 31, CT_5 means the thickness at the optical axis of the fifth lens, and CT_3 means the thickness at the optical axis of the third lens.)

As the optical system and optical module according to the embodiment satisfy Equation 31 above, the aberration characteristics of the optical system and optical module can be improved by setting a ratio of the thicknesses in the optical axis of the third lens and fifth lens, which are placed adjacent to the fourth lens, which is a freeform lens, to a set range.

The optical system and optical module according to the embodiment may satisfy Equation 32 including any one of Equation 32-1, Equation 32-2, or Equation 32-3 below.

$$0.3 \leq TTL/EFL \leq 2.0 \quad \text{[Equation 32-1]}$$

$$0.5 \leq TTL/EFL \leq 1.7 \quad \text{[Equation 32-2]}$$

-continued $$0.8 \leq TTL/EFL \leq 1.5 \quad \text{[Equation 32-3]}$$

(In Equation 32, TTL (Total track length) means the distance in the optical axis OA direction from the vertex of the object side surface of the first lens to the image surface of the image sensor unit, and EFL means an effective focal length of the optical system.)

As the optical system and optical module according to the embodiment satisfy Equation 32 above, by setting the ratio of TTL and effective focal length to a set range, the optical system and optical module may be implemented slim to have an appropriate size, and aberration characteristics can be improved.

The optical system and optical module according to the embodiment may satisfy Equation 33 including an one of Equation 33-1, Equation 33-2, or Equation 33-3 below.

$$0.1 \leq CD\_3/4/D\_ms\_3/4 \leq 2.0 \quad \text{[Equation 33-1]}$$

$$0.11 \leq CD\_3/4/D\_ms\_3/4 \leq 1.5 \quad \text{[Equation 33-2]}$$

$$0.15 \leq CD\_3/4/D\_ms\_3/4 \leq 1.0 \quad \text{[Equation 33-3]}$$

(In Equation 33, CD_4/5 means a distance from the optical axis of the third lens and the fourth lens, D_ms_4/5 means a distance in the optical axis direction from the point where the absolute value of the Sag value on the object side of the third lens and fourth lens is greatest.)

As the optical system and optical module according to the embodiment satisfy Equation 33 above, by setting the ratio of the distance from the maximum Sag value of the adjacent third lens and fourth lens to the distance from the optical axis to a set range, the aberration characteristics of the optical system and optical module can be improved.

The optical system and optical module according to the embodiment may satisfy Equation 34 including any one of Equation 34-1, Equation 34-2, or Equation 34-3 below.

$$0.1 \leq CD\_4/5/D\_ms\_4/5 \leq 2.0 \quad \text{[Equation 34-1]}$$

$$0.3 \leq CD\_4/5/D\_ms\_4/5 \leq 1.7 \quad \text{[Equation 34-2]}$$

$$0.5 \leq CD\_4/5/D\_ms\_4/5 \leq 1.5 \quad \text{[Equation 34-3]}$$

(In Equation 34, CD_4/5 means the distance from the optical axis of the fourth lens and fifth lens, D_ms_5/6 means a distance in the optical axis direction from the point where the absolute value of the Sag value on the object side surface of the fourth lens and fifth lens is greatest.)

As the optical system and optical module according to the embodiment satisfy Equation 34 above, by setting the ratio of the distance from the maximum Sag value of the adjacent fourth lens and fifth lens to the distance from the optical axis to a set range, the aberration characteristics of the optical system and optical module can be improved.

The optical system and optical module according to the embodiment may satisfy Equation 35 including any one of Equation 35-1, Equation 35-2, or Equation 35-3 below.

$$0.1 \leq CT\_3/T\_ms\_3 \leq 3 \quad \text{[Equation 35-1]}$$

-continued $$0.3 \le CT\_3/T\_ms\_3 \le 1.5 \quad \text{[Equation 35-2]}$$

$$0.5 \le CT\_3/T\_ms\_3 \le 1 \quad \text{[Equation 35-3]}$$

(In Equation 35, CT_3 means the thickness at the optical axis of the third lens, T_ms_3 means a thickness in the direction of the optical axis passing through the point where the absolute value of the Sag value on the object side surface of the third lens is the greatest.)

As the optical system and optical module according to the embodiment satisfy Equation 35 above, by setting the ratio of the thickness at the maximum Sag value of the third lens, which is placed adjacent to the fourth lens, which is a freeform lens, to the thickness on the optical axis within a set range, the aberration characteristics of the optical system and optical module can be improved.

The optical system and optical module according to the embodiment may satisfy Equation 36 including any one of Equation 36-1, Equation 36-2, or Equation 36-3 below.

$$0.1 \le CT\_5/T\_ms\_5 \le 5 \quad \text{[Equation 36-1]}$$

$$0.15 \le CT\_5/T\_ms\_5 \le 3 \quad \text{[Equation 36-2]}$$

$$0.3 \le CT\_5/T\_ms\_5 \le 1 \quad \text{[Equation 36-3]}$$

(In Equation 36, CT_5 means the thickness at the optical axis of the fifth lens, T_ms_5 means a thickness in the direction of the optical axis passing through the point where the absolute value of the Sag value on the object side surface of the fifth lens is greatest.)

As the optical system and optical module according to the embodiment satisfy Equation 36 above, by setting the ratio of the thickness at the maximum Sag value of the fifth lens, which is placed adjacent to the fourth lens, which is a freeform lens, to the thickness on the optical axis within a set range, the aberration characteristics of the optical system and optical module can be improved.

The optical system and optical module according to the embodiment may satisfy Equation 37 including any one of Equation 37-1, Equation 37-2, or Equation 37-3 below.

$$20 < V4 + V5 < 150 \quad \text{[Equation 37-1]}$$

$$30 < V4 + V5 < 130 \quad \text{[Equation 37-2]}$$

$$40 < V4 + V5 < 110 \quad \text{[Equation 37-3]}$$

(In Equation 37, V4 means the Abbe number of the fourth lens, and V5 means the Abbe number of the fifth lens.)

As the optical system and optical module according to the embodiment satisfy Equation 37 above, by setting the size of the Abbe number of the fourth lens and fifth lens placed close to the image sensor unit to a set range, the aberration characteristics of the optical system and optical module can be improved.

The optical system and optical module according to the embodiment may satisfy Equation 38 including any one of Equation 38-1, Equation 38-2, or Equation 38-3 below.

$$3.5 < TTL < 8.0 \quad \text{[Equation 38-1]}$$

$$3.8 < TTL < 7.0 \quad \text{[Equation 38-2]}$$

$$4.2 < TTL < 6.0 \quad \text{[Equation 38-3]}$$

(In Equation 38, TTL (Total track length) means the distance in the optical axis direction from the vertex of the object side surface of the first lens to the image surface of the image sensor unit.)

As the optical system and optical module according to the embodiment satisfy Equation 38 above, since the size of the TTL may be set to a set range, the optical system and optical module according to the embodiment can be miniaturized, so the optical system and optical module according to the embodiment can be easily applied to display devices such as smartphones.

The optical system and optical module according to the embodiment may satisfy Equation 39 including any one of Equation 39-1, Equation 39-2, or Equation 39-3 below.

$$1.5 < TTL/EPD < 4 \quad \text{[Equation 39-1]}$$

$$1.8 < TTL/EPD < 3 \quad \text{[Equation 39-2]}$$

$$2.0 < TTL/EPD < 2.7 \quad \text{[Equation 39-3]}$$

(In Equation 39, TTL (Total track length) means the distance in the optical axis direction from the vertex of the object side surface of the first lens to the image surface of the image sensor unit, and EPD means an entrance pupil diameter of the optical system.)

As the optical system and optical module according to the embodiment satisfy Equation 39 above, the resolution of the optical system and optical module can be improved by setting the TTL and the diameter of the entrance pupil to a set range.

The optical system and optical module according to the embodiment may satisfy Equation 40 including any one of Equation 40-1, Equation 40-2, or Equation 40-3 below.

$$1 < F \text{ number} < 3.5 \quad \text{[Equation 40-1]}$$

$$1.5 < F \text{ number} < 3.0 \quad \text{[Equation 40-2]}$$

$$1.7 < F \text{ number} < 2.5 \quad \text{[Equation 40-3]}$$

As the optical system and optical module according to the embodiment satisfy Equation 40 above, the resolution of the optical system and optical module can be improved by setting the size of the F number to a set range.

The optical system and optical module according to the embodiment may satisfy Equation 41 including any one of Equation 41-1, Equation 41-2, or Equation 41-3 below.

$$0.5 \text{ mm} < D\_mx\_5/I < 2.0 \text{ mm} \quad \text{[Equation 41-1]}$$

$$0.65 \text{ mm} < D\_mx\_5/I < 1.8 \text{ mm} \quad \text{[Equation 41-2]}$$

$$0.8 \text{ mm} < D\_mx\_5/I < 1.5 \text{ mm} \quad \text{[Equation 41-3]}$$

(In Equation 41, D_mx_5/I means a distance in the optical axis direction from the point having the absolute value of the maximum Sag value on the sensor side surface of the fifth lens to the image surface of the image sensor unit.)

As the optical system and optical module according to the embodiment satisfy Equation 41 above, by setting the distance between the fifth lens, which is the last lens of the optical system, and the image sensor unit within a set range, manufacturing of the optical system and optical module may be facilitated, and optical characteristics can be improved by minimizing interference between the image sensor unit and the optical system.

The optical system 1000 and the optical module 2000 according to embodiments may satisfy at least one of Equations 1 to 41 described above. In detail, the optical system 1000 and the optical module 2000 according to the embodiment may satisfy any one of the above equations or a combination of at least two of the above equations.

As the optical system 1000 and the optical module 2000 according to the embodiment satisfy any one of the above equations or a combination of at least two or more equations, the optical system 1000 and the optical module 2000 may have improved optical characteristics. Additionally, the optical system 1000 and the optical module 2000 can minimize optical distortion in image results. Additionally, small optical systems and optical modules may be implemented. Additionally, chromatic aberration of the optical system 1000 and the optical module 2000 can be reduced, and the relative illumination can be increased to improve peripheral image quality.

Hereinafter, The optical system and optical module according to embodiments will be described with reference to the drawings.

First, the optical system 1000 and the optical module 2000 according to the first embodiment will be described in more detail with reference to FIGS. 8 to 19.

Figure 8:
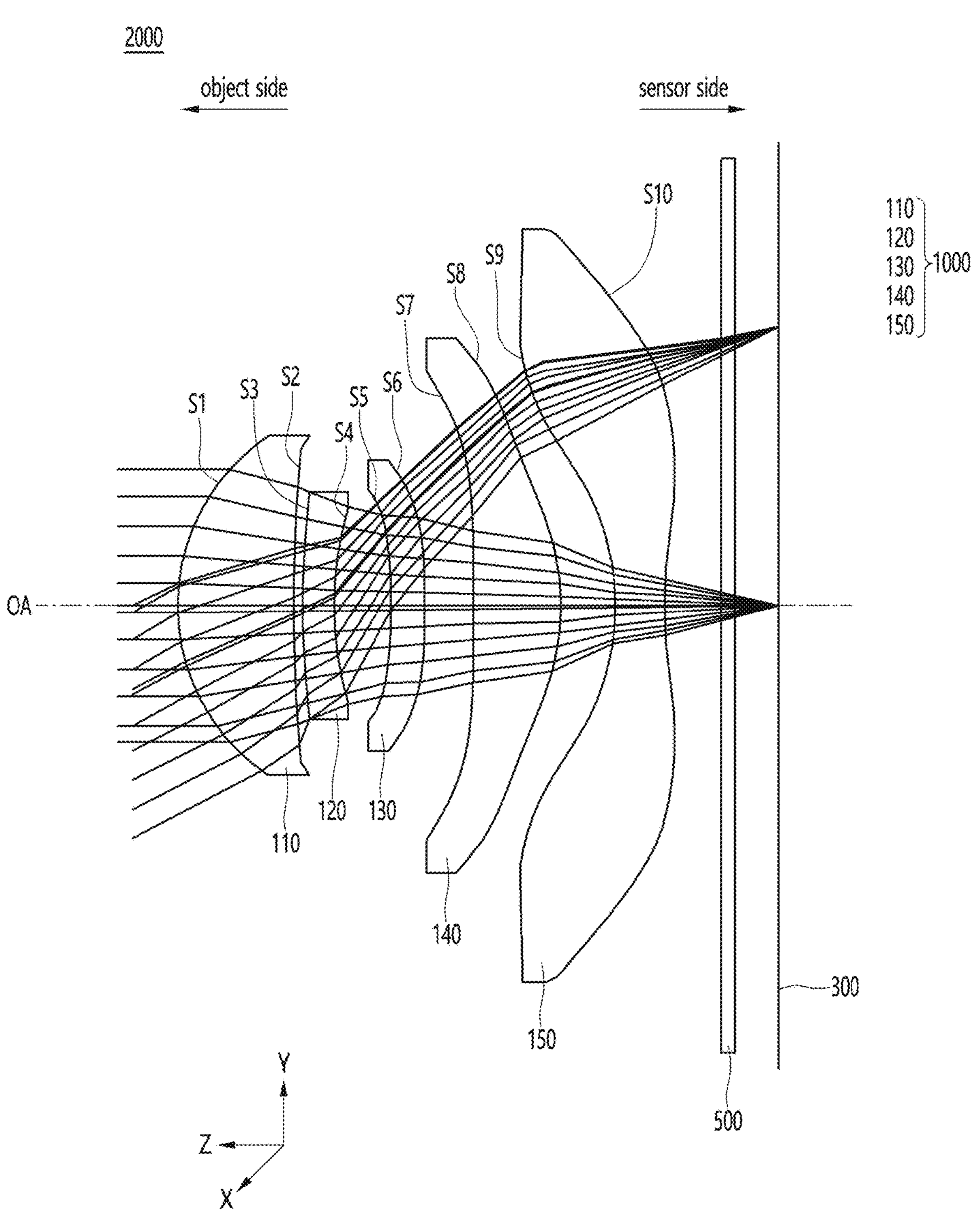
FIG. 8 is a diagram showing the configuration of an optical system and an optical module according to a first embodiment.

Referring to FIG. 8, the optical system 1000 and the optical module 2000 according to the first embodiment may include five lenses.

In detail, the optical system 1000 and the optical module 2000 according to the first embodiment may include a first lens 110, a second lens 120, a third lens 130, a fourth lens 140, a fifth lens 150, and an image sensor unit 300 arranged sequentially from the object side to the sensor side. The first lens 110, the second lens 120, the third lens 130, the fourth lens 140 and the fifth lens 150 may be sequentially arranged along the optical axis of the optical system 1000 while being spaced apart from each other.

Additionally, a filter unit 500 may be disposed between the plurality of lenses 110, 120, 130, 140, and 150 and the image sensor unit 300. The filter unit 500 may be disposed between the fifth lens 150 and the image sensor unit 300.

Additionally, the optical system 1000 according to the first embodiment may include an aperture (not shown). The aperture may be disposed between the first lens 110 and the second lens 120. Alternatively, the sensor side surface of the first lens 110 may be an aperture.

The first to fifth lenses 110, 120, 130, 140, and 150 according to the first embodiment each may have Radius of Curvature, Thickness, Distance, Refractive Index, and Abbe's Number.

In detail, the first to fifth lenses 110, 120, 130, 140, and 150 according to the first embodiment, Radius of Curvature, Thickness, Distance, Refractive Index and Abbe's Number may be the same as FIG. 9.

Referring to FIGS. 8 and 9, in the optical system 1000 according to the first embodiment, the first lens 110 may have positive refractive power at the optical axis. The first surface S1 of the first lens 110 may be convex with respect to the object side surface on the optical axis, and the second surface S2 may be concave with respect to the sensor side surface on the optical axis. The first lens 110 may overall have a meniscus shape convex from the optical axis toward the object side. The first surface S1 may be an aspherical surface, and the second surface S2 may be an aspherical surface.

The second lens 120 may have negative (−) refractive power at the optical axis. The third surface S3 of the second lens 120 may be convex with respect to the object side surface on the optical axis, and the fourth surface S4 may be concave with respect to the sensor side surface on the optical axis. The second lens 120 may overall have a meniscus shape convex from the optical axis toward the object side. The third surface S3 may be an aspherical surface, and the fourth surface S4 may be an aspherical surface.

The third lens 130 may have negative (−) refractive power at the optical axis. The fifth surface S5 of the third lens 130 may be convex with respect to the object side surface on the optical axis, and the sixth surface S6 may be convex with respect to the sensor side surface on the optical axis. The third lens 130 may have an overall shape in which both sides are convex on the optical axis. The fifth surface S5 may be an aspherical surface, and the sixth surface S6 may be an aspherical surface.

The fourth lens 140 may have positive (+) refractive power at the optical axis. The seventh surface S7 of the fourth lens 140 may be concave with respect to the object side surface on the optical axis, and the eighth surface S8 may be convex with respect to the sensor side surface on the optical axis. The fourth lens 140 may overall have a convex meniscus shape from the optical axis toward the sensor side.

At least one of the seventh surface S7 or the eighth surface S8 may include a freeform surface. In detail, the seventh surface S7 and the eighth surface S8 may include freeform surfaces. That is, the fourth lens 140 may be a freeform lens.

The fifth lens 150 may have negative (−) refractive power at the optical axis. The ninth surface S9 of the fifth lens 150 may be concave with respect to the object side surface on the optical axis, and the tenth surface S10 may be concave with respect to the sensor side surface on the optical axis. The fifth lens 150 may have an overall shape where both sides are concave on the optical axis.

The free curved shape of the fourth lens 140 may be defined by the Sag value calculated by Equation D above.

In detail, the fourth lens 140 may include an order in which the orders of the Zernike coefficient of FIG. 10 have a value of 0 and an order having a value other than 0.

In detail, the fourth lens 140 sets all orders having Sin θ and Cos θ to the value of 0 in FIGS. 11*a*-11*c*, the fourth lens may be manufactured by adjusting some of the orders having Cos 2nθ to non-zero values.

FIG. 12 shows the numerical values of items applied to the above equations in the optical system 1000 and optical module 2000 according to the first embodiment, FIG. 13 shows slope angles for each position of the first to fifth lenses in the optical system according to the first embodiment, FIG. 14 shows the lens interval for each position of the first to fifth lenses in the optical system according to the first embodiment, FIG. 15 shows the lens thickness at each position of the first to fifth lenses in the optical system according to the first embodiment, FIG. 16 shows Sag values for each position of the first to fifth lenses in the optical system according to the first embodiment, FIG. 17 shows the aspherical surface coefficient value of the optical system 1000 according to the first embodiment, FIG. 18 is a graph showing the degree of distortion of the optical system and optical module according to the first embodiment, FIG. 19 is a table for explaining the MTF characteristics of the optical system and optical module according to the first embodiment.

Referring to FIG. 13, it may be seen that in the optical system and optical module according to the first embodiment, the first to fifth lenses are formed at different slope angles at each position.

Additionally, it may be seen that the slope angle of the first to fifth lenses gradually increases as they move away from the optical axis. That is, it may be seen that the first to fifth lenses have the greatest slope angle at the end of the effective diameter.

In addition, it may be seen that the slope angle of the first to fifth lenses increases as they move away from the optical axis. That is, it may be seen that the curvature of the overall lens surface of the first to fifth lenses increases as they move away from the optical axis.

Additionally, it may be seen that at least one lens among the first to fifth lenses includes a region where the sign of the slope angle changes. That is, it may be seen that at least one lens among the first to fifth lenses includes a critical point.

Additionally, it may be seen that at least one lens among the first to fifth lenses includes a region where the size of the slope angle decreases.

Referring to FIG. 14, it may be seen that in the optical system and optical module according to the first embodiment, the first to fifth lenses are formed at different lens intervals for each position.

Additionally, at least one lens among the first to fifth lenses may include a region where the size of the lens interval is reduced. For example, the interval between the second lens and the third lens and the interval between the fourth lens and the fifth lens may include a region where the size of the lens interval decreases.

Additionally, at least one lens among the first to fifth lenses may include a region where the size of the lens interval increases. For example, the interval between the first lens and the second lens, the interval between the third lens and the fourth lens, and the interval between the fourth lens and the fifth lens may include a region where the size of the lens interval increases.

In addition, the region where the size of the lens interval decreases for at least one lens among the first to fifth lenses may be larger than the region where the size of the lens interval increases. For example, the interval between the second lens and the third lens may be larger in the region where the size of the lens interval decreases than the region where the size of the lens interval increases.

In addition, the region where the size of the lens interval increases for at least one lens among the first to fifth lenses may be larger than the region where the size of the lens interval decreases. For example, the interval between the first lens and the second lens and the interval between the third lens and the fourth lens may be larger in a region where the size of the lens interval increases than a region where the size of the lens interval decreases.

Additionally, at least one lens among the first to fifth lenses may include only a region where the size of the lens interval decreases. For example, the interval between the second lens and the third lens may include only a region where the size of the lens interval decreases.

Additionally, at least one lens among the first to fifth lenses may include only a region where the size of the lens interval increases. For example, the interval between the first lens and the second lens and the interval between the third lens and the fourth lens may include only a region where the size of the lens interval increases.

Referring to FIG. 15, it may be seen that in the optical system and optical module according to the first embodiment, the first to fifth lenses are formed with different lens thicknesses at each position.

Additionally, at least one lens among the first to fifth lenses may include a region where the lens thickness decreases. For example, the first lens, the fourth lens, and the fifth lens may include a region where the lens thickness decreases.

Additionally, at least one lens among the first to fifth lenses may include a region where the lens thickness increases. For example, the second lens, the third lens, the fourth lens, and the fifth lens may include a region where the lens thickness increases.

In addition, the region where the lens thickness decreases may be larger than the region where the lens thickness of at least one lens among the first to fifth lenses increases. For example, the region where the thickness of the first lens and the fourth lens decreases may be larger than the region where the thickness increases.

In addition, the region where the lens thickness increases for at least one lens among the first to fifth lenses may be larger than the region where the lens thickness decreases. For example, the region where the thickness of the second lens and the fifth lens increases may be larger than the region where the thickness decreases.

Additionally, at least one lens among the first to fifth lenses may include only a region where the lens thickness decreases. For example, the first lens may include only a region where the lens thickness decreases.

Additionally, at least one lens among the first to fifth lenses may include only a region where the lens thickness increases. For example, the second lens and the third lens may include only a region where the lens thickness increases.

Referring to FIG. 16, it may be seen that the optical system and optical module according to the first embodiment are formed with the first to fifth lenses having different Sag values at each position.

Additionally, at least one lens among the first to fifth lenses may include a region where the size of the Sag value decreases. For example, the third surface of the second lens, the seventh surface of the fourth lens, and the tenth surface of the fifth lens may include a region where the absolute value of the Sag value decreases.

Additionally, at least one lens among the first to fifth lenses may include a region in which the size of the Sag value increases. For example, the first surface and second surface of the first lens, the third surface and fourth surface of the second lens, the fifth surface and sixth surface of the third lens, the seventh surface and eighth surface of the fourth lens, and the ninth surface and tenth surface of the fifth lens may include regions where the Sag value increases.

In addition, the region where the Sag value increases for at least one lens among the first to fifth lenses may be larger than the region where the Sag value decreases. For example, for the first and second surfaces of the first lens, the third and fourth surfaces of the second lens, the fifth and sixth surfaces of the third lens, the seventh and eighth surfaces of the fourth lens, and the ninth and tenth surfaces of the fifth lens, the region where the Sag value increases may be larger than the region where the Sag value decreases.

Additionally, at least one lens among the first to fifth lenses may include only a region where the size of the Sag value increases. For example, the first and second surfaces of the first lens, the fourth surface of the second lens, and the fifth and sixth surfaces of the third lens may include only regions where the lens thickness increases.

In the optical system 1000 and the optical module 2000 according to the first embodiment, the numerical values in FIG. 12 may satisfy at least one of Equations 1 to 41. In detail, the optical system 1000 and the optical module 2000 according to the first embodiment may satisfy all of Equations 1 to 41 above.

Accordingly, it may be seen that the optical system and optical module according to the first embodiment have low distortion characteristics as shown in FIG. 18.

Additionally, it may be seen that the optical system and optical module according to the first embodiment have improved MTF characteristics as shown in FIG. 19.

Hereinafter, the optical system 1000 and the optical module 2000 according to the second embodiment will be described in more detail with reference to FIGS. 20 to 30.

Referring to FIG. 20, the optical system 1000 and the optical module 2000 according to the second embodiment may include five lenses.

In detail, the optical system 1000 and the optical module 2000 according to the second embodiment may include a first lens 110, a second lens 120, and a third lens 130, a fourth lens 140, a fifth lens 150, and an image sensor unit 300 arranged sequentially from the object side to the sensor side. The first lens 110, the second lens 120, the third lens 130, the fourth lens 140, and the fifth lens 150 may be sequentially arranged along the optical axis of the optical system 1000 while being spaced apart from each other.

Additionally, a filter unit 500 may be disposed between the plurality of lenses 110, 120, 130, 140, and 150 and the image sensor unit 300. The filter unit 500 may be disposed between the fifth lens 150 and the image sensor unit 300.

Additionally, the optical system 1000 according to the second embodiment may include an aperture (not shown). The aperture may be disposed between the first lens 110 and the second lens 120. Alternatively, the sensor side surface of the first lens 110 may be an aperture.

The first to fifth lenses 110, 120, 130, 140, and 150 according to the second embodiment may each have a Radius of Curvature, Thickness, Distance, Refractive Index and Abbe's Number of a set value.

In detail, the Radius of Curvature, Thickness, Distance, Refractive Index and Abbe's Number of the first to fifth lenses 110, 120, 130, 140, and 150 according to the second embodiment may be the same as FIG. 21.

Referring to FIGS. 20 and 21, in the optical system 1000 according to the second embodiment, the first lens 110 may have positive (+) refractive power at the optical axis. The first surface S1 of the first lens 110 may be convex with respect to the object side surface on the optical axis, and the second surface S2 may be concave with respect to the sensor side surface on the optical axis. The first lens 110 may overall have a meniscus shape convex from the optical axis toward the object side. The first surface S1 may be an aspherical surface, and the second surface S2 may be an aspherical surface.

The second lens 120 may have negative (−) refractive power at the optical axis. The third surface S3 of the second lens 120 may be convex with respect to the object side surface on the optical axis, and the fourth surface S4 may be concave with respect to the sensor side surface on the optical axis. The second lens 120 may overall have a meniscus shape convex from the optical axis toward the object side. The third surface S3 may be an aspherical surface, and the fourth surface S4 may be an aspherical surface.

The third lens 130 may have negative (−) refractive power at the optical axis. The fifth surface S5 of the third lens 130 may be convex with respect to the object side surface on the optical axis, and the sixth surface S6 may be convex with respect to the sensor side surface on the optical axis. The third lens 130 may have an overall shape in which both sides are convex on the optical axis. The fifth surface S5 may be an aspherical surface, and the sixth surface S6 may be an aspherical surface.

The fourth lens 140 may have positive (+) refractive power at the optical axis. The seventh surface S7 of the fourth lens 140 may be concave with respect to the object side surface on the optical axis, and the eighth surface S8 may be convex with respect to the sensor side surface on the optical axis. The fourth lens 140 may overall have a convex meniscus shape from the optical axis toward the sensor side.

At least one of the seventh surface S7 and the eighth surface S8 may include a freeform surface. In detail, the seventh surface S7 and the eighth surface S8 may include freeform surfaces. That is, the fourth lens 140 may be a freeform lens.

The fifth lens 150 may have negative (−) refractive power at the optical axis. The ninth surface S9 of the fifth lens 150 may be concave with respect to the object side surface on the optical axis, and the tenth surface S10 may be concave with respect to the sensor side surface on the optical axis. The fifth lens 10 may have an overall shape where both sides are concave on the optical axis.

The free curved shape of the fourth lens 140 may be defined by the Sag value calculated by Equation D above.

In detail, the fourth lens 140 may include an order in which the orders of the Zernike coefficient of FIG. 22 have a value of 0 and an order having a value other than 0.

In detail, the fourth lens 140 sets all orders having Sin θ and Cos θ to the value of 0 in FIGS. 11*a*-11*c*, the fourth lens may be manufactured by adjusting some of the orders having Cos 2nθ to non-zero values.

FIG. 23 shows the numerical values of items applied to the above equations in the optical system 1000 and optical module 2000 according to the second embodiment, FIG. 24 shows the slope angle for each position of the first to fifth lenses in the optical system according to the second embodiment, FIG. 25 shows the lens interval for each position of the first to fifth lenses in the optical system according to the second embodiment, FIG. 26 shows the lens thickness at each position of the first to fifth lenses in the optical system according to the second embodiment, FIG. 27 shows Sag values for each position of the first to fifth lenses in the optical system according to the second embodiment, FIG. 28 shows the aspherical surface coefficient value of the optical system 1000 according to the second embodiment, FIG. 29 is a graph showing the degree of distortion of the optical system and optical module according to the second embodiment. FIG. 30 is a table for explaining the MTF characteristics of the optical system and optical module according to the second embodiment.

Referring to FIG. 24, it may be seen that in the optical system and optical module according to the second embodiment, the first to fifth lenses are formed at different slope angles at each position.

Additionally, it may be seen that the slope angle of the first to fifth lenses gradually increases as they move away from the optical axis. That is, it may be seen that the first to fifth lenses have the greatest slope angle at the end of the effective diameter.

Additionally, it may be seen that the slope angle of the first to fifth lenses increases as they move away from the optical axis. That is, it may be seen that the curvature of the overall lens surface of the first to fifth lenses increases as they move away from the optical axis.

Additionally, it may be seen that at least one lens among the first to fifth lenses includes a region where the sign of the slope angle changes. That is, it may be seen that at least one lens among the first to fifth lenses includes a critical point.

Additionally, it may be seen that at least one lens among the first to fifth lenses includes a region where the size of the slope angle decreases.

Referring to FIG. 25, it may be seen that in the optical system and optical module according to the second embodiment, the first to fifth lenses are formed at different lens intervals for each position.

Additionally, at least one lens among the first to fifth lenses may include a region where the size of the lens interval is reduced. For example, the interval between the second lens and the third lens and the interval between the fourth lens and the fifth lens may include a region where the size of the lens interval decreases.

Additionally, at least one lens among the first to fifth lenses may include a region where the size of the lens interval increases. For example, the interval between the first lens and the second lens and the interval between the third lens and the fourth lens may include a region where the size of the lens interval increases.

In addition, the region where the size of the lens interval decreases for at least one lens among the first to fifth lenses may be larger than the region where the size of the lens interval increases. For example, the interval between the second lens and the third lens may be larger in the region where the size of the lens interval decreases than the region where the size of the lens interval increases.

In addition, the region where the size of the lens interval increases for at least one lens among the first to fifth lenses may be larger than the region where the size of the lens interval decreases. For example, the interval between the first lens and the second lens and the interval between the third lens and the fourth lens may be larger in a region where the size of the lens interval increases than a region where the size of the lens interval decreases.

Additionally, at least one lens among the first to fifth lenses may include only a region where the size of the lens interval decreases. For example, the interval between the second lens and the third lens may include only a region where the size of the lens interval decreases.

Additionally, at least one lens among the first to fifth lenses may include only a region where the size of the lens interval increases. For example, the interval between the first lens and the second lens and the interval between the third lens and the fourth lens may include only a region where the size of the lens interval increases.

Referring to FIG. 26, it may be seen that in the optical system and optical module according to the second embodiment, the first to fifth lenses are formed with different lens thicknesses at each position.

Additionally, at least one lens among the first to fifth lenses may include a region where the lens thickness decreases. For example, the first lens, the fourth lens, and the fifth lens may include a region where the lens thickness decreases.

Additionally, at least one lens among the first to fifth lenses may include a region where the lens thickness increases. For example, the second lens and the third lens may include a region where the lens thickness increases.

In addition, the region where the lens thickness decreases may be larger than the region where the lens thickness of at least one lens among the first to fifth lenses increases. For example, the region where the thickness of the first lens and the fourth lens decreases may be larger than the region where the thickness increases.

In addition, the region where the lens thickness increases for at least one lens among the first to fifth lenses may be larger than the region where the lens thickness decreases. For example, the region where the thickness of the second lens increases may be larger than the region where the thickness decreases.

Additionally, at least one lens among the first to fifth lenses may include only a region where the lens thickness decreases. For example, the first lens and the third lens may include only regions where the lens thickness decreases.

Additionally, at least one lens among the first to fifth lenses may include only a region where the lens thickness increases. For example, the second lens may include only a region where the lens thickness increases.

Referring to FIG. 27, it may be seen that the optical system and optical module according to the second embodiment are formed with the first to fifth lenses having different Sag values at each position.

Additionally, at least one lens among the first to fifth lenses may include a region where the size of the Sag value decreases. For example, the third surface of the second lens, the eighth surface of the fourth lens, and the ninth surface of the fifth lens may include a region where the absolute value of the Sag value decreases.

Additionally, at least one lens among the first to fifth lenses may include a region in which the size of the Sag value increases. For example, the first surface and second surface of the first lens, the third surface and fourth surface of the second lens, the fifth surface and sixth surface of the third lens, and the seventh surface and eighth surface of the fourth lens may include a region where the Sag value increases.

Additionally, at least one lens among the first to fifth lenses may include a region where the size of the Sag value decreases. For example, the ninth surface and the tenth surface of the fifth lens may include regions where the Sag value decreases.

In addition, the region where the Sag value of at least one of the first to fifth lenses increases may be larger than the region where the Sag value decreases. For example, for the first surface and second surface of the first lens, the third surface and fourth surface of the second lens, the fifth surface and sixth surface of the third lens, and the seventh surface and eighth surface of the fourth lens, the region where the Sag value increases may be larger than the region where the Sag value decreases.

Additionally, at least one lens among the first to fifth lenses may include only a region where the size of the Sag value increases. For example, the first surface and second surface of the first lens, the third surface and fourth surface of the second lens, and the fifth surface and sixth surface of the third lens may include only regions where the size of the Sag value increases.

In the optical system 1000 and the optical module 2000 according to the second embodiment, the numerical values in FIG. 21 may satisfy at least one of Equations 1 to 44. In detail, the optical system 1000 and the optical module 2000 according to the second embodiment may satisfy all of Equations 1 to 41 above.

Accordingly, it may be seen that the optical system and optical module according to the second embodiment may have low distortion characteristics as shown in FIG. 29.

Additionally, it may be seen that the optical system and optical module according to the second embodiment may have improved MTF characteristics as shown in FIG. 30.

Hereinafter, the optical system 1000 and the optical module 2000 according to the third embodiment will be described in more detail with reference to FIGS. 31 to 41.

Referring to FIG. 31, the optical system 1000 and optical module 2000 according to the third embodiment may include six lenses.

In detail, the optical system 1000 and the optical module 2000 according to the third embodiment may include a first lens 110, a second lens 120, and a third lens 130 a fourth lens 140, a fifth lens 150, and an image sensor unit 300 arranged sequentially from the object side to the sensor side. The first lens 110, the second lens 120, the third lens 130, the fourth lens 140, and the fifth lens 150 may be sequentially arranged along the optical axis of the optical system 1000 while being spaced apart from each other.

Additionally, a filter unit 500 may be disposed between the plurality of lenses 110, 120, 130, 140, and 150 and the image sensor unit 300. The filter unit 500 may be disposed between the fifth lens 150 and the image sensor unit 300.

Additionally, the optical system 1000 according to the third embodiment may include an aperture (not shown). The aperture may be disposed between the first lens 110 and the second lens 120. Alternatively, the sensor side surface of the first lens 110 may be an aperture.

The first to fifth lenses 110, 120, 130, 140, and 150 according to the third embodiment may each have a set values of Radius of Curvature, Thickness, Distance, Refractive Index, and Abbe's Number.

In detail, Radius of Curvature, Thickness, Distance, Refractive Index, and Abbe's Number of the first to fifth lenses 110, 120, 130, 140, and 150 according to the third embodiment may be as shown in FIG. 31.

Referring to FIGS. 31 and 32, in the optical system 1000 according to the third embodiment, the first lens 110 may have positive (+) refractive power at the optical axis. The first surface S1 of the first lens 110 may be convex with respect to the object side surface on the optical axis, and the second surface S2 may be concave with respect to the sensor side surface on the optical axis. The first lens 110 may overall have a meniscus shape convex from the optical axis toward the object side. The first surface S1 may be an aspherical surface, and the second surface S2 may be an aspherical surface.

The second lens 120 may have negative (−) refractive power at the optical axis. The third surface S3 of the second lens 120 is convex with respect to the object side surface on the optical axis. The first lens 110 may have positive refractive power at the optical axis. The first surface S1 of the first lens 110 may be convex with respect to the object side surface on the optical axis, and the second surface S2 may be concave with respect to the sensor side surface on the optical axis. The first lens 110 may overall have a meniscus shape convex from the optical axis toward the object side. The first surface S1 may be an aspherical surface, and the second surface S2 may be an aspherical surface.

The second lens 120 may have negative (−) refractive power at the optical axis. The third surface S3 of the second lens 120 may be convex with respect to the object side surface on the optical axis, and the fourth surface S4 may be concave with respect to the sensor side surface on the optical axis. The second lens 120 may overall have a meniscus shape convex from the optical axis toward the object side. The third surface S3 may be an aspherical surface, and the fourth surface S4 may be an aspherical surface.

The third lens 130 may have negative (−) refractive power at the optical axis. The fifth surface S5 of the third lens 130 may be convex with respect to the object side surface on the optical axis, and the sixth surface S6 may be convex with respect to the sensor side surface on the optical axis. The third lens 130 may have an overall shape in which both sides are convex on the optical axis. The fifth surface S5 may be an aspherical surface, and the sixth surface S6 may be an aspherical surface.

The fourth lens 140 may have positive (+) refractive power at the optical axis. The seventh surface S7 of the fourth lens 140 may be concave with respect to the object side surface on the optical axis, and the eighth surface S8 may be convex with respect to the sensor side surface on the optical axis. The fourth lens 140 may overall have a convex meniscus shape from the optical axis toward the sensor side.

At least one of the seventh surface S7 or the eighth surface S8 may include a freeform surface. In detail, the seventh surface S7 and the eighth surface S8 may include freeform surfaces. That is, the fourth lens 140 may be a freeform lens.

The fifth lens 150 may have negative (−) refractive power at the optical axis. The ninth surface S9 of the fifth lens 150 may be concave with respect to the object side surface on the optical axis, and the tenth surface S10 may be concave with respect to the sensor side surface on the optical axis. The fifth lens 150 may have an overall shape where both sides are concave on the optical axis.

The free curved shape of the fourth lens 140 may be defined by the Sag value calculated by Equation D above.

In detail, the fourth lens 140 may include an order in which the orders of the Zernike coefficient of FIG. 33 have a value of 0 and an order having a value other than 0.

In detail, the fourth lens 140 sets all orders having Sin $\theta$ and Cos $\theta$ to the value of 0 in FIGS. 11*a*-11*c*, the fourth lens may be manufactured by adjusting some of the orders having Cos $2n\theta$ to non-zero values.

FIG. 34 shows the numerical values of items applied to the above equations in the optical system 1000 and optical module 2000 according to the third embodiment, FIG. 35 shows slope angles for each position of the first to fifth lenses in the optical system according to the third embodiment, FIG. 36 shows the lens interval for each position of the first to fifth lenses in the optical system according to the third embodiment, FIG. 37 shows the lens thickness at each position of the first to fifth lenses in the optical system according to the third embodiment, FIG. 38 shows Sag values for each position of the first to fifth lenses in the optical system according to the third embodiment, FIG. 39 shows the aspherical surface coefficient value of the optical system 1000 according to the third embodiment, FIG. 40 is a graph showing the degree of distortion of the optical system and optical module according to the third embodiment, FIG. 41 is a table for explaining the MTF characteristics of the optical system and optical module according to the third embodiment.

Referring to FIG. 35, it may be seen that in the optical system and optical module according to the third embodiment, the first to fifth lenses are formed at different slope angles at each position.

Additionally, it may be seen that the slope angle of the first to fifth lenses gradually increases as they move away from the optical axis. That is, it may be seen that the first to fifth lenses have the greatest slope angle at the end of the effective diameter.

In addition, it may be seen that the slope angle of the first to fifth lenses increases as they move away from the optical axis. That is, it may be seen that the curvature of the overall lens surface of the first to fifth lenses increases as they move away from the optical axis.

Additionally, it may be seen that at least one lens among the first to fifth lenses includes a region where the sign of the slope angle changes. That is, it may be seen that at least one lens among the first to fifth lenses includes a critical point.

Additionally, it may be seen that at least one lens among the first to fifth lenses includes a region where the size of the slope angle decreases.

Referring to FIG. 36, it may be seen that in the optical system and optical module according to the third embodiment, the first to fifth lenses are formed at different lens intervals for each position.

Additionally, at least one lens among the first to fifth lenses may include a region where the size of the lens interval decreases. For example, the interval between the second lens and the third lens and the interval between the fourth lens and the fifth lens may include a region where the size of the lens interval decreases.

Additionally, at least one lens among the first to fifth lenses may include a region where the size of the lens interval increases. For example, the interval between the first lens and the second lens and the interval between the third lens and the fourth lens may include a region where the size of the lens interval increases.

In addition, the region where the size of the lens interval decreases for at least one lens among the first to fifth lenses may be larger than the region where the size of the lens interval increases. For example, the interval between the second lens and the third lens may be larger in the region where the size of the lens interval decreases than the region where the size of the lens interval increases.

In addition, the region where the size of the lens interval increases for at least one lens among the first to fifth lenses may be larger than the region where the size of the lens interval decreases. For example, the interval between the first lens and the second lens and the interval between the third lens and the fourth lens may be larger in a region where the size of the lens interval increases than a region where the size of the lens interval decreases.

Additionally, at least one lens among the first to fifth lenses may include only a region where the size of the lens interval decreases. For example, the interval between the second lens and the third lens may include only a region where the size of the lens interval decreases.

Additionally, at least one lens among the first to fifth lenses may include only a region where the size of the lens interval increases. For example, the interval between the first lens and the second lens and the interval between the third lens and the fourth lens may include only a region where the size of the lens interval increases.

Referring to FIG. 37, it may be seen that in the optical system and optical module according to the third embodiment, the first to fifth lenses are formed with different lens thicknesses at each position.

Additionally, at least one lens among the first to fifth lenses may include a region where the lens thickness decreases. For example, the first lens, the fourth lens, and the fifth lens may include a region where the lens thickness decreases.

Additionally, at least one lens among the first to fifth lenses may include a region where the lens thickness increases. For example, the second lens and the third lens may include a region where the lens thickness increases.

In addition, the region where the lens thickness decreases may be larger than the region where the lens thickness of at least one lens among the first to fifth lenses increases. For example, the region where the thickness of the first lens and the fourth lens decreases may be larger than the region where the thickness increases.

In addition, the region where the lens thickness increases for at least one lens among the first to fifth lenses may be larger than the region where the lens thickness decreases. For example, the region where the thickness of the second lens increases may be larger than the region where the thickness decreases.

Additionally, at least one lens among the first to fifth lenses may include only a region where the lens thickness decreases. For example, the first lens and the third lens may include only regions where the lens thickness decreases.

Additionally, at least one lens among the first to fifth lenses may include only a region where the lens thickness increases. For example, the second lens may include only a region where the lens thickness increases.

Referring to FIG. 38, it may be seen that the optical system and optical module according to the third embodiment are formed with the first to fifth lenses having different Sag values at each position.

Additionally, at least one lens among the first to fifth lenses may include a region where the size of the Sag value decreases. For example, the third surface of the second lens, the eighth surface of the fourth lens, and the ninth surface of the fifth lens may include a region where the absolute value of the Sag value decreases.

Additionally, at least one lens among the first to fifth lenses may include a region where the size of the Sag value increases. For example, the first surface and second surface of the first lens, the third surface and fourth surface of the second lens, the fifth surface and sixth surface of the third lens, and the seventh surface and eighth surface of the fourth lens may include regions where the Sag value increases.

Additionally, at least one lens among the first to fifth lenses may include a region where the size of the Sag value decreases. For example, the ninth surface and the tenth surface of the fifth lens may include regions where the Sag value decreases.

In addition, the region where the Sag value increases for at least one lens among the first to fifth lenses may be larger than the region where the Sag value decreases. For example, for the first surface and second surface of the first lens, the third surface and fourth surface of the second lens, the fifth surface and sixth surface of the third lens, and the seventh surface and eighth surface of the fourth lens, the region where the Sag value increases may be larger than the region where the Sag value decreases.

Additionally, at least one lens among the first to fifth lenses may include only a region where the size of the Sag value increases. For example, the first surface and second surface of the first lens, the third surface and fourth surface of the second lens, and the fifth surface and sixth surface of the third lens may include only regions where the size of the Sag value increases.

In the optical system 1000 and the optical module 2000 according to the third embodiment, the numerical values in FIG. 34 may satisfy at least one of Equations 1 to 41. In detail, the optical system 1000 and the optical module 2000 according to the third embodiment may satisfy all of Equations 1 to 41 above.

Accordingly, it may be seen that the optical system and optical module according to the third embodiment have low distortion characteristics as shown in FIG. 40.

Additionally, it may be seen that the optical system and optical module according to the third embodiment have improved MTF characteristics as shown in FIG. 41.

FIGS. 42 and 43 are diagrams showing a camera module according to an embodiment applied to a mobile terminal.

Referring to FIG. 42, the mobile terminal 1 may include a camera module 10 provided on the rear.

The camera module 10 may include an image capturing function. Additionally, the camera module 10 may include at least one of an auto focus, zoom function, and OIS function.

The camera module 10 may process image frames of still images or videos obtained by the image sensor 300 in shooting mode or video call mode. The processed image frame may be displayed on a display unit (not shown) of the mobile terminal 1 and may be stored in a memory (not shown).

For example, the camera module 10 may include a first camera module 10A and a second camera module 10B. At this time, at least one of the first camera module 10A and the second camera module 10B may include the optical system 1000 described above. Accordingly, the camera module 10 may have a slim structure and can photograph subjects at various magnifications.

In addition, the mobile terminal 1 may further include an autofocus device 31. The autofocus device 31 may include an autofocus function using a laser. The autofocus device 31 may be mainly used in conditions where the autofocus function using the image of the camera module 10 is deteriorated, for example, at a distance of 10 m or less or in a dark environment. The autofocus device 31 may include a light emitting unit including a vertical cavity surface emitting laser (VCSEL) semiconductor device, and a light receiving unit such as a photo diode that converts light energy into electrical energy.

Additionally, the mobile terminal 1 may further include a flash module 33. The flash module 33 may include a light emitting device inside that emits light. The flash module 33 may emit light in the visible light wavelength band. For example, the flash module 33 may emit white light or light of a color similar to white. However, the embodiment is not limited thereto, and the flash module 33 may emit light of various colors. The flash module 33 may be operated by operating a camera of a mobile terminal or by user control.

Additionally, referring to FIG. 43, the mobile terminal 1 may include a camera module 10 provided at the front.

In detail, the mobile terminal 1 may have a camera module 10 disposed in the screen display region on the front of the mobile terminal 1. That is, the mobile terminal 1 may have a camera module 10 disposed in a display region where a screen is displayed.

That is, the camera module 10 may be an under-display camera in which the camera module is disposed below the display of the mobile device 1.

When the camera module is applied as an under-display camera, the screen region may be expanded by removing a separate bezel region for placing the camera, and there is no need to apply a punch hole design that creates a camera hole.

The features, structures, effects, etc. described in the embodiments above are included in at least one embodiment of the present invention and are not necessarily limited to only one embodiment. Furthermore, the features, structures, effects, etc. illustrated in each embodiment may be combined or modified and implemented in other embodiments by a person with ordinary knowledge in the field to which the embodiments belong. Therefore, contents related to such combinations and modifications should be construed as being included in the scope of the present invention.

In addition, although the above description focuses on examples, this is only an example and does not limit the present invention, those of ordinary skill in the field to which the present invention pertains will recognize that various modifications and applications not exemplified above are possible without departing from the essential characteristics of the present embodiment. For example, each component specifically shown in the examples may be modified and implemented. And these variations and differences in application should be construed as being included in the scope of the present invention as defined in the appended claims.

The invention claimed is:

1. An optical module comprising:

a sensor; and an optical system comprising a first lens, a second lens, a third lens, a fourth lens, and a fifth lens arranged sequentially along an optical axis from an object side to a sensor side, wherein at least one of an object side surface or a sensor side surface of the fourth lens comprises a freeform surface, wherein the third lens and the fifth lens satisfy Equation 23 below:

$$\max|SA\_O\_5| < \max|SA\_O\_3|,\quad \max|SA\_S\_5| > \max|SA\_S\_3|,\quad \max|SA\_O\_3| < 35^\circ,\quad \max|SA\_S\_3| > 60^\circ \qquad \text{[Equation 23]}$$

(In Equation 23, max |SA_O_3| means a maximum angle of inclination between a normal line and the optical axis at any point on an object side surface of the third lens in a distance range from the optical axis of the third lens to an effective diameter, max |SA_S_3| means a maximum angle of inclination between a normal line and the optical axis at any point on a sensor side surface of the third lens in the distance range from the optical axis of the third lens to an effective diameter, max |SA_O_5| means a maximum angle of inclination between a normal line and the optical axis at any point on an object side surface of the fifth lens in the distance range from the optical axis of the fifth lens to an effective diameter, max |SA_S_5| means a maximum angle of inclination between a normal line of a sensor side surface of the fifth lens and the optical axis at any point in the distance range from the optical axis of the fifth lens to the effective diameter).

2. The optical module according to claim 1, wherein the fourth lens satisfies Equation B below:

$$0.1um \le \max|Sag\_O\_x\_4| - \max|Sag\_O\_y\_4| \le 5um. \qquad \text{[Equation B]}$$

3. The optical module according to claim 1, wherein the third lens satisfies Equation 4 below:

$$15^\circ < |SA1\_O\_3| \le 40^\circ,\quad 15^\circ < |SA1\_S\_3| \le 40^\circ \qquad \text{[Equation 4]}$$

(In Equation 4, SA1_O_3 means a slope angle between a normal line of the object side surface of the third lens and the optical axis at any point on the object side surface at a distance ranging from 75% to 95% of a distance from the optical axis of the third lens to an effective diameter, and SA1_S_3 means a slope angle between a normal line of the object side surface and the optical axis at any point on the sensor side surface of the third lens at a distance ranging from 75% to 95% of a distance from the optical axis of the third lens to the effective diameter).

4. The optical module according to claim 1, wherein the fifth lens satisfies Equation 5 below:

$$5° < |SA1\_O\_5| \le 10°, \quad 15° < |SA1\_S\_5| \le 60° \quad \text{[Equation 5]}$$

(In Equation 5, SA1_O_5 means a slope angle between a normal line of the object side surface of the forth lens and the optical axis at any point on the object side surface at a distance ranging from 75% to 95% of a distance from the optical axis of the fifth lens to an effective diameter, and SA1_S_5 means a slope angle between the normal line of the object side surface and the optical axis at any point on the sensor side surface of the fifth lens at a distance ranging from 75% to 95% of a distance from the optical axis of the fifth lens to the effective diameter).

5. The optical module according to claim 1, wherein the fourth lens satisfies Equation 6 below:

$$15° < |SA1\_O\_x\_4| \le 50°, \quad 15° < |SA1\_O\_y\_4| \le 50° \quad \text{[Equation 6]}$$

(In Equation 6, SA1_O_x_4 means a slope angle between a normal line and the optical axis at any point on the object side surface of the fourth lens at a distance in the range of 75% to 95% of a distance from the optical axis to an effective diameter in a X-axis direction from the optical axis of the fourth lens, and SA1_O_y_4 means the angle between the normal line and the optical axis at any point on the object side surface of the forth lens at a distance in the range of 75% to 95% of a distance from the optical axis to the effective diameter in a Y-axis direction from the optical axis of the fourth lens).

6. The optical module according to claim 1, wherein the fourth lens satisfies Equation 13 below:

$$150um \le \max|Sag\_O\_x\_4| - \min|Sag\_O\_x\_4| \le 300um, \quad 180um \le \max|Sag\_O\_y\_4| - \min|Sag\_O\_y\_4| \le 300um \quad \text{[Equation 13]}$$

(In Equation 13, max |Sag_O_x_4| means an absolute value of a maximum Sag value in a X-axis direction on the object side surface of the fourth lens, min |Sag_O_x_4| means an absolute value of a minimum Sag value in the X-axis direction that is not 0 on the object side surface of the fourth lens, max |Sag_O_y_4| means an absolute value of a maximum Sag value in a Y-axis direction on the object side surface of the fourth lens, and min |Sag_O_y_4| means an absolute value of a minimum Sag value in the Y-axis direction that is not 0 on the object side surface of the fourth lens).

7. The optical module according to claim 1, wherein the fourth lens satisfies Equation A below:

$$|\max Sag\_O\_x\_4| \ne |\max Sag\_O\_y\_4| \quad \text{[Equation A]}$$

(In equation A, max |Sag_O_x_4| means an absolute value of a maximum Sag value in a X-axis direction on the object side surface of the fourth lens, and max |Sag_O_y_4| means an absolute value of a maximum Sag value in a Y-axis direction on the object side surface of the fourth lens), wherein the optical system satisfies the following Equations 1 to 3:

$$60° \le FOV \le 90° \quad \text{[Equation 1]}$$

(FOV in Equation 1 means an angle of view)

$$0.50 \le TTL/ImgH \le 1.0 \quad \text{[Equation 2]}$$

(In Equation 2, TTL means a distance in an optical axis direction from a vertex of an object side surface of the first lens to an image surface of an image sensor unit, and ImgH means twice a diagonal distance from the image surface of the image sensor unit overlapping the optical axis to a 1.0 field region of an image sensor), and $$CA\_O\_x < CA\_O\_5 \quad \text{[Equation 3]}$$

(In Equation 3, CA_O_x means an effective diameter of an object side surface of a lens closest to an aperture among lenses between the aperture and a sensor, and CA_O_5 means an effective diameter of the object side surface of the fifth lens).

8. The optical module according to claim 1, wherein the fourth lens and the fifth lens satisfy Equation 26 below:

$$P\_4sign \ne P\_5sign,\ V\_5 > V\_4,\ 10 < V4 < 50 < V5,\ N\_5 < N\_4 \quad \text{[Equation 26]}$$

(In Equation 26, P_4 sign is a refractive power sign of the fourth lens having a positive (+) or negative (−) sign, P_5 sign is a refractive power sign of the fifth lens having a positive (+) or negative (−) sign, V_4 is an Abbe number of the fourth lens, V_5 is an Abbe number of the fifth lens, N_4 is a refractive index of the fourth lens, and N_5 means a refractive index of the fifth lens).

9. The optical module according to claim 1, wherein the fifth lens satisfies Equation 41 below:

$$0.8\text{ mm} < D\_mx\_5/I < 1.5\text{ mm} \quad \text{[Equation 41]}$$

(In Equation 41, D_mx_5/I means a distance in the optical axis direction from a point having an absolute value of a maximum Sag value on the sensor side of the fifth lens to an image surface of an image sensor unit).

10. The optical module according to claim 1, wherein the object side surface of the fifth lens includes a critical point located at a distance from the optical axis to more than 60% to 90% of an effective radius of the fifth lens.

11. An optical module, comprising:

a sensor; and an optical system comprising a first lens, a second lens, a third lens, a fourth lens, and a fifth lens arranged sequentially along an optical axis from an object side to a sensor side, wherein at least one of an object side or a sensor side of the fourth lens comprises a freeform surface, and wherein the fourth lens and the fifth lens satisfy Equation 26 below:

$$P\_4sign \neq P\_5sign,\ V\_5 > V\_4,\ 10 < V4 < 50 < V5,\ N\_5 < N\_4 \quad \text{[Equation 26]}$$

(In Equation 26, P_4 sign is a refractive power sign of the fourth lens having a positive (+) or negative (−) sign, P_5 sign is a refractive power sign of the fifth lens having a positive (+) or negative (−) sign, V_4 is an Abbe number of the fourth lens, V_5 is an Abbe number of the fifth lens, N_4 is a refractive index of the fourth lens, and N_5 means a refractive index of the fifth lens).

12. The optical module according to claim 11, wherein the fourth lens satisfies Equation B below:

$$0.1\text{ um} \leq \max|Sag\_O\_x\_4| - \max|Sag\_O\_y\_4| \leq 5\text{ um}. \quad \text{[Equation B]}$$

13. The optical module according to claim 11, wherein the third lens satisfies Equation 4 below:

$$15° < |SA1\_O\_3| \leq 40°,\ 15° < |SA1\_S\_3| \leq 40° \quad \text{[Equation 4]}$$

(In Equation 4, SA1_O_3 means a slope angle between a normal line of an object side surface of the third lens and the optical axis at any point on the object side surface at a distance ranging from 75% to 95% of a distance from the optical axis of the third lens to an effective diameter, and SA1_S_3 means a slope angle between a normal line of the object side surface and the optical axis at any point on a sensor side surface of the third lens at a distance ranging from 75% to 95% of a distance from the optical axis of the third lens to the effective diameter).

14. The optical module according to claim 11, wherein the fifth lens satisfies Equation 5 below:

$$5° < |SA1\_O\_5| \leq 10°,\ 15° < |SA1\_S\_5| \leq 60° \quad \text{[Equation 5]}$$

(In Equation 5, SA1_O_5 means a slope angle between a normal line of an object side surface of the fifth lens and the optical axis at any point on the object side surface at a distance ranging from 75% to 95% of a distance from the optical axis of the fifth lens to an effective diameter, and SA1_S_5 means a slope angle between the normal line of the object side surface and the optical axis at any point on a sensor side surface of the fifth lens at a distance ranging from 75% to 95% of a distance from the optical axis of the fifth lens to the effective diameter).

15. The optical module according to claim 11, wherein the fourth lens satisfies Equation 6 below:

$$15° \leq |SA1\_O\_x\_4| \leq 50°,\ 15° \leq |SA1\_O\_y\_4| \leq 50° \quad \text{[Equation 6]}$$

(In Equation 6, SA1_O_x_4 means a slope angle between a normal line and the optical axis at any point on the object side surface of the fourth lens at a distance in the range of 75% to 95% of a distance from the optical axis to an effective diameter in a X-axis direction from the optical axis of the fourth lens, and SA1_O_y_4 means the angle between the normal line and the optical axis at any point on the object side surface of the fourth lens at a distance in the range of 75% to 95% of a distance from the optical axis to the effective diameter in a Y-axis direction from the optical axis of the fourth lens).

16. The optical module according to claim 11, wherein the fourth lens satisfies Equation 13 below:

$$150\text{ um} \leq \max|Sag\_O\_x\_4| - \min|Sag\_O\_x\_4| \leq 300\text{ um},\quad 180\text{ um} \leq \max|Sag\_O\_y\_4| - \min|Sag\_O\_y\_4| \leq 300\text{ um} \quad \text{[Equation 13]}$$

(In Equation 13, max |Sag_O_x_4| means an absolute value of a maximum Sag value in a X-axis direction on the object side surface of the fourth lens, min |Sag_O_x_4| means an absolute value of a minimum Sag value in the X-axis direction that is not 0 on the object side surface of the fourth lens, max |Sag_O_y_4| means an absolute value of a maximum Sag value in a Y-axis direction on the object side surface of the fourth lens, and min |Sag_O_y_4| means an absolute value of a minimum Sag value in the Y-axis direction that is not 0 on the object side surface of the fourth lens).

17. The optical module according to claim 11, wherein the fourth lens satisfies the following Equation A, $$|maxSag\_O\_x\_4| \neq |maxSag\_O\_y\_4| \quad \text{[Equation A]}$$

(In equation A, max |Sag_O_x_4| means an absolute value of a maximum Sag value in a X-axis direction on the object side surface of the fourth lens, and max |Sag_O_y_4| means an absolute value of a maximum Sag value in a Y-axis direction on the object side surface of the fourth lens), and wherein the optical system satisfies the following Equations 1 to 3:

$$60° \leq FOV \leq 90° \quad \text{[Equation 1]}$$

(FOV in Equation 1 means an angle of view);

$$0.50 \leq TTL/ImgH \leq 1.0 \quad \text{[Equation 2]}$$

(In Equation 2, TTL means a distance in the optical axis direction from a vertex of an object side surface of the first lens to an image surface of an image sensor unit, and ImgH means twice the diagonal distance from the image surface of the image sensor unit overlapping the optical axis to the 1.0 field region of an image sensor);

$$CA\_O\_x < CA\_O\_5 \quad \text{[Equation 3]}$$

(In Equation 3, CA_O_x means an effective diameter of an object side surface of the lens closest to an aperture among the lenses between the aperture and the image sensor, and CA_O_5 means an effective diameter of an object side surface of the fifth lens).

18. The optical module according to claim 11, wherein the third lens and the fifth lens satisfy Equation 23 below:

$$\max|SA\_O\_5| < \max|SA\_O\_3|, \quad \text{[Equation 23]}$$

$$\max|SA\_S\_5| > \max|SA\_S\_3|, \max|SA\_O\_3| < 35°, \max|SA\_S\_3| < 60°$$

(In Equation 23, max |SA_O_3| means a maximum angle of inclination between a normal line and the optical axis at any point on an object side surface of the third lens in a distance range from the optical axis of the third lens to an effective diameter, max |SA_S_3| means a maximum angle of inclination between a normal line and the optical axis at any point on a sensor side surface of the third lens in the distance range from the optical axis of the third lens to the effective diameter, max |SA_O_5| means a maximum angle of inclination between a normal line and the optical axis at any point on an object side surface of the fifth lens in the distance range from the optical axis of the fifth lens to an effective diameter, and max |SA_S_5| means a maximum angle of inclination between a normal line of the sensor side surface of the fifth lens and the optical axis at any point in the distance range from the optical axis of the fifth lens to the effective diameter).

19. The optical module according to claim 11, wherein the fifth lens satisfies Equation 41 below:

$$0.8 \text{ mm} < D\_mx\_5/I < 1.5 \text{ mm} \quad \text{[Equation 41]}$$

(In Equation 41, D_mx_5/I means a distance in the optical axis direction from a point having an absolute value of a maximum Sag value on the sensor side of the fifth lens to an image surface of an image sensor unit).

20. The optical module according to claim 11, wherein the object side surface of the fifth lens includes a critical point located at a distance from the optical axis to more than 60% to 90% of an effective radius of the fifth lens.

* * * * *